Dec. 31, 1968     J. A. DIETER ET AL     3,418,892
CARTON FOLDING AND GLUING MACHINE
Filed Dec. 20, 1965
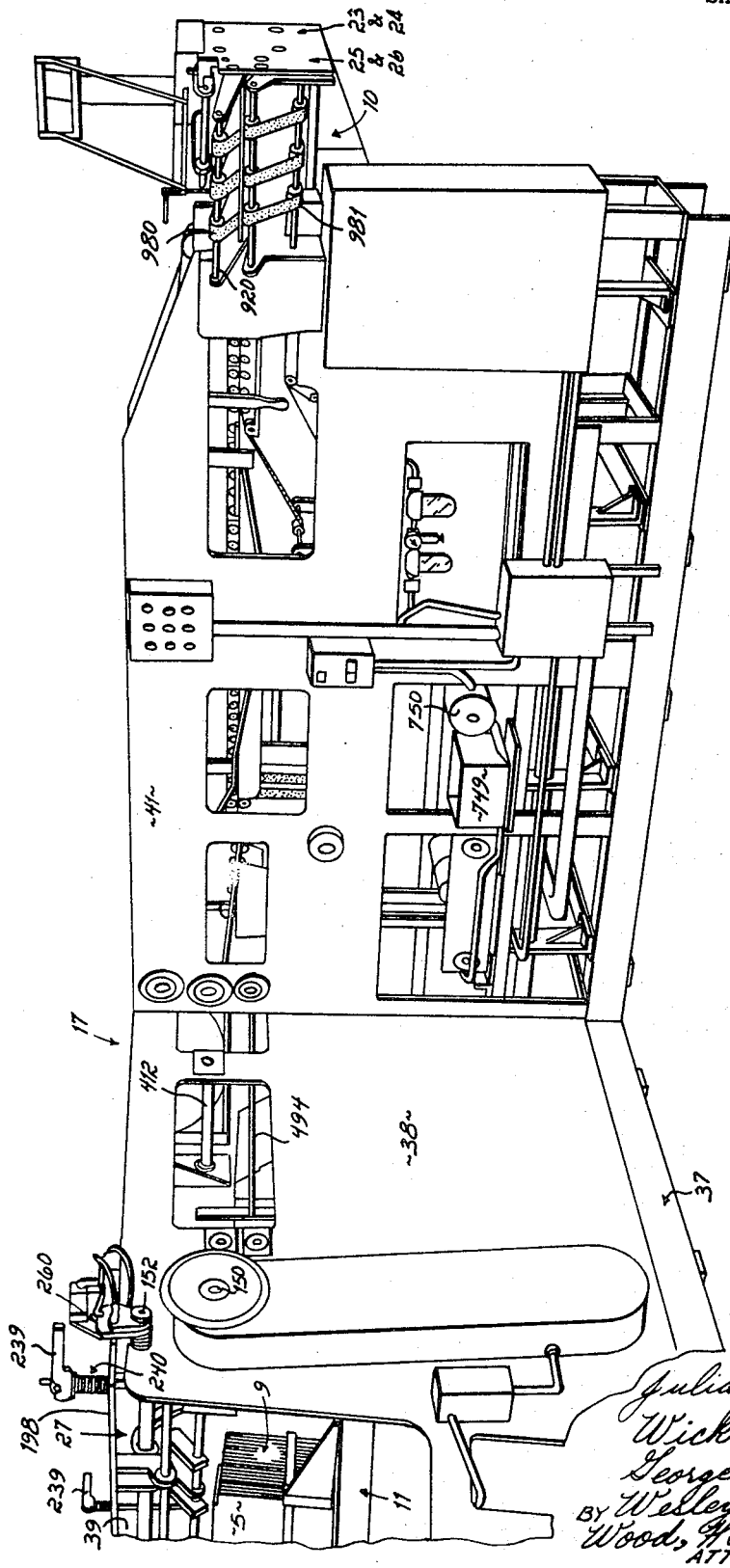

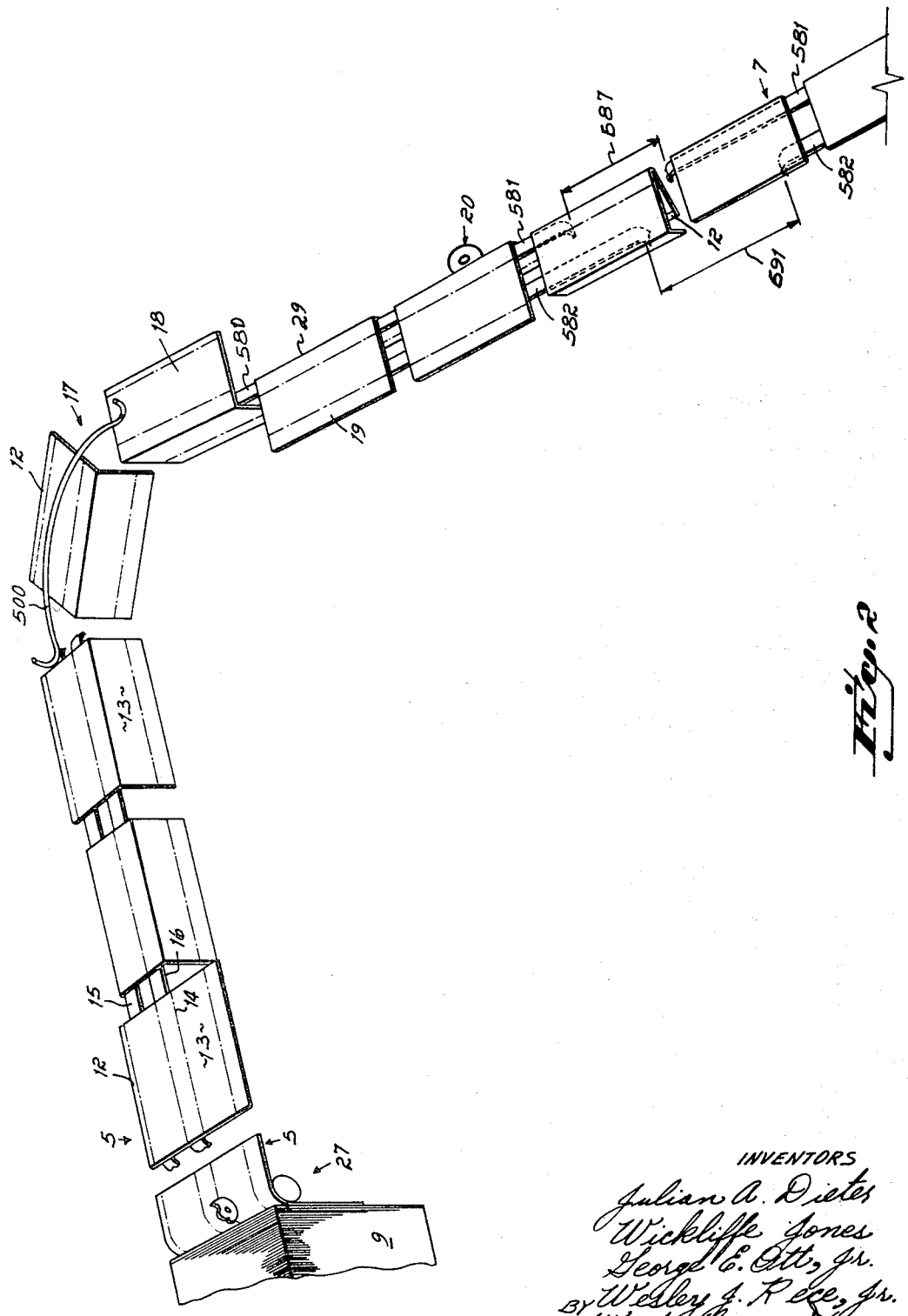

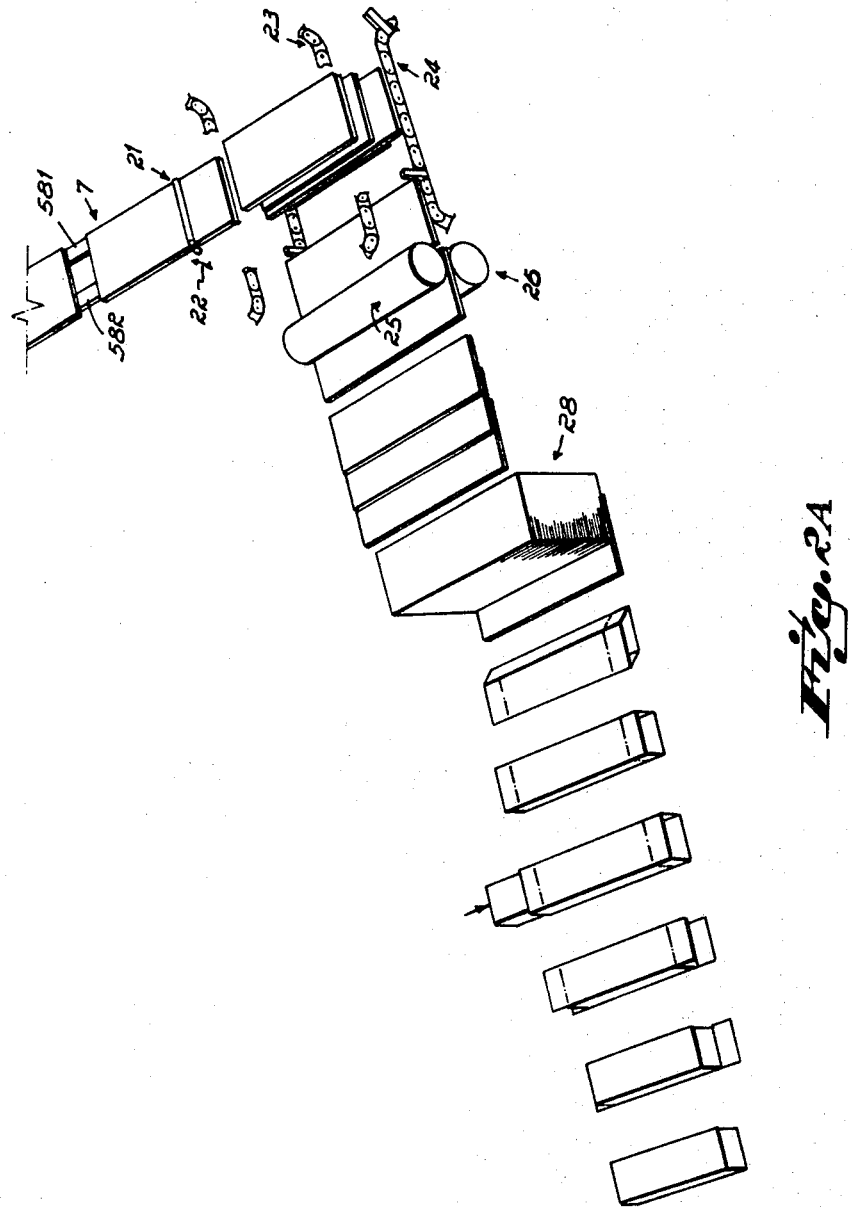

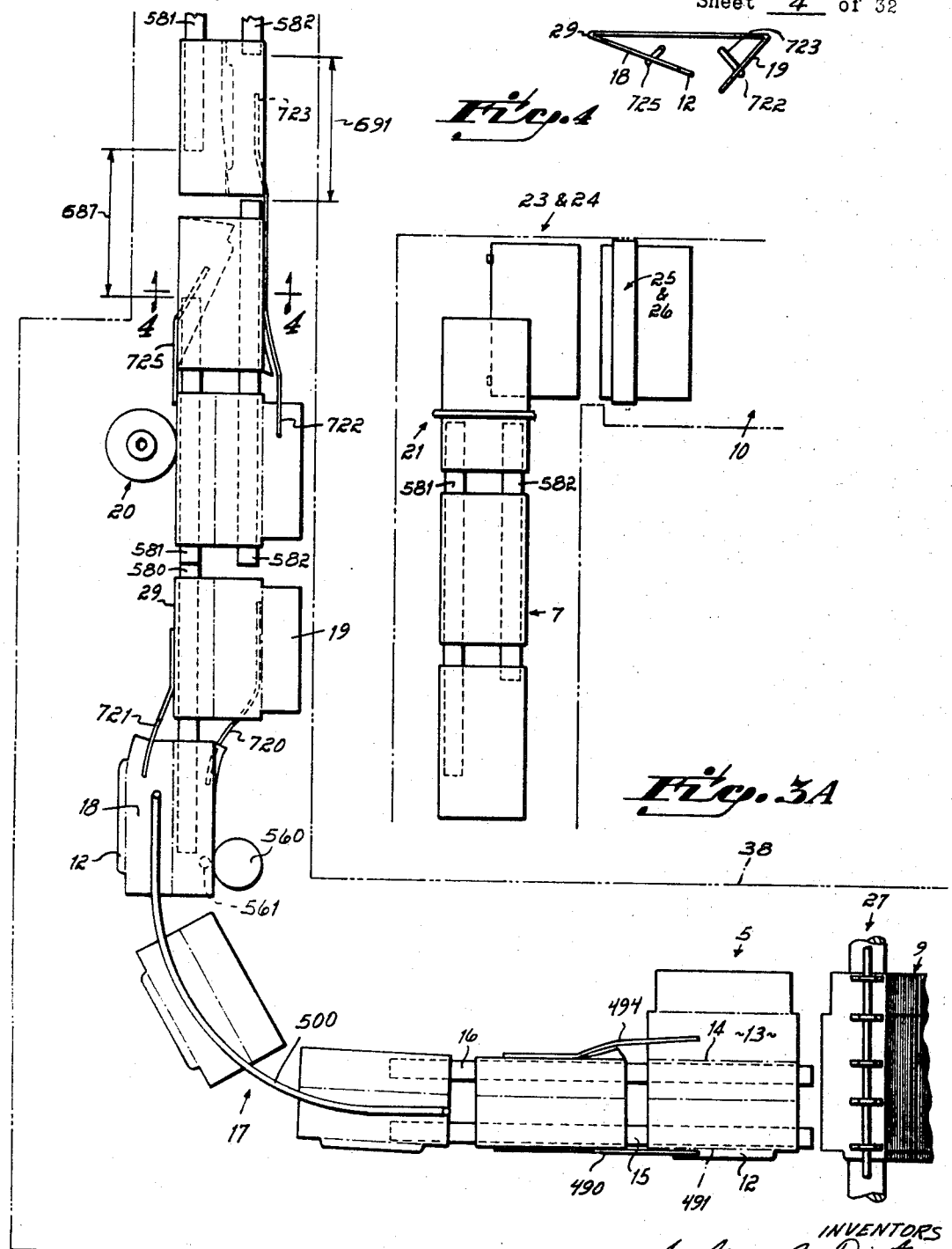

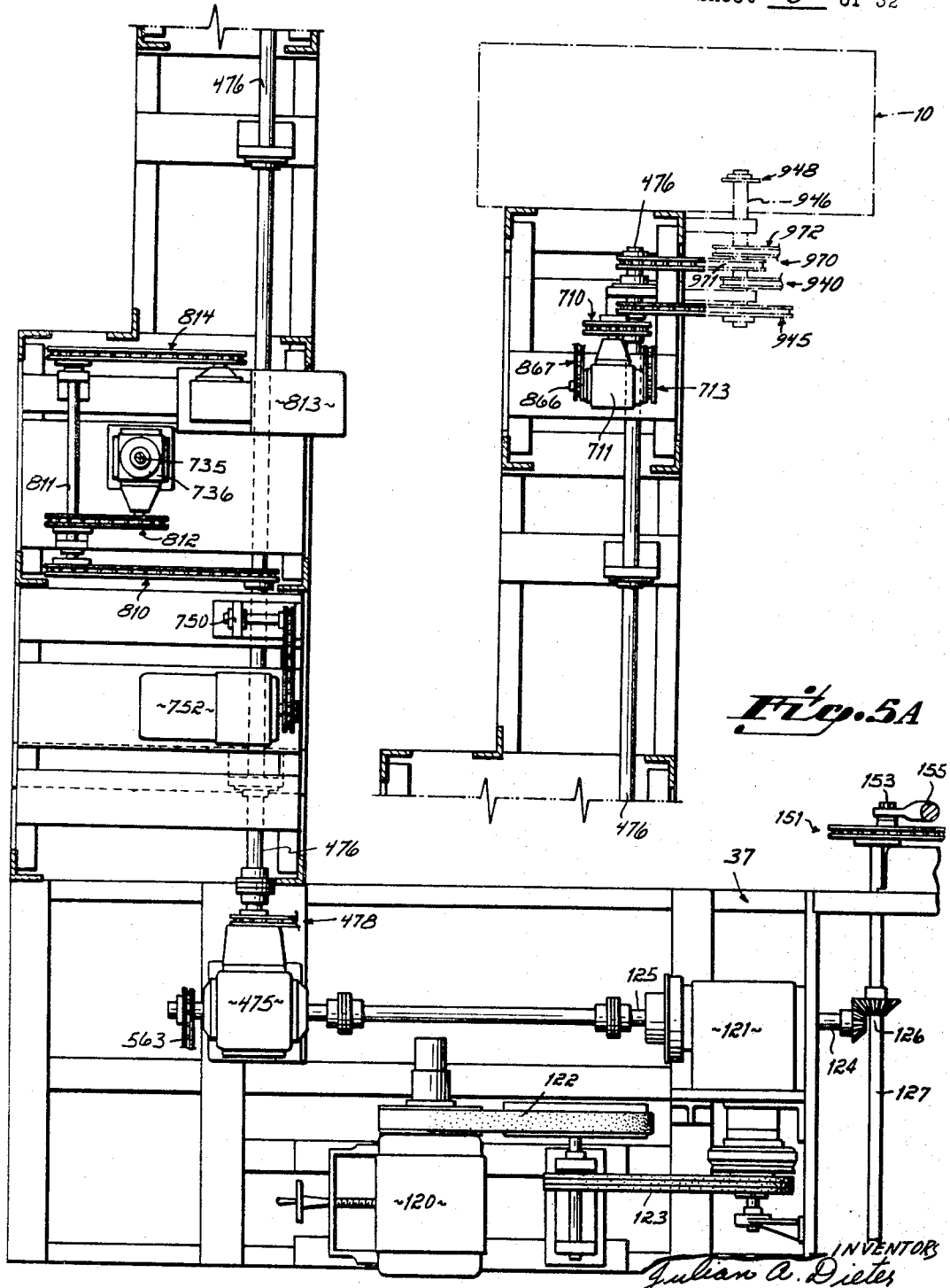

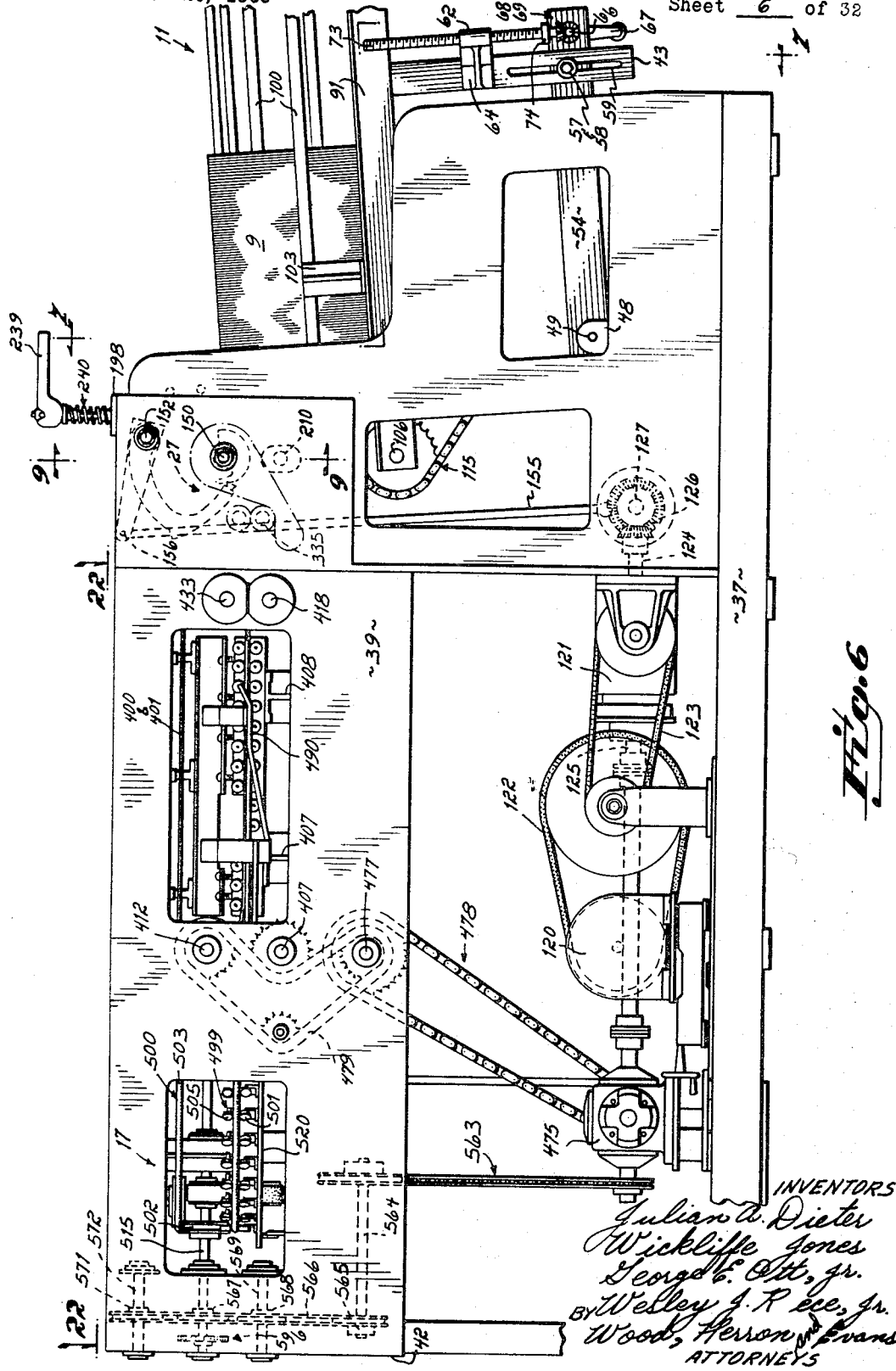

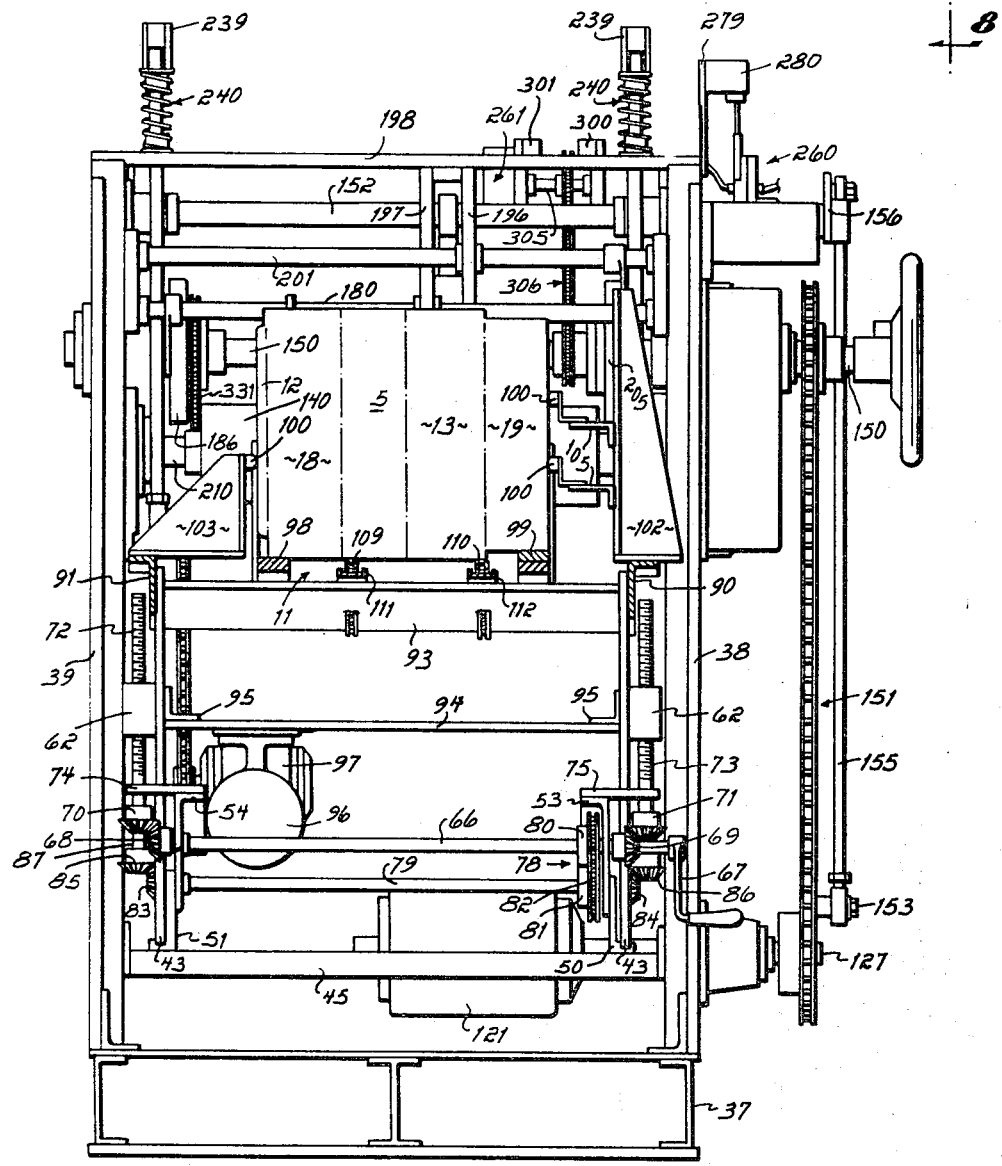

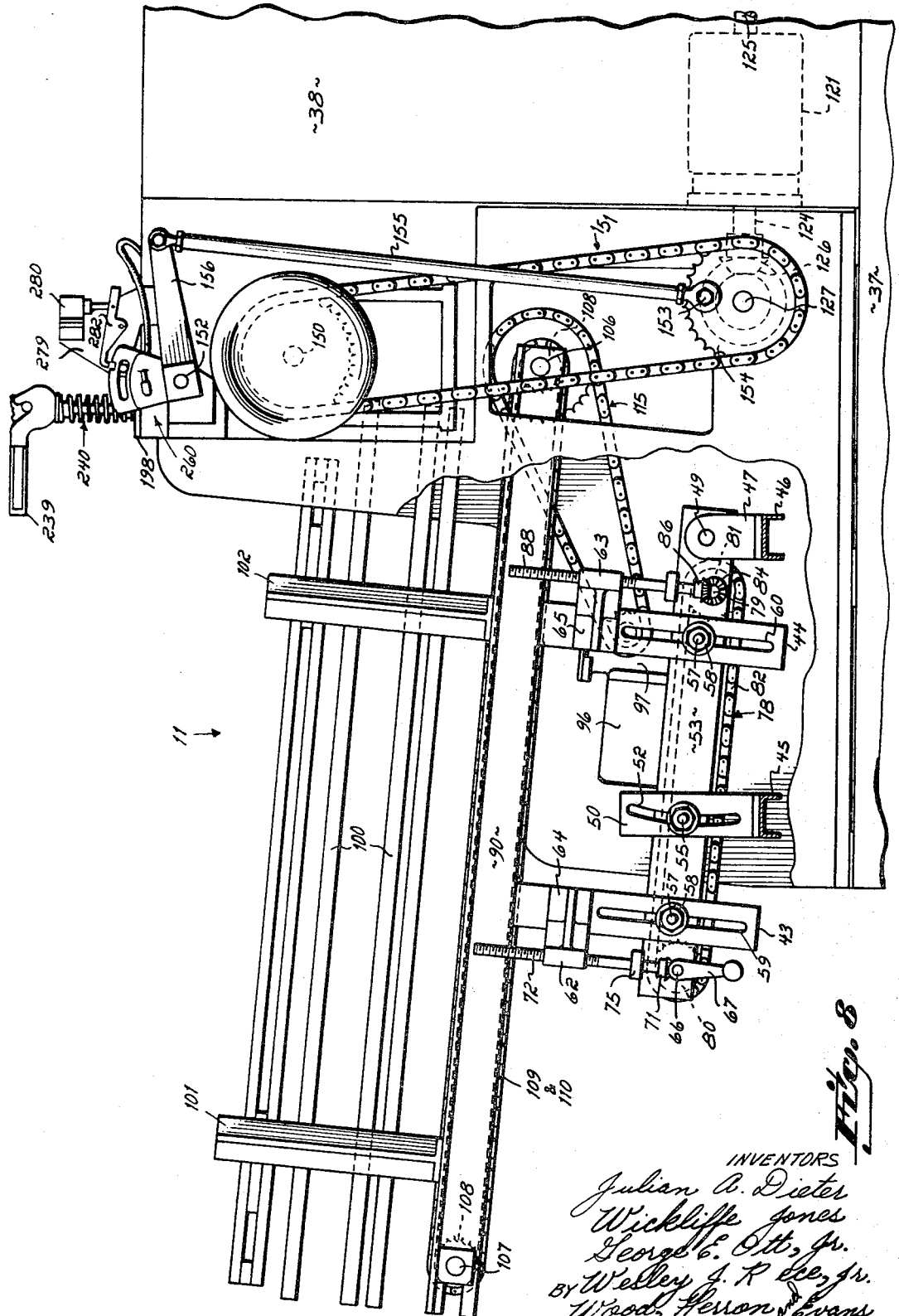

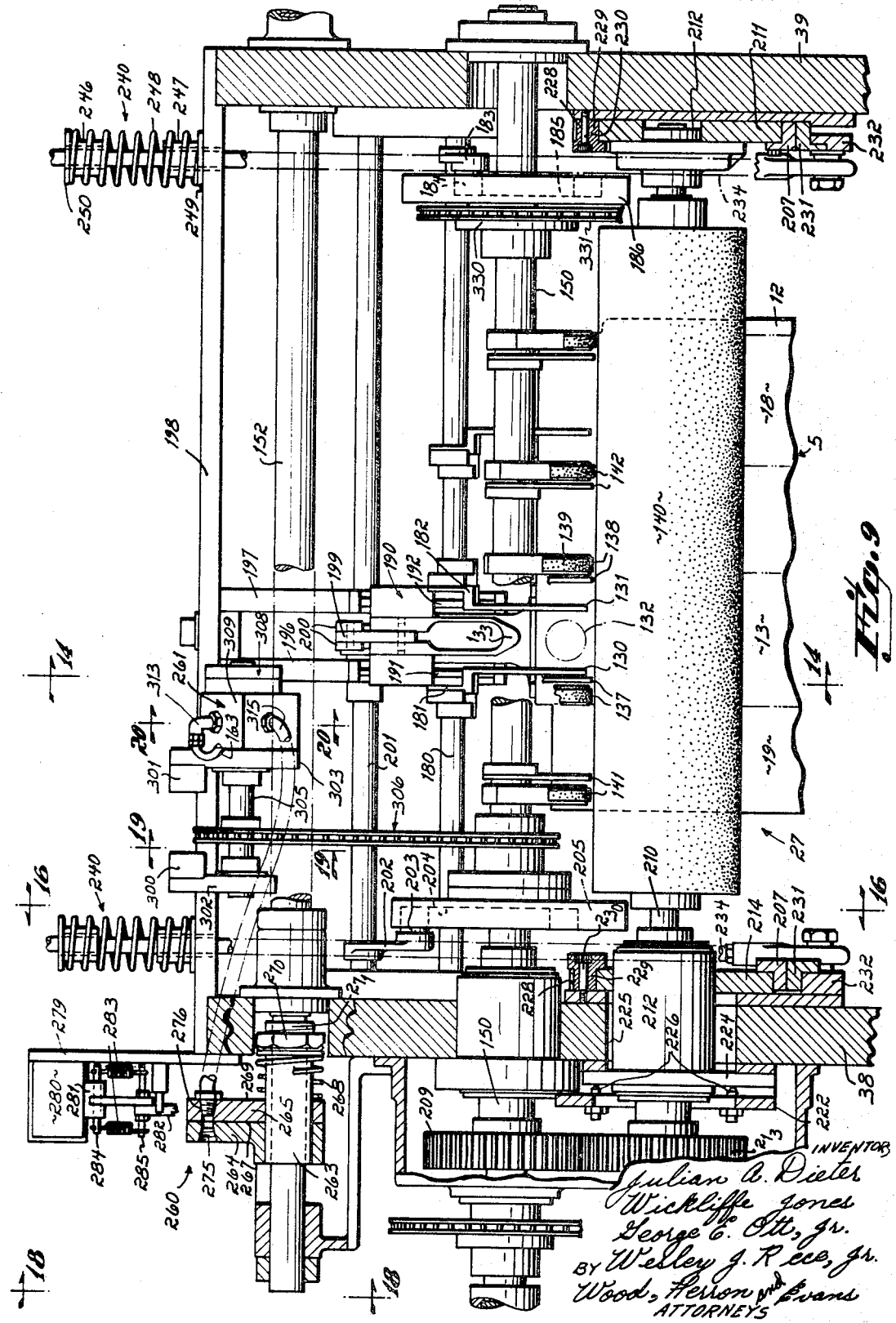

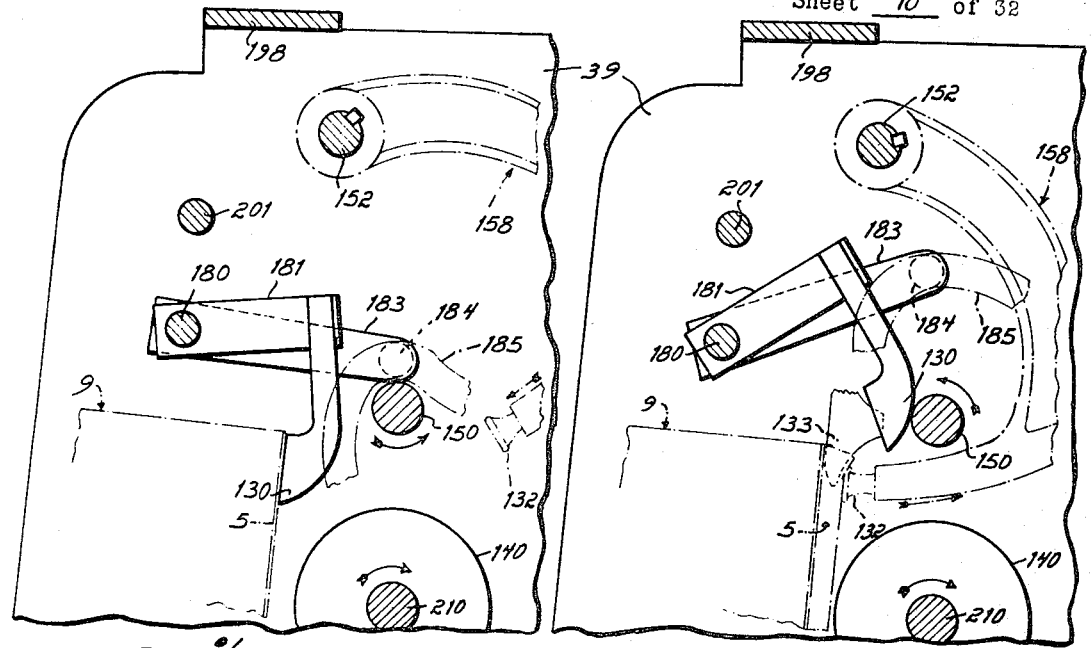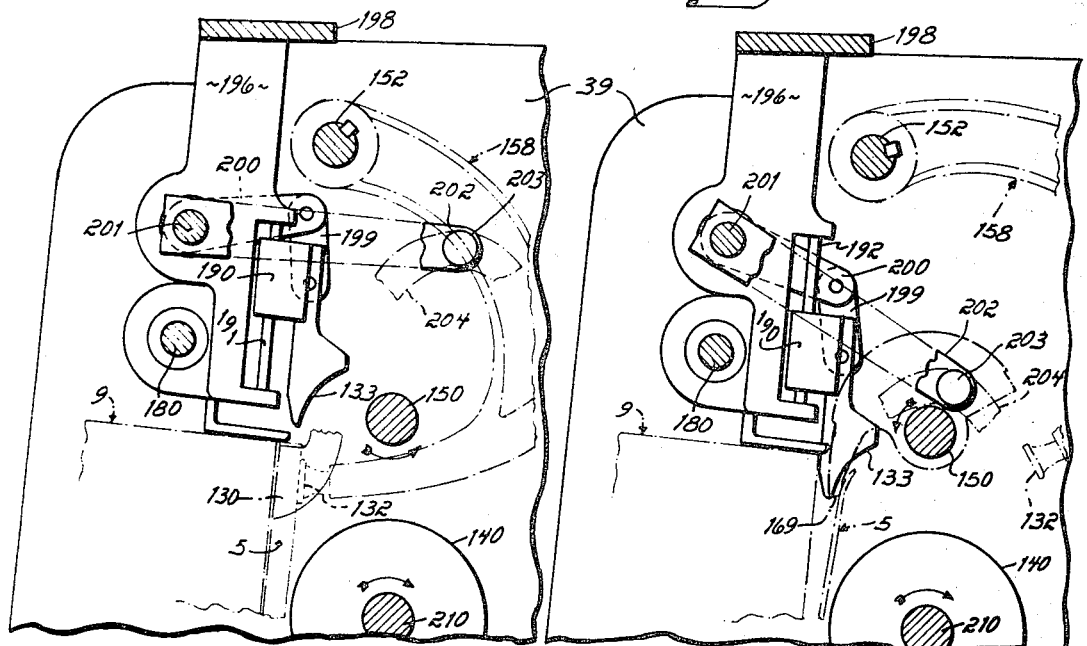

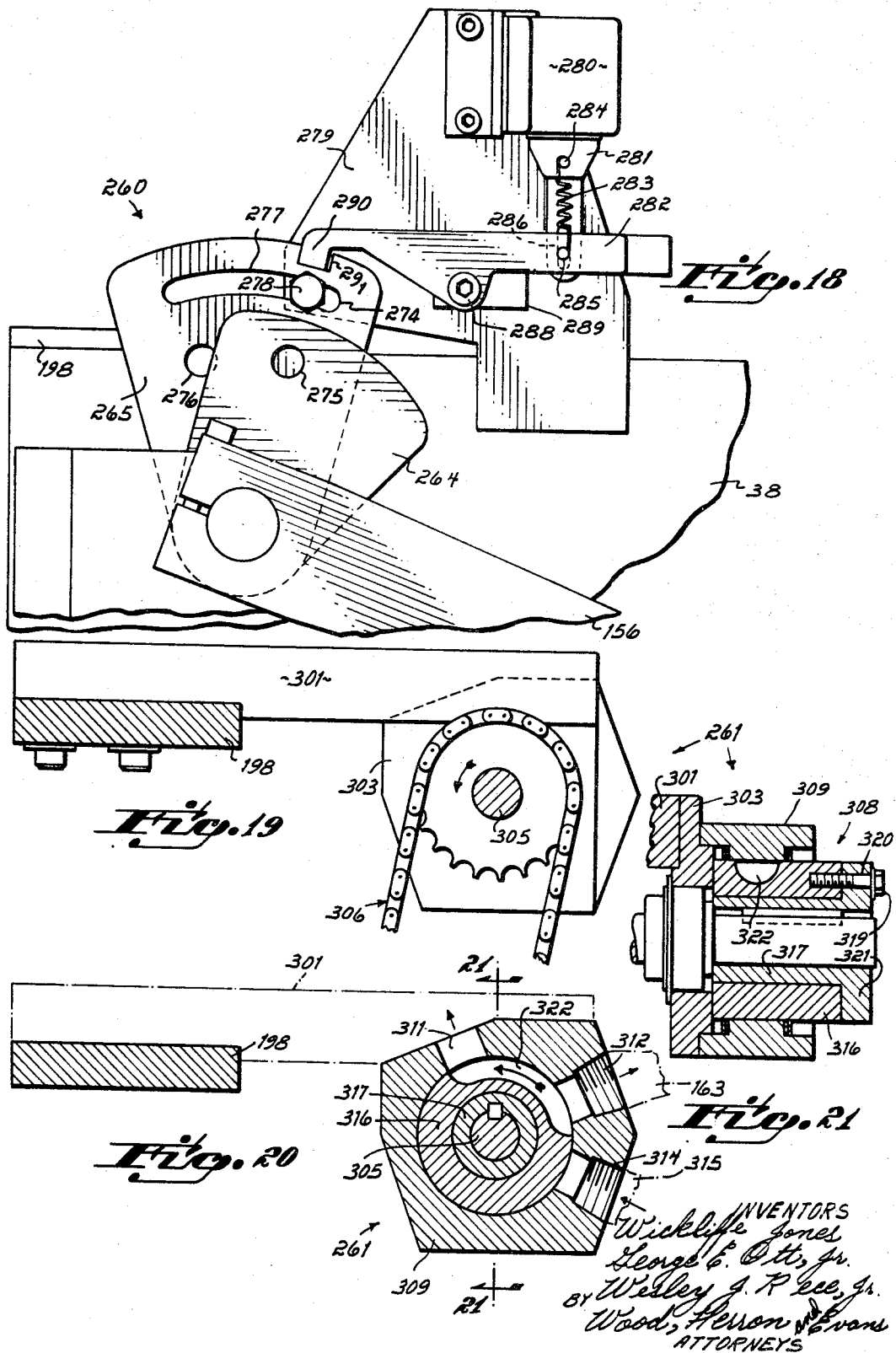

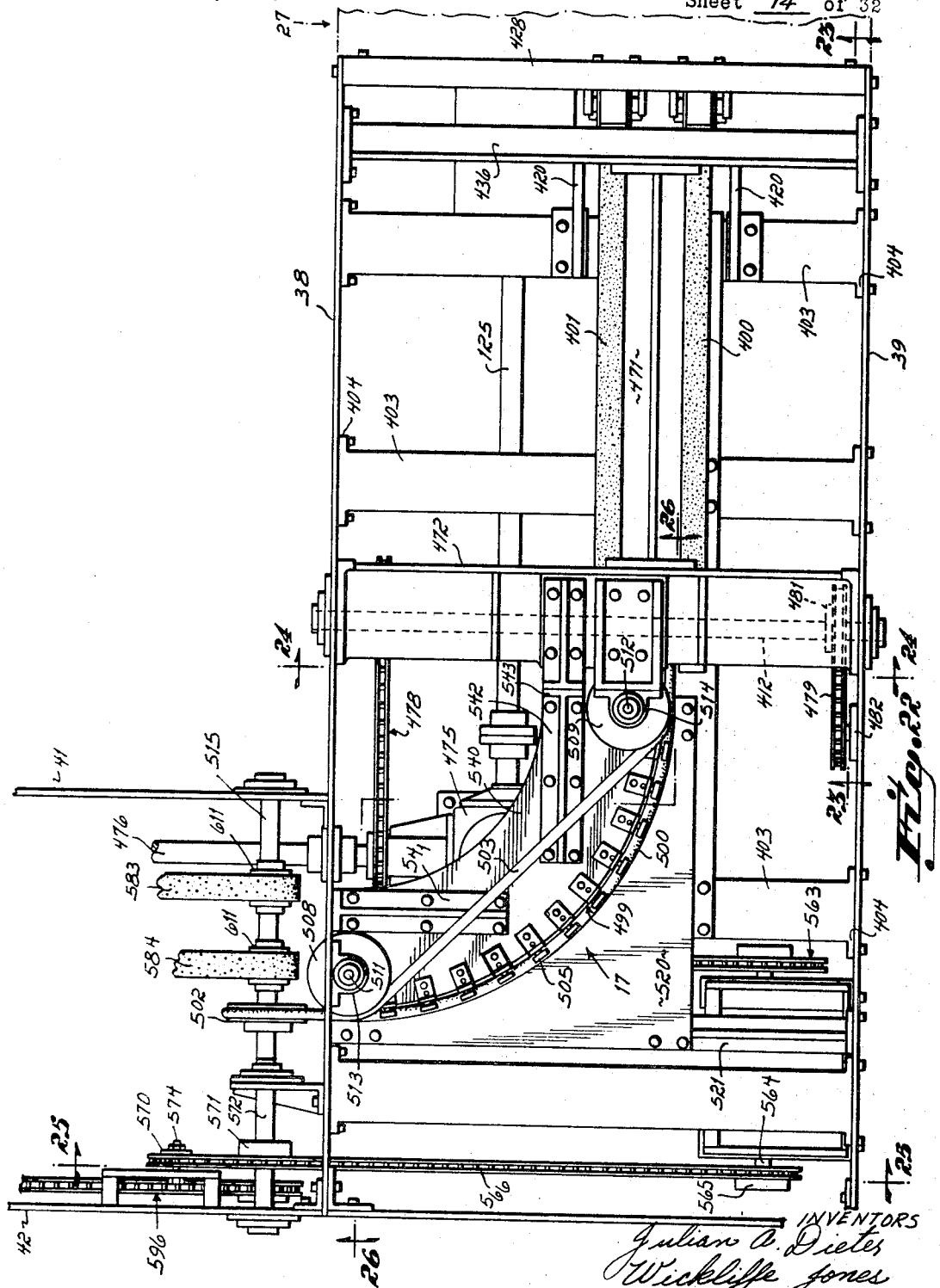

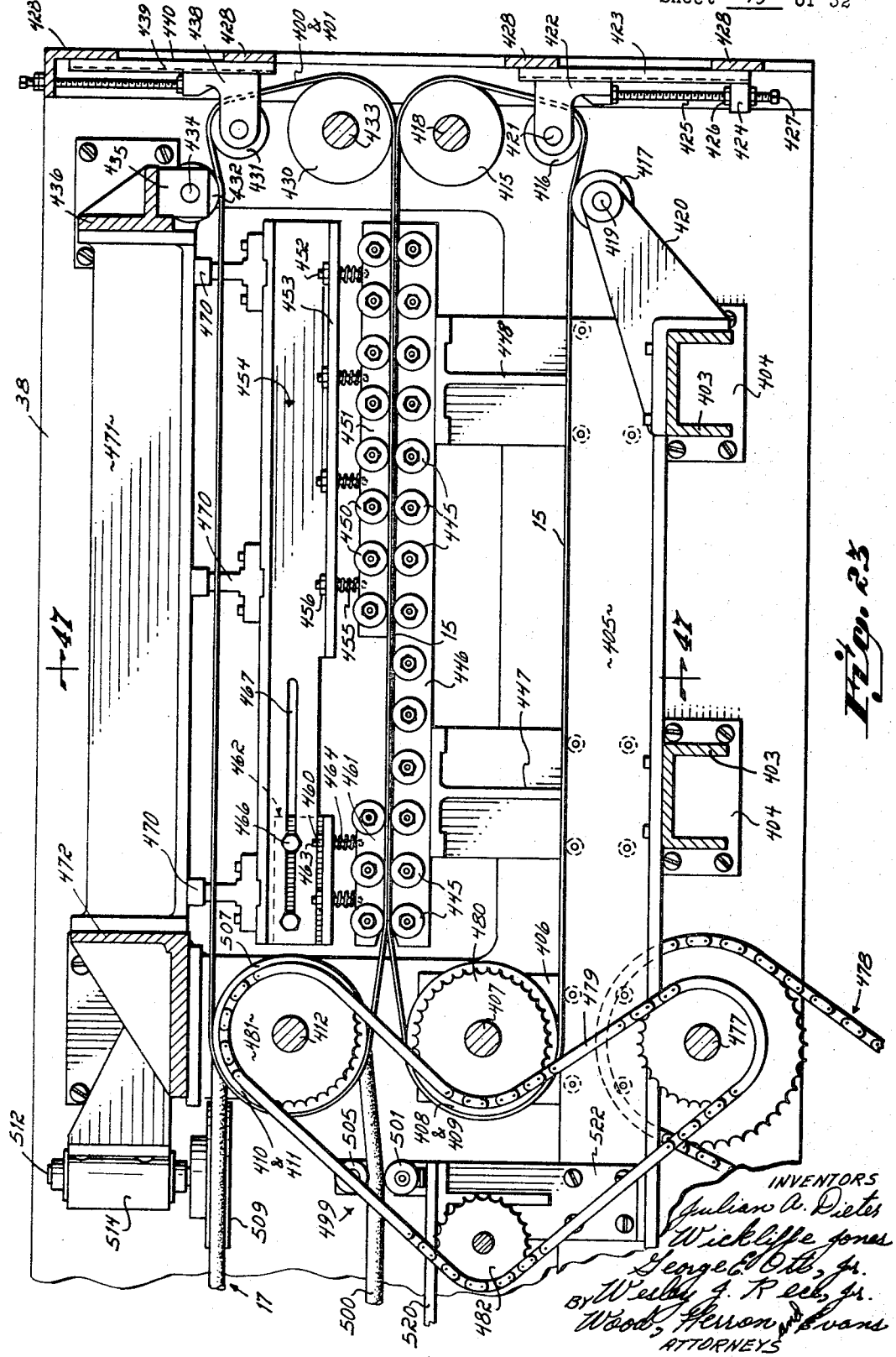

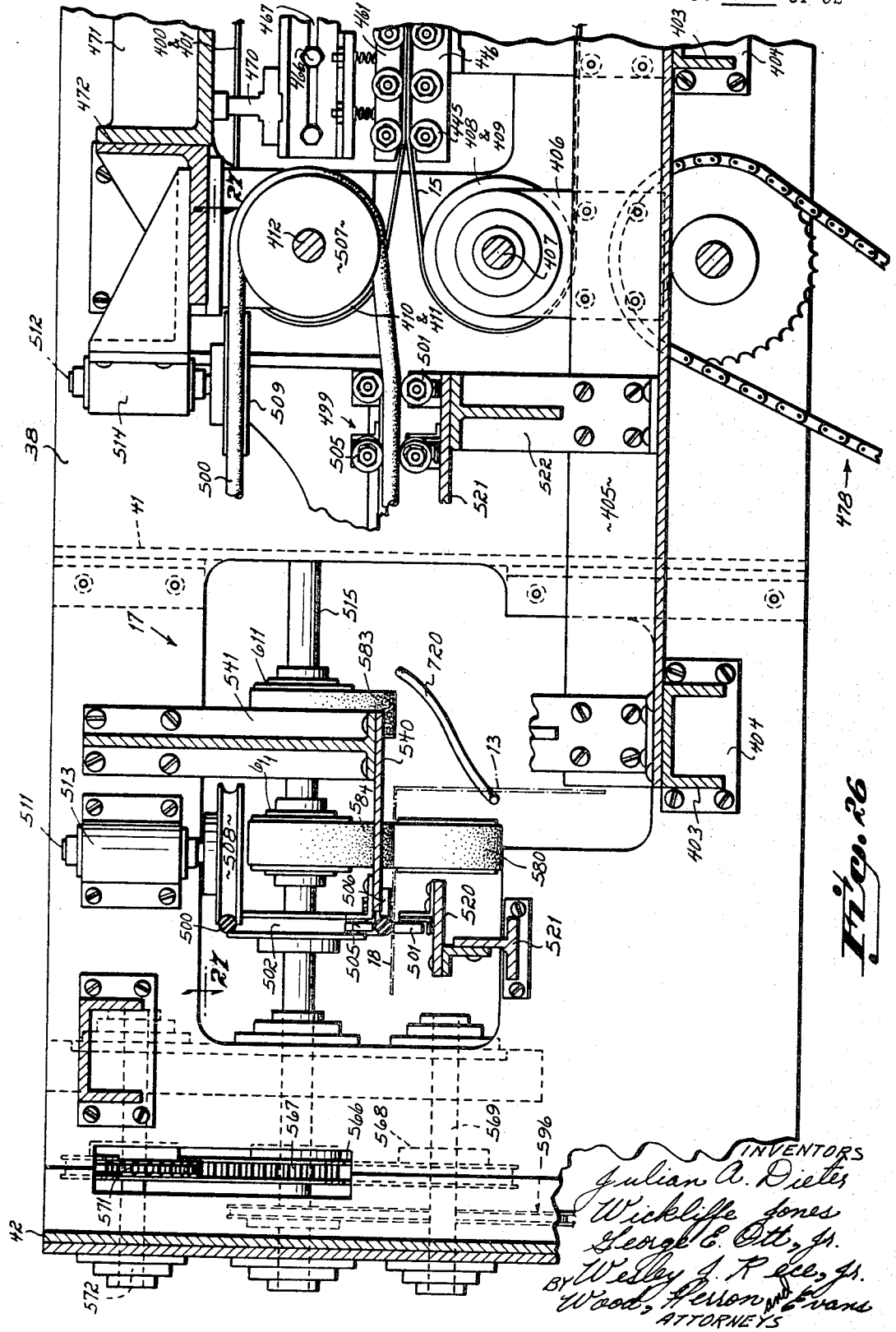

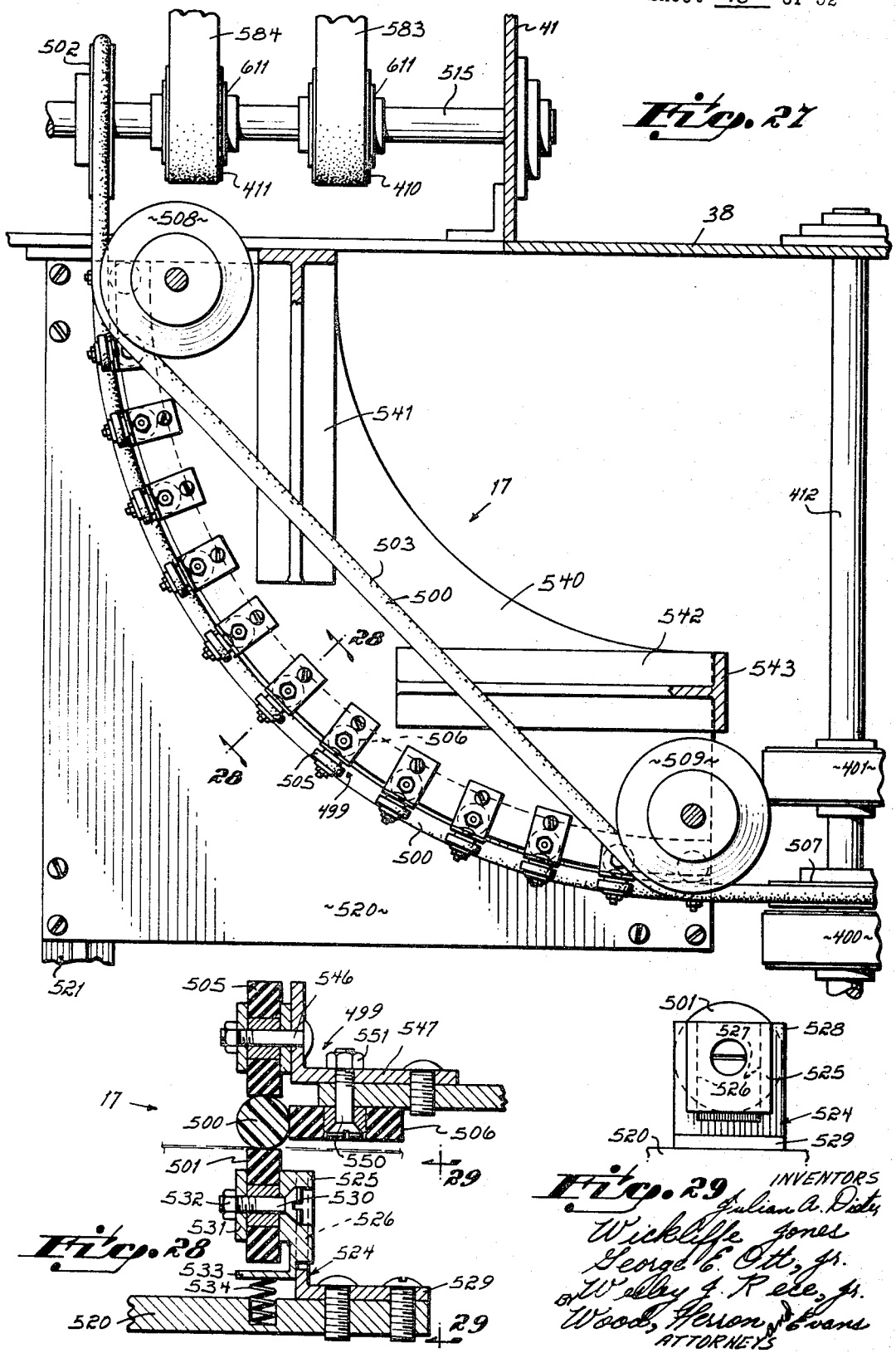

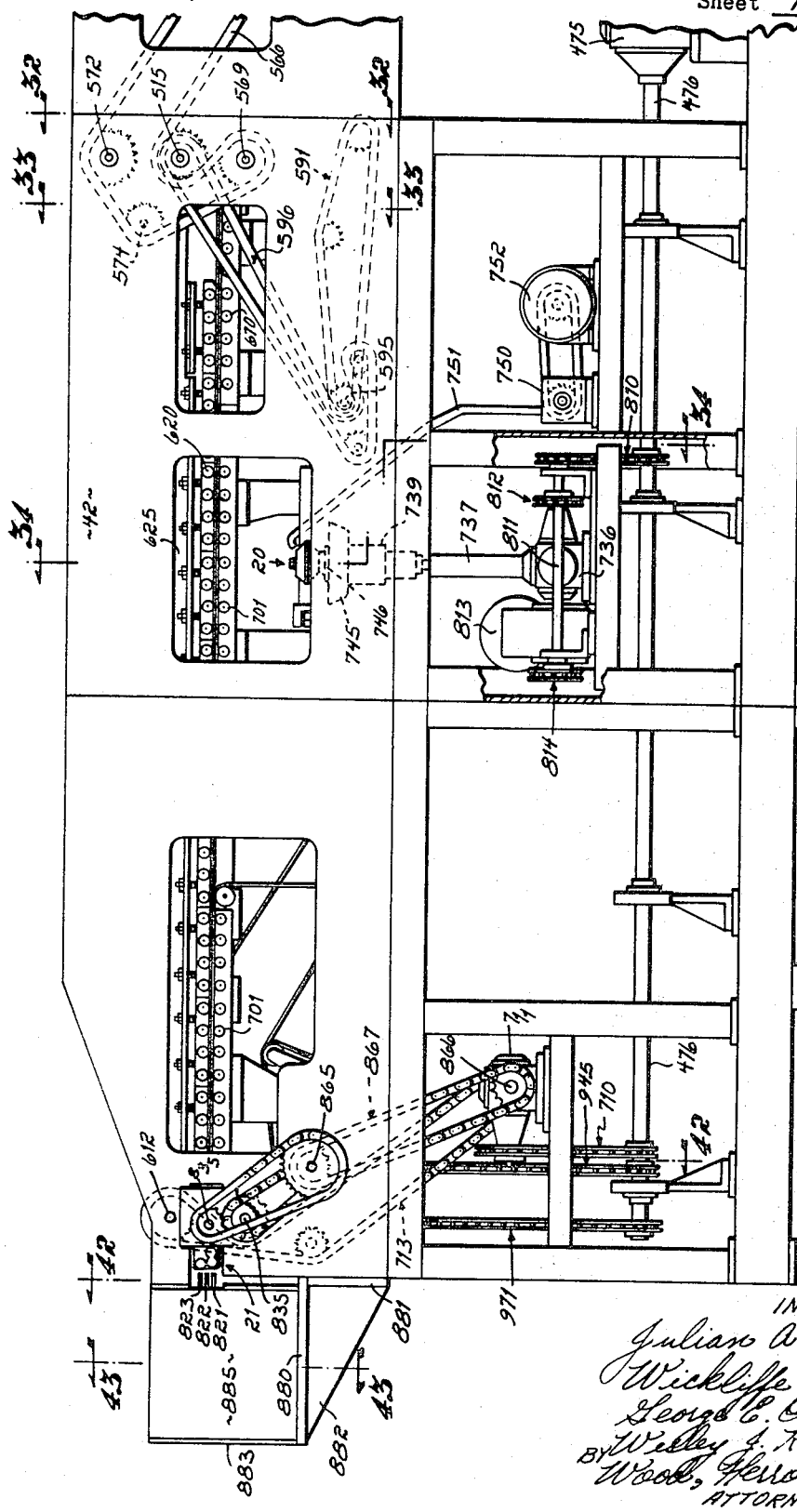

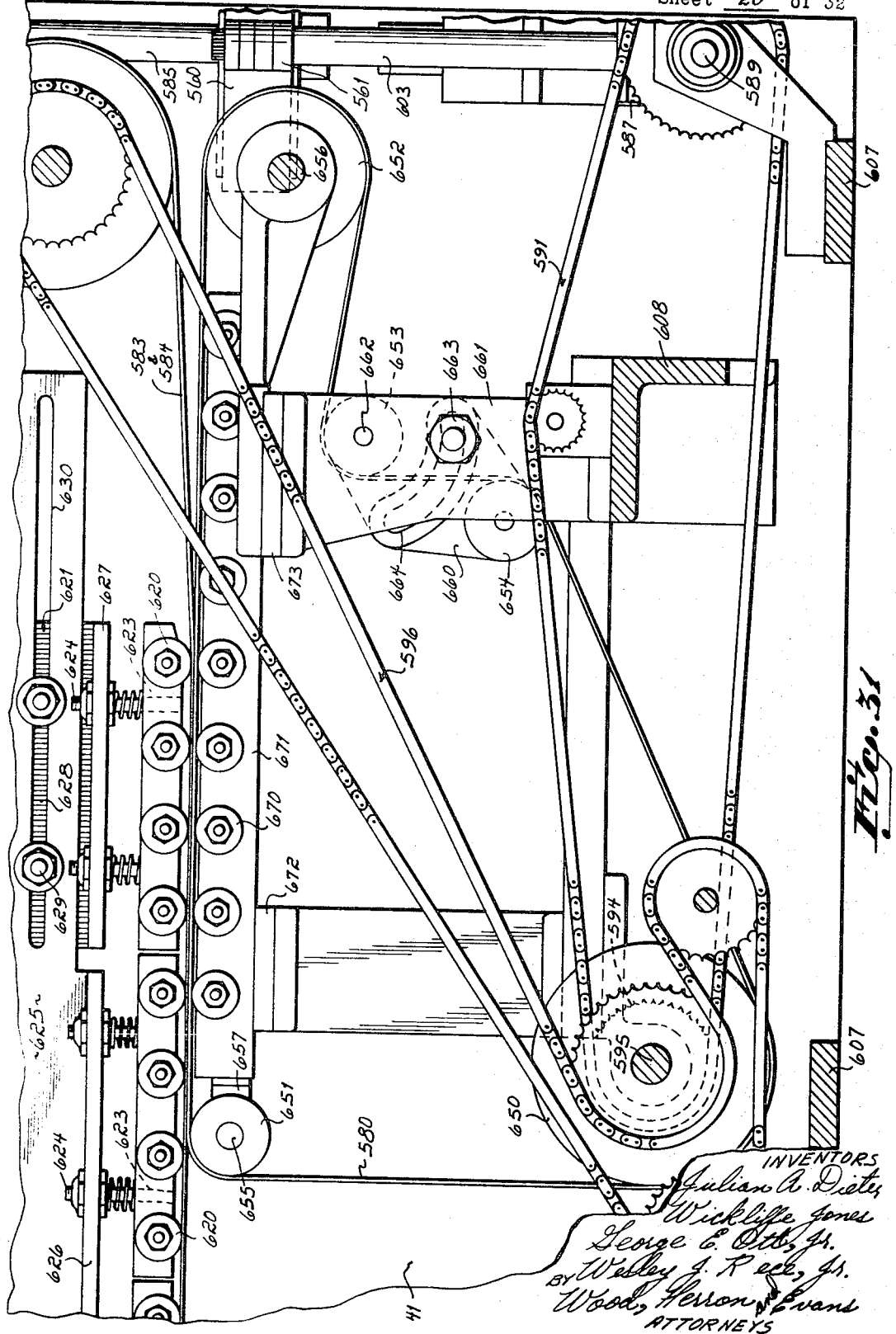

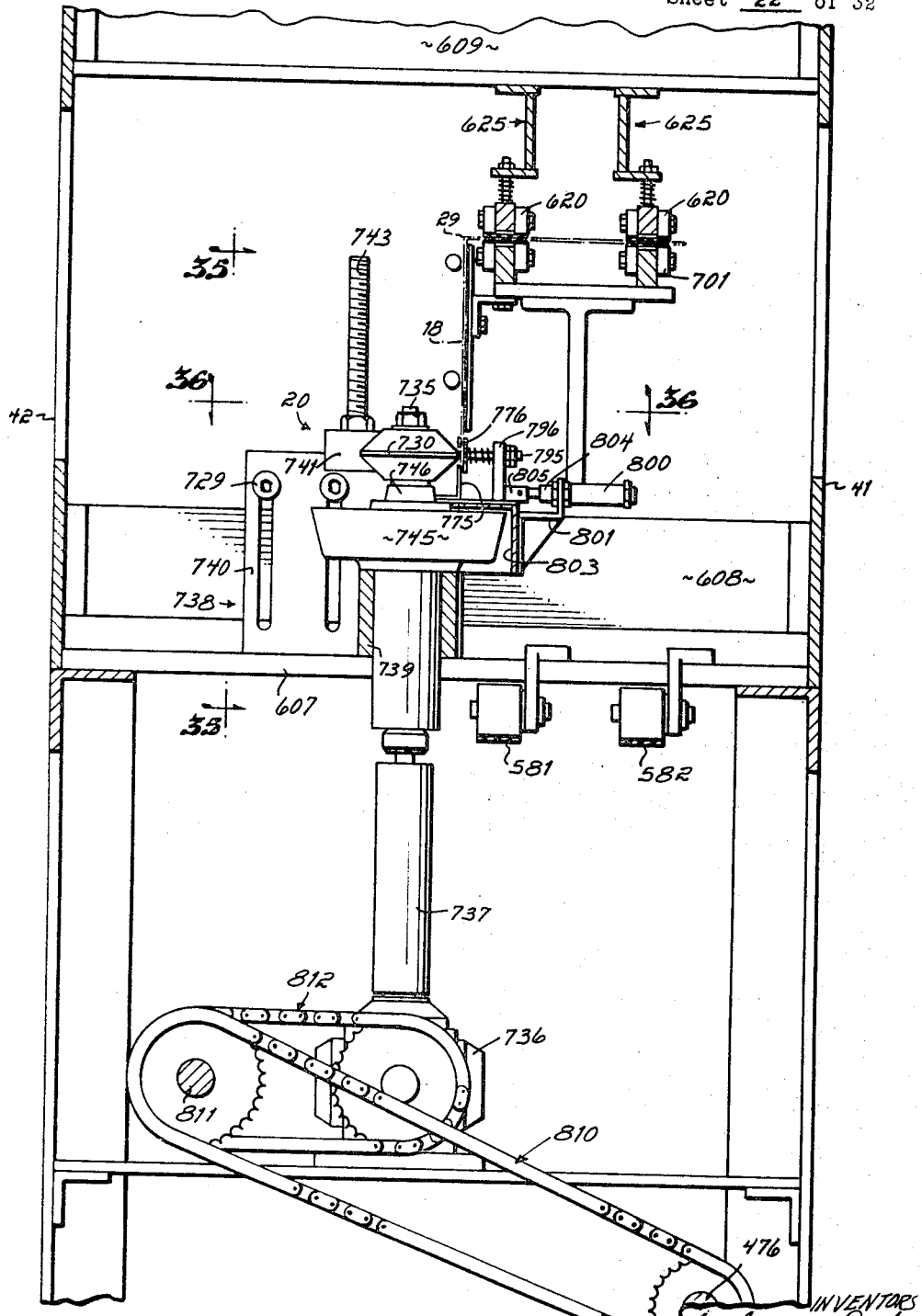

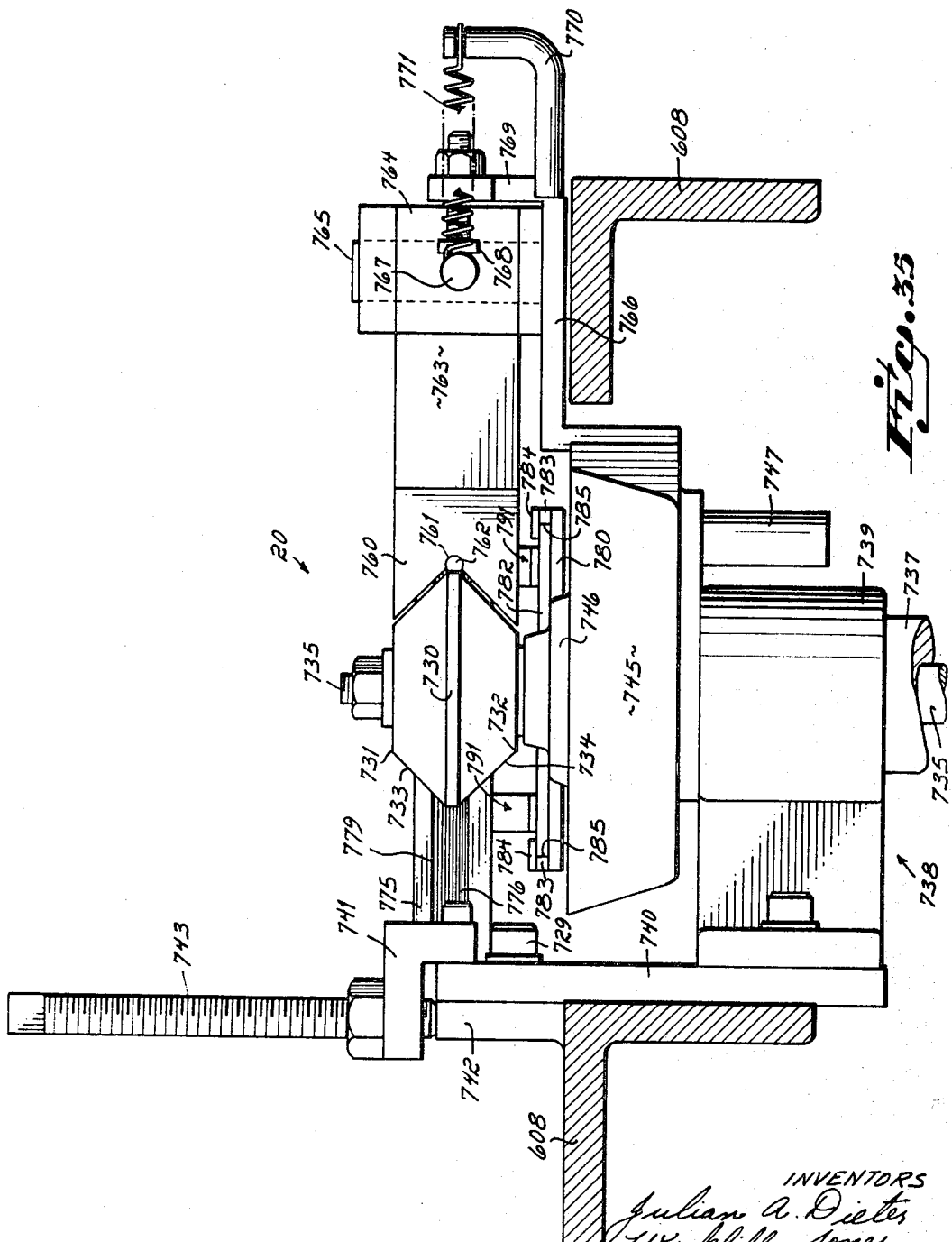

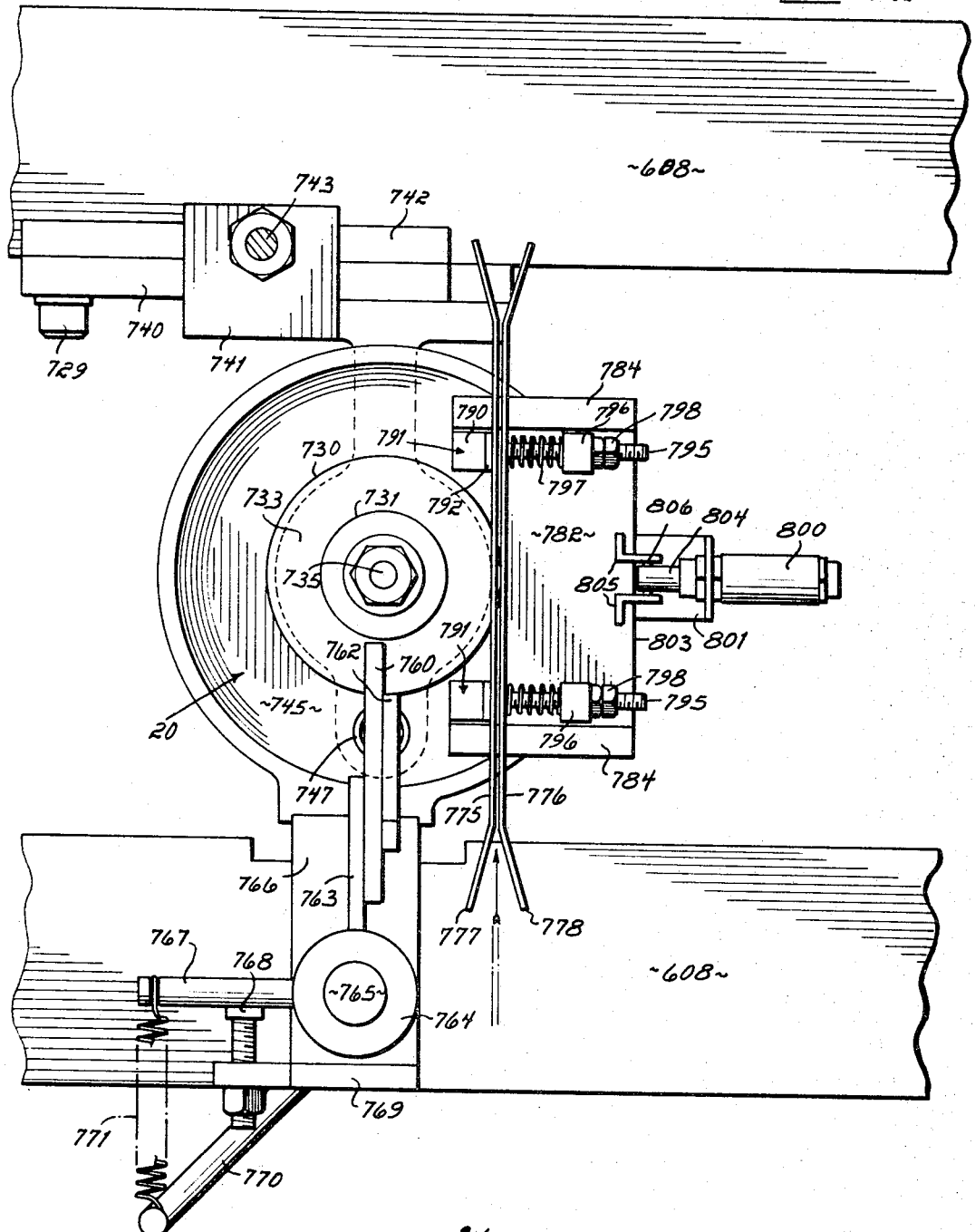

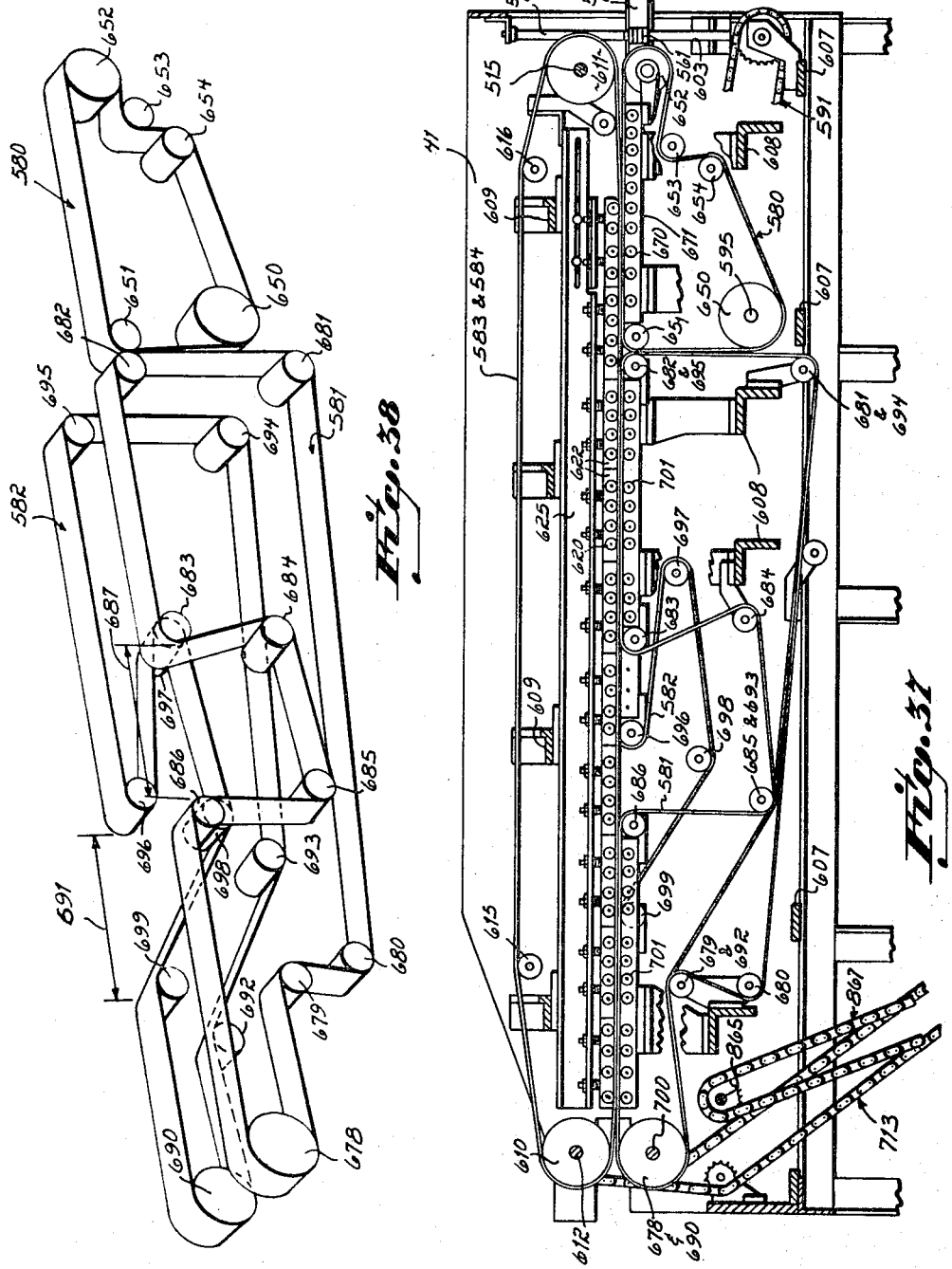

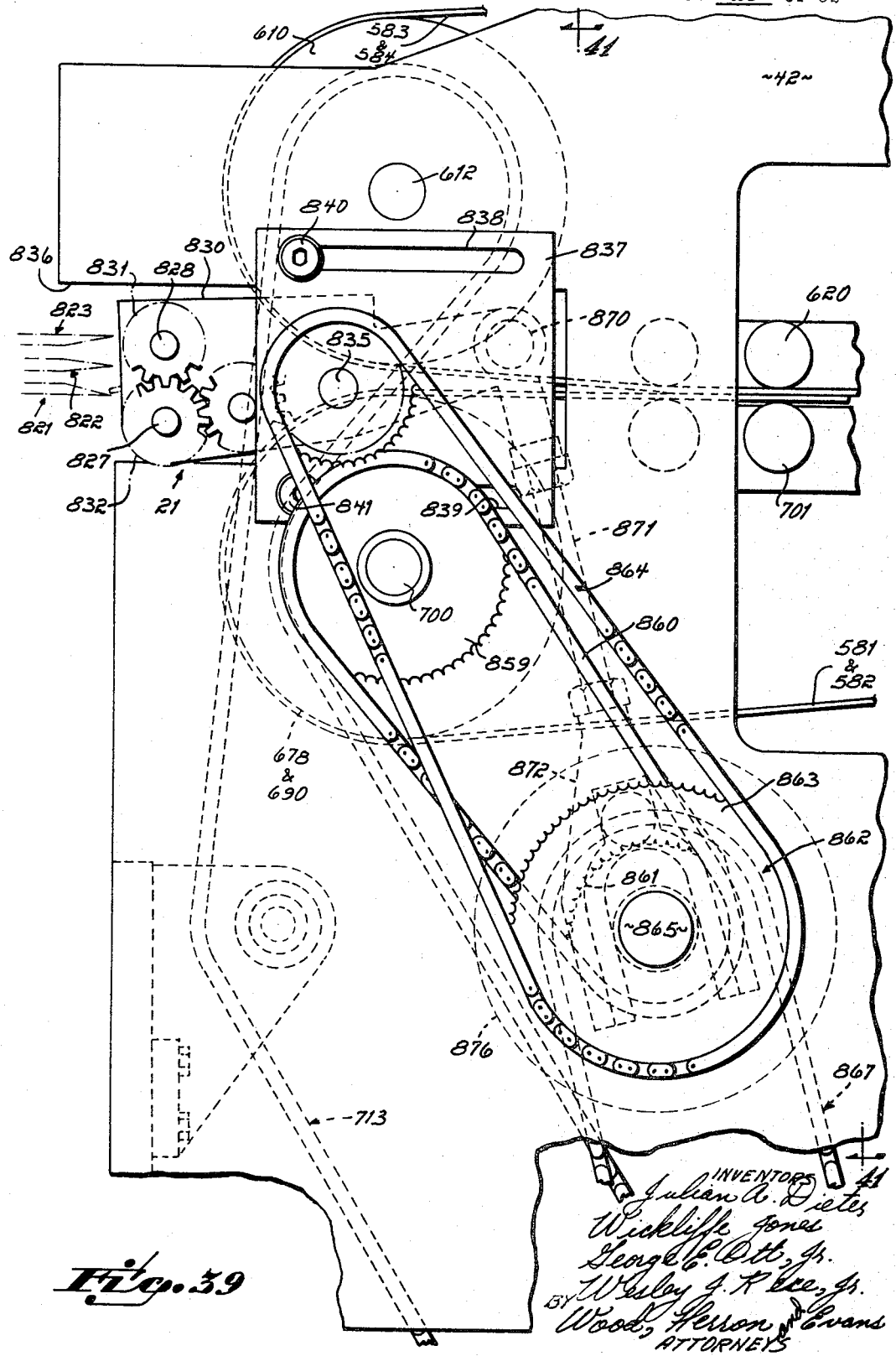

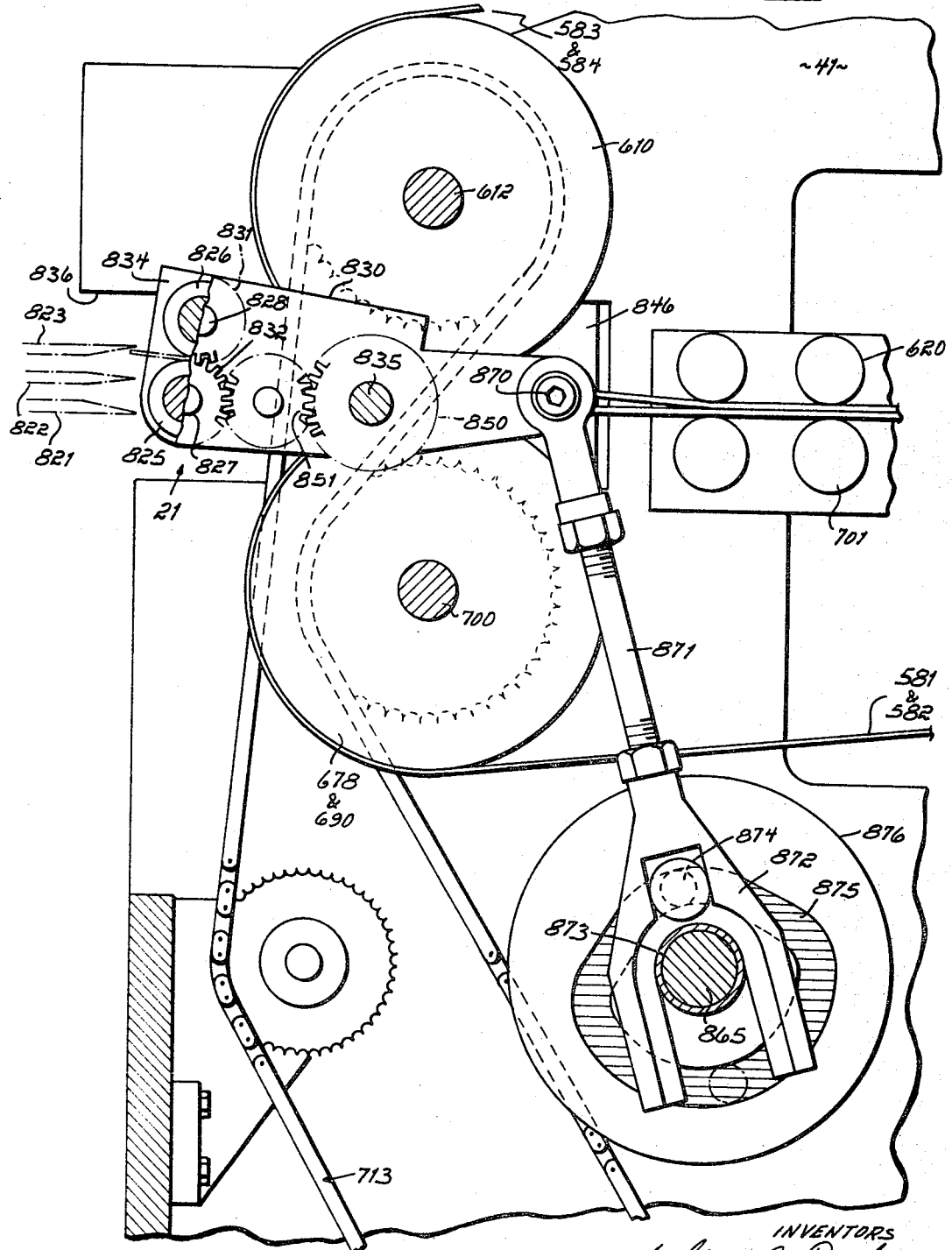

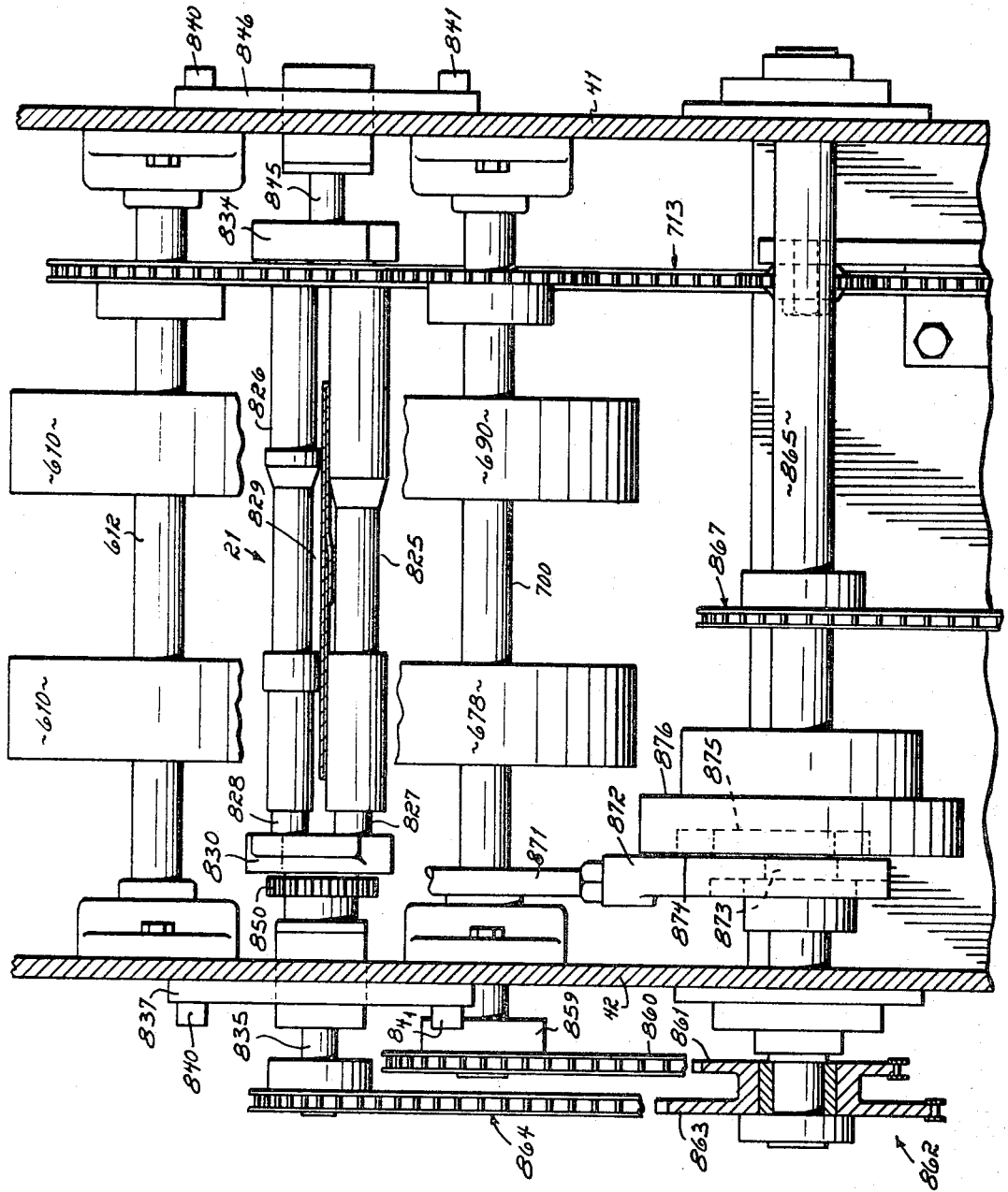

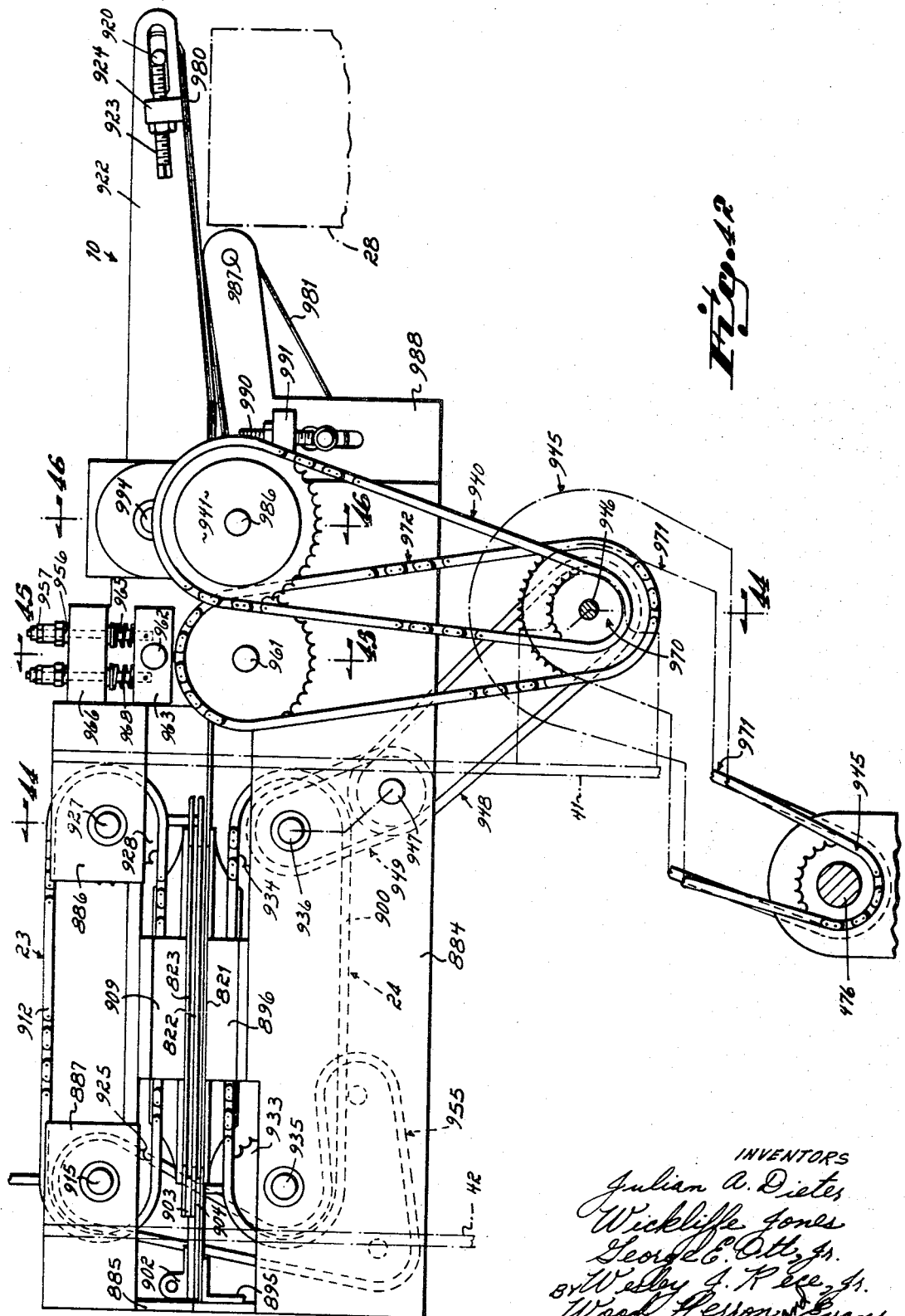

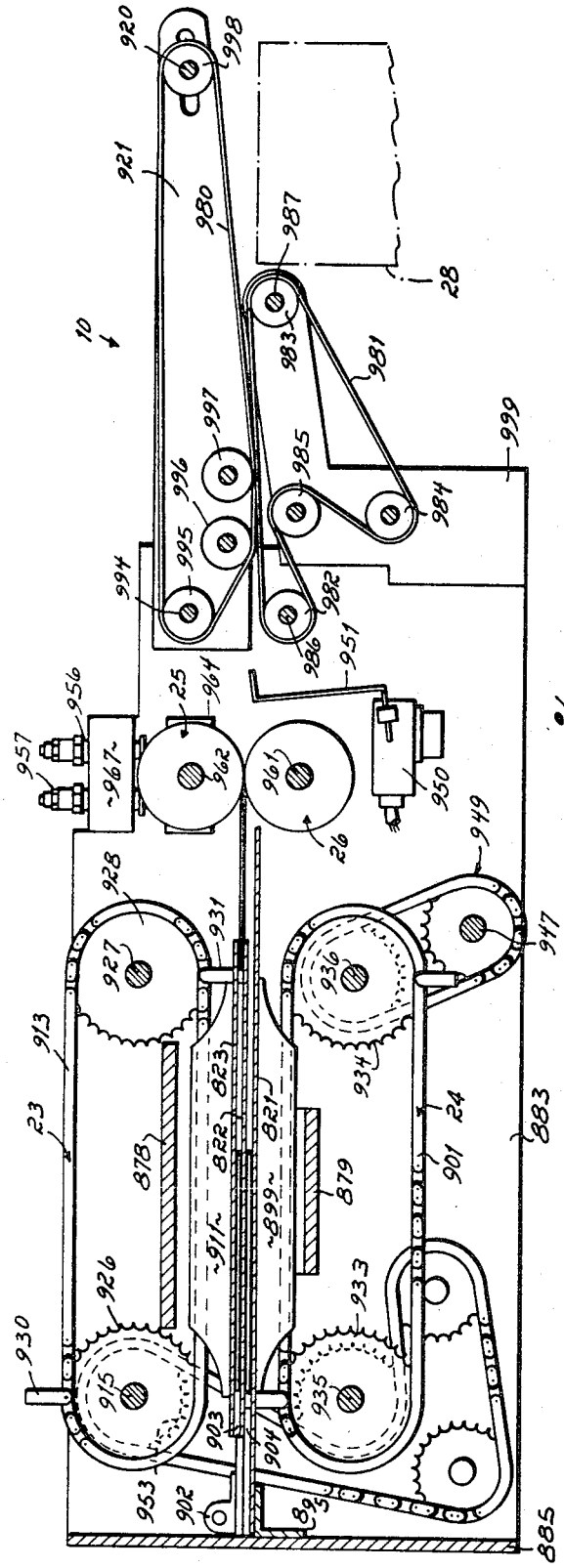

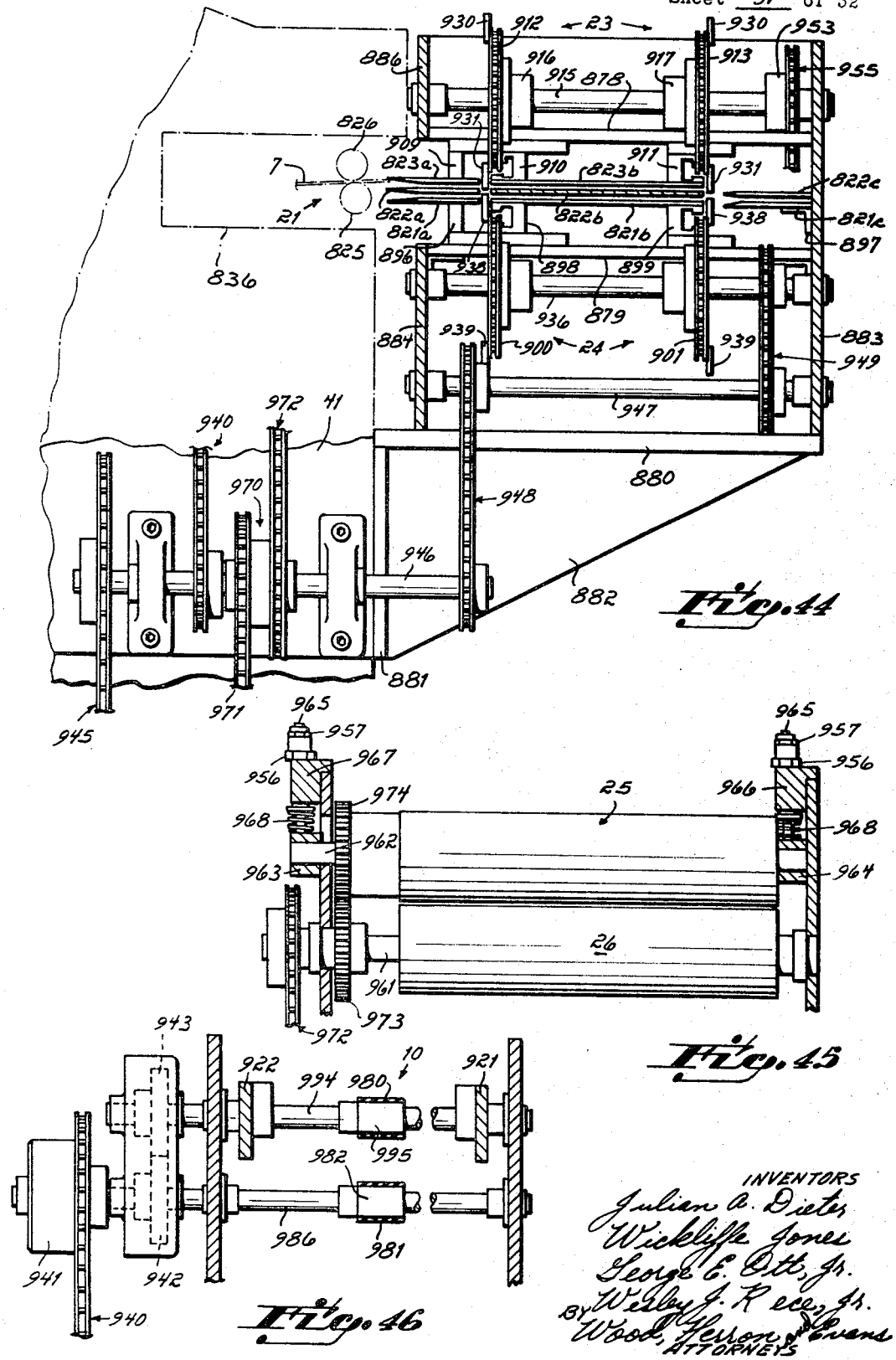

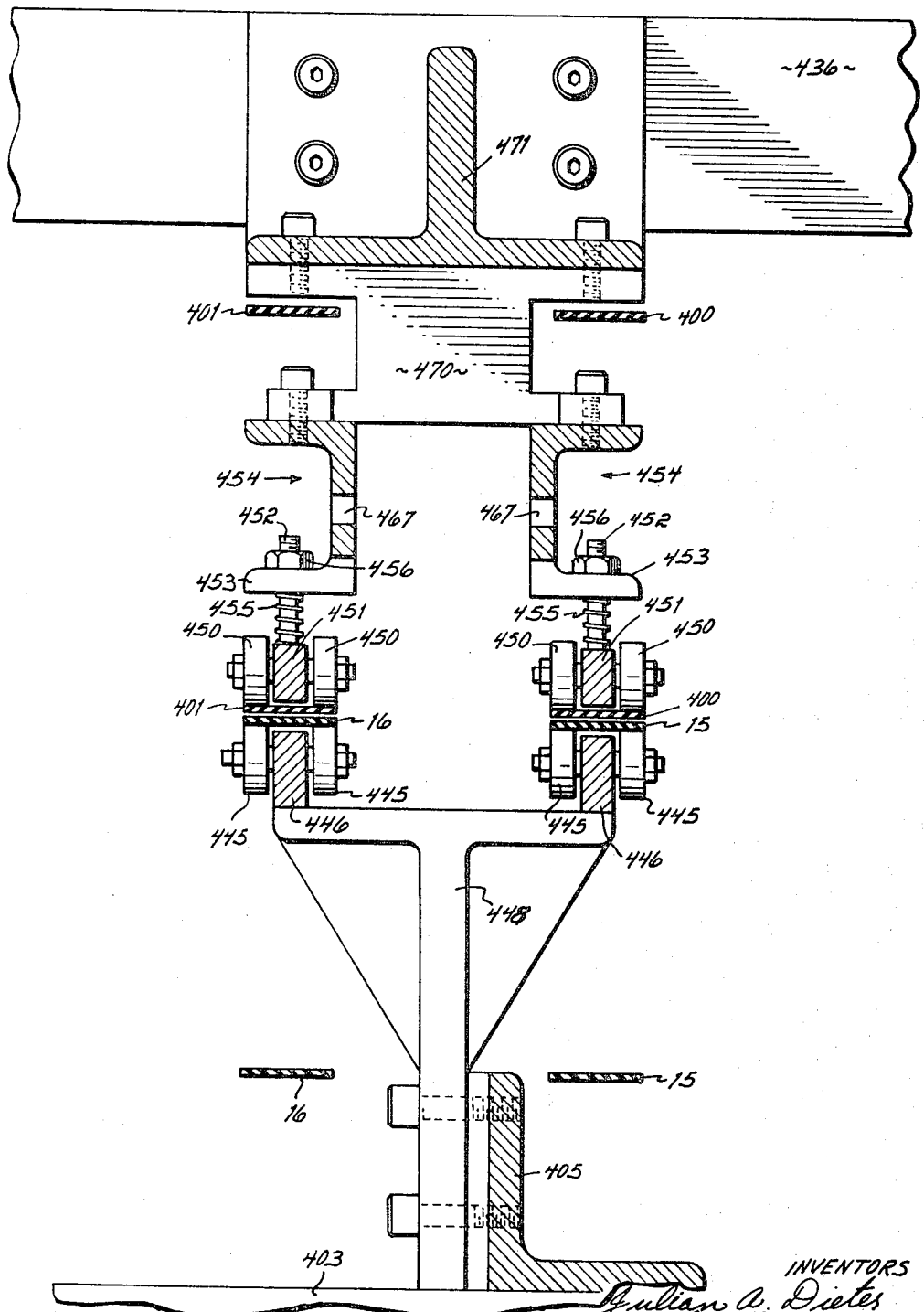

3,418,892
CARTON FOLDING AND GLUING MACHINE
Julian A. Dieter, Wickliffe Jones, and George E. Ott, Jr., Cincinnati, Ohio, and Wesley J. Rece, Jr., California, Ky., assignors to R. A. Jones & Company, Inc., Covington, Ky., a corporation of Kentucky
Filed Dec. 20, 1965, Ser. No. 514,997
21 Claims. (Cl. 93—52)

ABSTRACT OF THE DISCLOSURE

A method and apparatus for prebreaking, folding, and gluing flat paperboard or corrugated board blanks to form flat cartons ready for insertion into a carton erecting and filling machine. The flat unfolded and scored blanks are sequentially fed out of a magazine onto a first conveyor which transports the blanks along a first straight linear path of travel during which one flap of the blank is folded along a longitudinal score line. The flat blank is then transported by a second conveyor through a curvilinear path of travel of approximately a 90° arc during which the blank orientation is maintained with respect to the direction of travel of the blank and the blank remains in a flat unflexed condition. The blank is then transported by a third straight conveyor along a straight line path of travel during which adhesive is applied to one flap of the blank and another flap is folded over the glue-applied flap to form a flat folded carton. Subsequently, the flat folded carton is transported through a right angle turn during which the carton is reoriented by 90° relative to the direction of travel of the carton. The cartons are then transported along a fourth straight line linear path of travel by a fourth conveyor. As the cartons move along this fourth conveyor, a compressive force is simultaneously applied to the full length of each of the longitudinally adhered seams of the carton. The flat folded cartons are then transported into the top of a gravity feed magazine from the bottom of which cartons are sequentially fed to a fifth conveyor of a carton erecting and filling machine.

---

Figure 15:
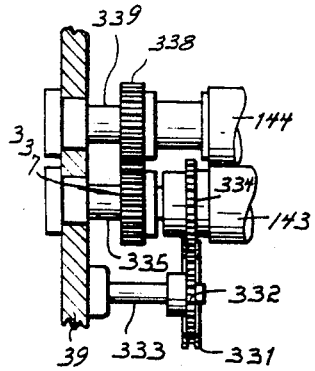

This invention relates to a method and apparatus for prebreaking, folding and gluing flat paperboard or corrugated board blanks to form flat cartons ready for insertion into a carton erection and filling machine. In order to clarify nomenclature, the term "blank" or "carton blank" is used throughout this application to refer to a cut and scored but unfolded sheet, while the term "carton" is used to refer to the flat folded "blank."

The machine of this invention is particularly adapted to supply flat folded cartons directly to a carton filling machine. Heretofore, it has been a customary practice of the industry for the flat blanks to be made up into flat cartons by the carton manufacturers and then shipped as flat cartons in corrugated cases to the user or packager who subsequently erected and filled the cartons in his plant. When this practice is followed, the manufacturer is required to pay a premium for the cartons which he could avoid if he were able to use the flat blanks rather than the flat cartons. However, most manufacturers could not heretofore justify tying up the necessary space and capital required to convert flat blanks to flat cartons in order to supply a single carton filling machine with cartons.

Even if a manufacturer could justify the cost of one of the previously available blank folding and gluing machines to supply a single carton filling machine, most manufacturers did not have properly configurated floor space available adjacent their filling machines to put one of the previously available machines in a production line with a carton filling machine. Prior to this invention, the most commonly available machines were the so-called "straight line" machines which required as much as fifty feet of straight line floor space. Very obviously, most manufacturers could not fit such a machine in their plant in a production line with a carton filling machine.

It has, therefore, been a primary objective of this invention to provide a compact machine, the configuration of which is compatible with the space normally available in a carton filling production area.

Another objective of this invention has been to provide a blank folding and gluing machine operable to supply flat folded cartons directly to a carton filling machine while maintaining independent operability of both machines so that a short stoppage of one machine has no effect upon the other. In order to accomplish this objective, a storage magazine is provided between the output end of the blank folding and gluing machine and the input end of the carton erection and filling machine. This magazine serves the dual function of imparting a time delay during which glue applied in the blank folding machine may dry before the carton is subsequently opened for filling, and simultaneously providing a backlog of flat cartons for the filling machine. It also has the advantage of avoiding the timing problem of synchronizing the blank folding and gluing machine with the carton erection and filling machine.

Still another objective of this invention has been to reduce the overall length of a blank folding and gluing machine. To this end, the machine of this invention incorporates two right angle turns, in one of which the blank alignment remains fixed throughout the turn and in the second of which the axis of the blank is altered by 90° in relation to the direction of movement as it passes through the turn. One additional benefit of this machine configuration, aside from the fact that it is more compatible with most plant layouts than a straight line machine, is that a machine operator may be centralized in a position where he is better able to observe and service both the blank folding machine and the carton filling machine.

Another objective of this invention has been to provide a new and improved conveyor for transporting a flat article, such as a carton blank or a flat carton, through a turn without losing control of the article and while maintaining the alignment of the article or carton on the conveyor.

Another objective of this invention has been to provide an improved orientation of the carton relative to the compression rolls of the machine as the carton passes through the compression rolls so as to effect adhesion of the seam without squeezing the glue from the seam.

Yet another objective of this invention has been to provide an improved and higher speed conveyor system for transporting cartons through a right angle turn while effecting a reorientation of the cartons on the conveyor. This conveyor system is operable to reorient the cartons so that they enter while traveling in the direction of the longitudinal carton axis and exit in a direction normal to the longitudinal axis of the carton. The usual practice has heretofore been to run the exit conveyor at a much greater speed than the entrance conveyor so that there is no interference of cartons at the intersection. In the absence of this interference, the exit conveyor may run at a slower speed than the entrance conveyor since the reorientation enables more cartons to fit on a given length of the exit conveyor than the entrance conveyor. However, if the exit conveyor runs slower than the entrance conveyor, some provision must be made for clearing the last carton on the exit conveyor out of the way of the following carton on the entrance conveyor. We have found that this may be accomplished by a diverter operable to divert alternate cartons onto one of a pair of different level conveyors at the intersection. These different level conveyors then merge as soon as the cartons move out of a potential interfering position. In this way, the machine may operate at higher speed than in the absence of this diverter.

Still another object of this invention has been to provide an improved self-timing vacuum control valve system which is operable to start at the same point in the machine cycle or become synchronized with the machine cycle irrespective of the time at which the signal to commence or cease feeding blanks is fed into the valve.

Still another object of this invention has been to provide a carton folding and gluing machine having an improved shingling conveyor operable to maintain a continuous stream of cartons on the shingling conveyor.

Briefly, the machine which accomplishes these objectives includes a magazine in which flat unfolded blanks are stored on edge and from which the blanks are sequentially fed. When fed from the magazine, the blanks are aligned with their longitudinal axis parallel to the direction of conveyor movement. As the blanks move along this first conveyor, one panel of each blank is folded about its score line and returned to its original flat condition, while another panel is broken downwardly about its score line and left in this condition as the blank is conveyed around a right angle turn onto a second straight line conveyor. The conveyor which effects this first right angle turn is a novel belt type conveyor which securely holds the carton blank by frictional contact while maintaining the alignment of the blank on the conveyor.

As the blanks move along the second straight line conveyor, glue is applied to a vertical flap of the blank after which the glued flap is folded beneath a top panel of the blank and another flap on the opposite side of the blank is folded over the glued flap to form a seam in the now folded and glued flat carton. This flat folded carton is then fed into a diverter which functions to locate sequential cartons on different ones of two corner conveyors. These corner conveyors then feed the cartons out in a direction normal to the direction in which the cartons were fed into the diverter so that the cartons are now aligned with their shorter transverse axis parallel to the direction of movement of the cartons. Because sequential cartons are fed through the diverter onto two different chain conveyors, each of the chain conveyors may operate at a speed approximately half of the speed which would be required if only a single chain conveyor were utilized.

Both of the chain conveyors feed the cartons into a pair of compression rolls which apply a momentary pressure to the glued seam as it passes between the rollers. From the compression rolls, the cartons are fed onto a shingling conveyor which transports the cartons out of the machine in overlapping relation. From the shingling conveyor the cartons are fed into the top of a gravity feed magazine from the bottom of which the cartons may simultaneously be fed into a conventional erecting and filling machine. The gravity feed magazine thus serves as a compact glue drying station while simultaneously providing a bank of folded cartons for the filling machine. Thus the filling machine may continue to operate even though the folding and gluing machine might temporarily cease to operate or vice versa.

One of the primary advantages which derives from the use of this blank folding and gluing machine is the ease with which folded cartons from this machine subsequently open in the carton filling machine. Heretofore, it has been the practice for the carton manufacturer to fold and glue the cartons in his plant and then ship them tightly packed in corrugated containers to the manufacturer who subsequently filled them. Flat folded cartons which have been packed and stored in corrugated containers are of course more difficult to open than freshly folded and glued cartons delivered from this machine. Thus, this invention improves the operative efficiency of the carton opening and filling machine.

Another advantage of this machine is the decreased cost of cartons realized by the carton user or packager. By folding and gluing the blanks in his own factory rather than purchasing the flat folded cartons, he saves the labor cost of a machine operator to feed the blanks into the filling machine as well as other incidental costs, such as the cost of the corrugated cases in which the folded cartons are shipped. Since carton blanks are shipped and stored on pallets rather than in corrugated cases, the packager is also able to save storage space by the use of this blank folding and gluing machine.

These and other objectives and advantages of this invention will be more readily apparent from the following description of the drawings in which:

FIGURE 1 is a perspective side elevational view, partially broken away, of the overall machine of this invention, FIGURES 2 and 2a are a diagrammatic illustration of the operational sequence of the machine of this application in combination with a carton erecting and filling machine, FIGURES 3 and 3a are a top plan diagrammatic illustration of the operational sequence of the machine of this application, FIGURE 4 is a front elevational view of the carton taken along line 4—4 of FIGURE 3 just prior to completion of the carton folding operation.

Figure 14:
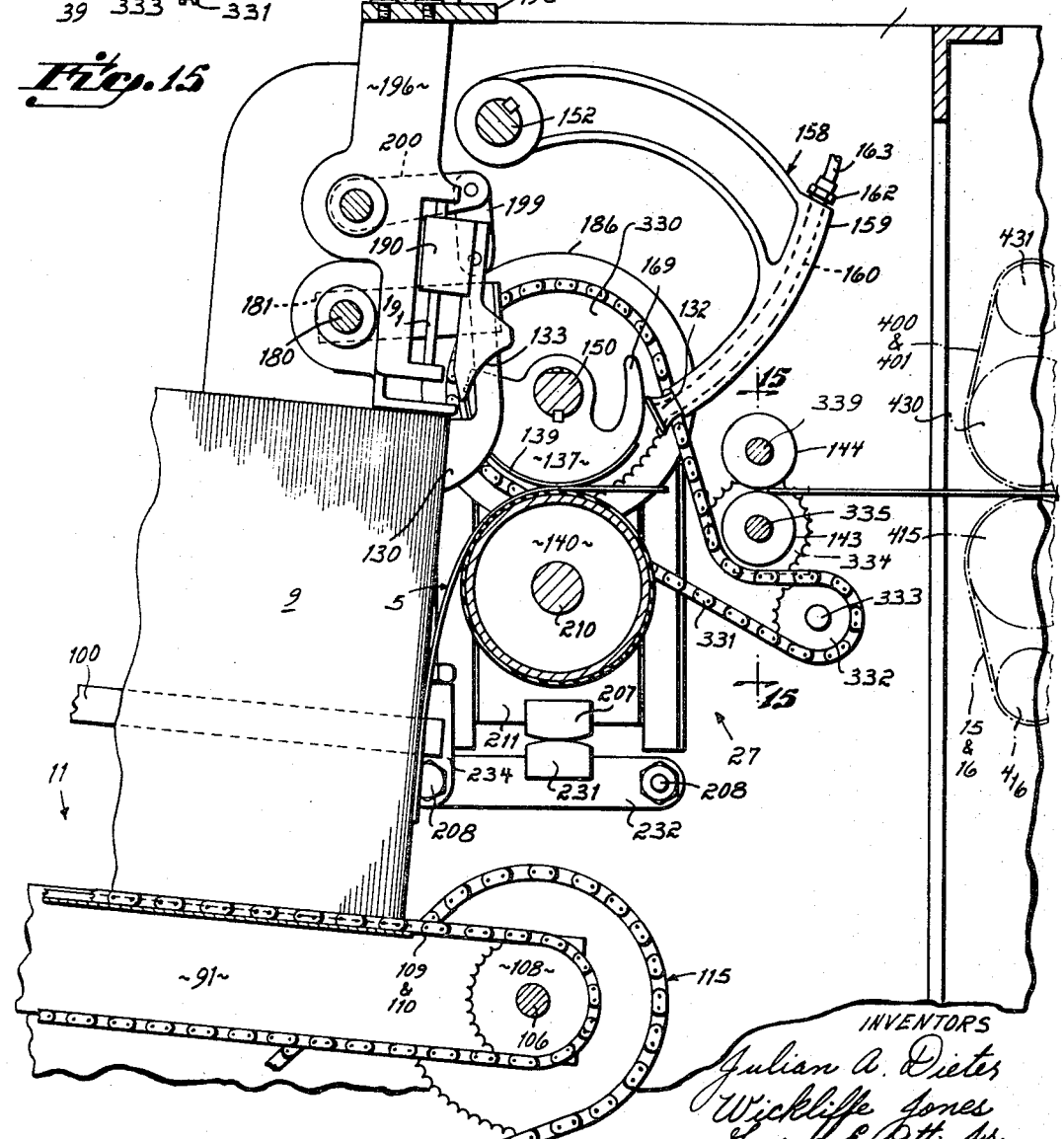
Figure 16:
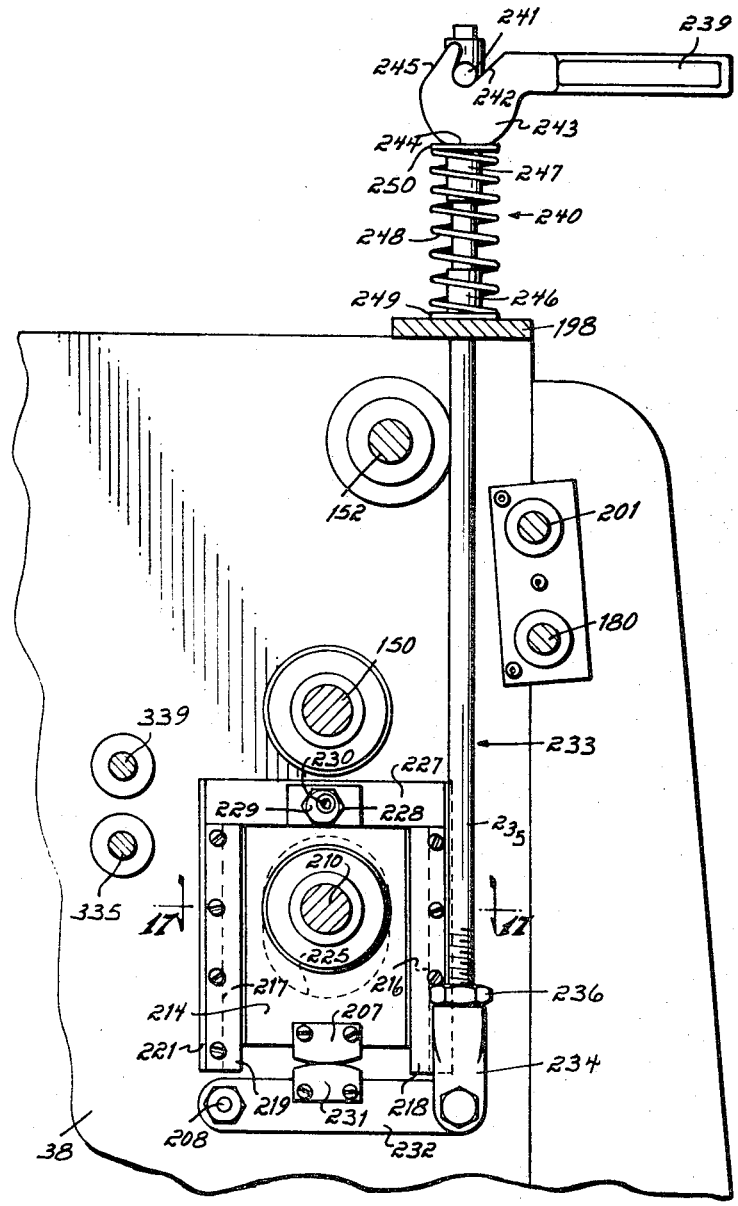
Figure 17:
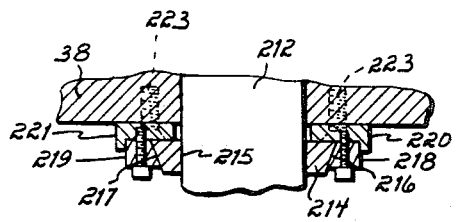
Figure 24:
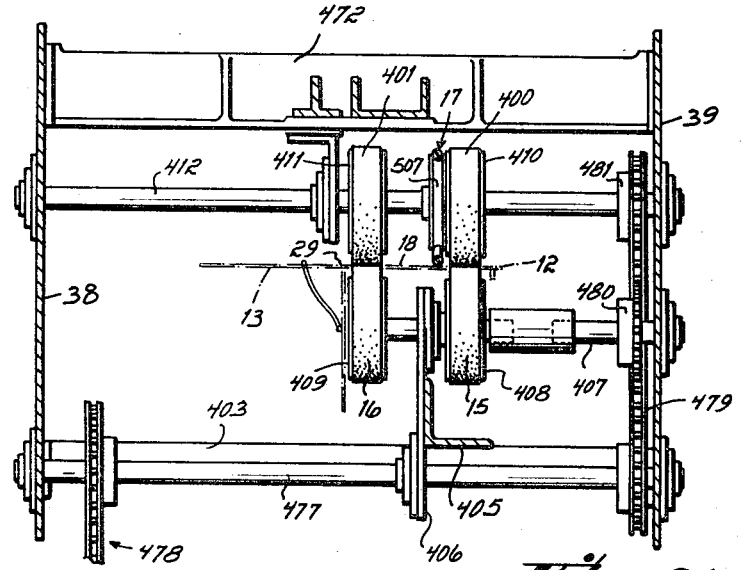
Figure 25:
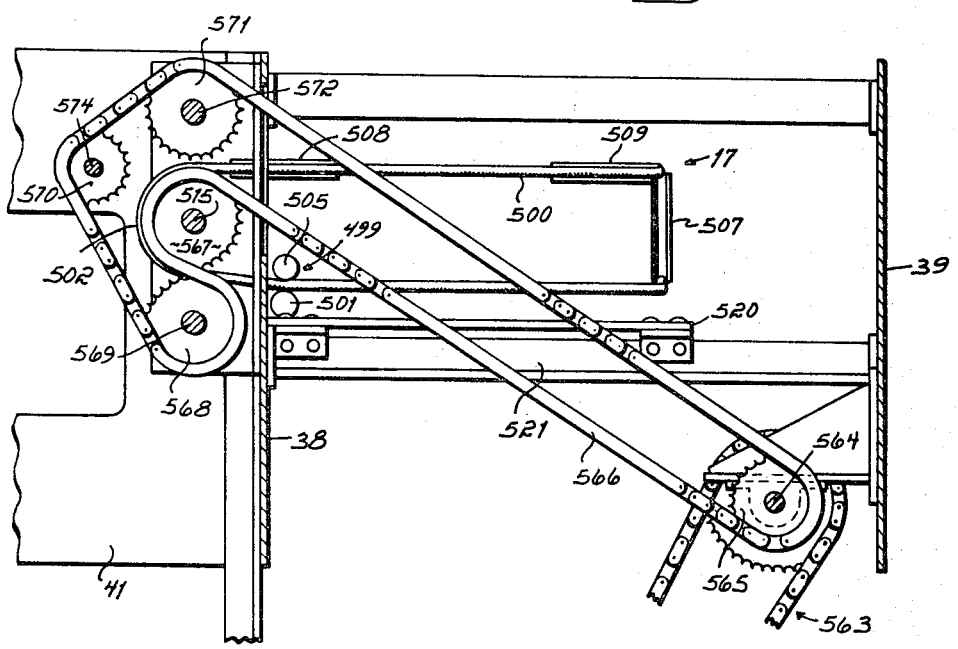
Figure 32:
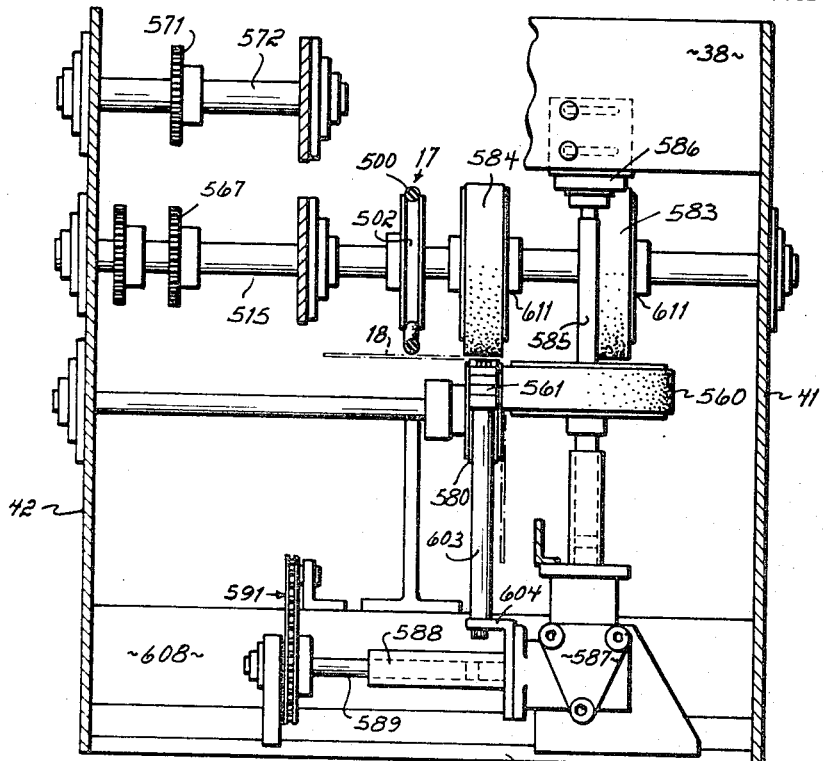
Figure 33:
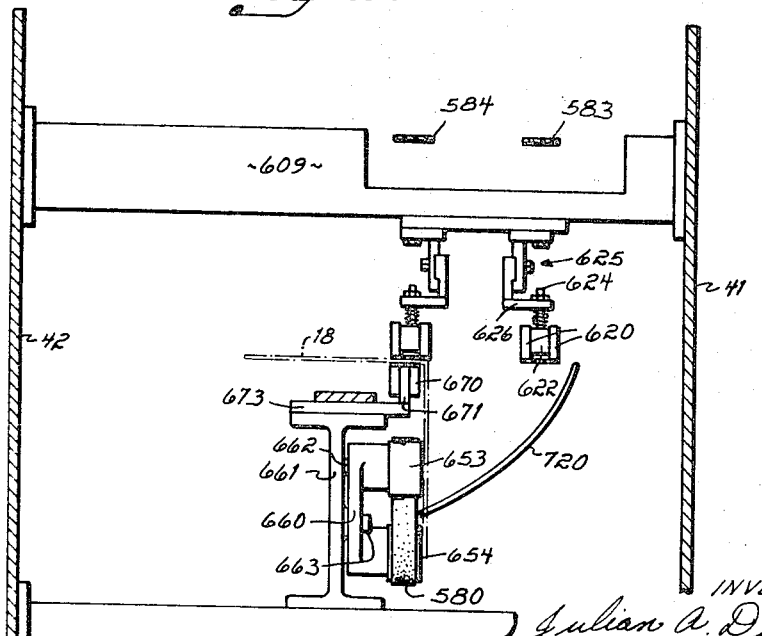

FIGURES 5 and 5a are a top plan view, partially in cross section, of the main drive motor and drive mechanism for the machine of this invention, FIGURE 6 is a side elevational view of the blank storage magazine, magazine feeder mechanism, and first linear conveyor portion of the machine, FIGURE 7 is a rear elevational view, partially in cross section, of the blank magazine feed section of the machine taken along line 7—7 of FIGURE 6, FIGURE 8 is a side elevational view of the carton storage magazine and feeder mechanism taken along line 8—8 of FIGURE 7, FIGURE 9 is a vertical, cross sectional view taken along line 9—9 of FIGURE 6 illustrating a portion of the blank feeder mechanism, FIGURE 10–13 are a sequence of vertical, cross sectional views through a portion of the carton feeder mechanism illustrating the operational sequence of the feeder mechanism to withdraw a single blank from the storage magazine, FIGURE 14 is a vertical, cross sectional view of the blank feeder mechanism taken along line 14—14 of FIGURE 9, FIGURE 15 is a vertical, cross sectional view through a portion of the blank feeder mechanism drive system taken along line 15—15 of FIGURE 14, FIGURE 16 is a vertical, cross sectional view through a portion of the carton feeder mechanism taken along line 16—16 of FIGURE 9, FIGURE 17 is a cross sectional view taken along line 17—17 of FIGURE 16, FIGURE 18 is a side elevational view of a vacuum cut-off valve of the feeder mechanism taken along line 18—18 of FIGURE 9, FIGURE 19 is a cross sectional view of a portion of the vacuum valve system taken along line 19—19 of FIGURE 9, FIGURE 20 is a cross sectional view through the distribution valve of the vacuum valve system taken along line 20—20 of FIGURE 9, FIGURE 21 is a cross sectional view through the distribution valve taken along line 21—21 of FIGURE 20, FIGURE 22 is a top plan view of the first linear conveyor and curvilinear conveyor sections of the machine taken along line 22—22 of FIGURE 6, FIGURE 23 is a vertical cross sectional view of the first linear conveyor taken along line 23—23 of FIGURE 22, FIGURE 24 is a vertical cross sectional view of a portion of the first linear conveyor taken along line 24—24 of FIGURE 22, FIGURE 25 is a front elevational view, partially in cross section, of the curvilinear belt conveyor taken along line 25—25 of FIGURE 22, FIGURE 26 is a vertical cross sectional view of the curvilinear belt conveyor taken along line 26—26 of FIGURE 22, FIGURE 27 is a top plan view, partially in cross section, of the second curvilinear belt conveyor taken along line 27—27 of FIGURE 26, FIGURE 28 is a vertical cross sectional view through the curvilinear drive belt and supporting roller mechanism taken along line 28—28 of FIGURE 27, FIGURE 29 is a side elevational view of one belt supporting roller mounting block taken along line 29—29 of FIGURE 28, FIGURE 30 is a side elevational view of the third linear conveyor portion of the machine, FIGURE 31 is a side elevational view of a portion of the drive system to the third linear conveyor, FIGURE 32 is a cross sectional view of the third linear conveyor taken along line 32—32 of FIGURE 30, FIGURE 33 is a vertical, cross sectional view through the third linear conveyor taken along line 33—33 of FIGURE 30, FIGURE 34 is a vertical, cross sectional view of the glue applicator and its associated drive system taken along the line 34—34 of FIGURE 30, FIGURE 35 is a vertical, cross sectional view of the glue applicator taken along line 35—35 of FIGURE 34, FIGURE 36 is a top plan view of the glue applicator taken along line 36—36 of FIGURE 34, FIGURE 37 is a cross sectional view of the third linear conveyor of the machine, FIGURE 38 is a perspective view illustrating the relationship of the lower conveyor belts of the third linear conveyor, FIGURE 39 is a side elevational view of the forward end portion of the third linear conveyor, FIGURE 40 is a cross sectional view of the forward end portion of the third linear conveyor, FIGURE 41 is a vertical, cross sectional view of the third linear conveyor taken along line 41—41 of FIGURE 39, FIGURE 42 is a side elevational view of the fourth linear conveyor taken along line 42—42 of FIGURE 30, FIGURE 43 is a cross sectional view through the fourth linear conveyor taken along line 43—43 of FIGURE 30, FIGURE 44 is a vertical, cross sectional view of the drive system to the chain conveyor of the fourth linear conveyor taken along line 44—44 of FIGURE 42, FIGURE 45 is a cross sectional view of the press rolls taken along line 45—45 of FIGURE 42, FIGURE 46 is a vertical cross sectional view of the shingling conveyor taken along line 46—46 of FIGURE 42, FIGURE 47 is a vertical, cross sectional view through the second linear conveyor taken along line 47—47 of FIGURE 23.

The sequential forming of a flat folded carton 7 from a flat cut and scored blank 5 is illustrated in FIGURES 2 and 2a. As may be seen in these figures, the machine of this invention is operative to feed carton blanks 5 sequentially from a stack of blanks 9 supported on edge in an infeed magazine 11. From the magazine, the blanks are fed onto a first linear conveyor. As the blanks 5 are moved forwardly on this first conveyor, a glue flap 12 is folded downwardly or "prebroken" and then returned into the horizontal plane while simultaneously, a panel 13 is folded downwardly about a fold line 14. Conventional plows are utilized in cooperation with belts 15, 16 of the first linear conveyor to make these two initial folds as is explained more fully hereinafter.

In order to shorten the overall length of this blank folding and gluing machine, the blank is next transported through a 90° turn while its longitudinal centerline and its longitudinal fold lines remain parallel to the direction of movement of the cartons. A second curvilinear conveyor indicated generally by the numeral 17, is utilized to transport the carton through this first turn.

After passing around the first turn or through the curvilinear conveyor 17, the carton is placed upon a third linear belt type conveyor. As the carton is transported forwardly on this third linear conveyor, a side panel 18 is folded downwardly, while simultaneously the previously downwardly folded panel 13 is plowed upwardly into the horizontal plane. The purpose of folding the panel 13 downwardly and then returning it into the horizontal plane is to "prebreak" the carton about the fold line 14 so that when subsequently utilized to form a completely erected carton, the carton will be easier to open than if the carton had not been "prebroken."

As the carton continues to move along the third linear conveyor, it moves past a glue applicator wheel, indicated generally by the numeral 20, which applies a strip of glue to the downwardly folded glue flap 12. After having had glue applied to the flap 12, the panel 18 and attached glue flap 12 is folded or plowed beneath the side panel 13. This is perhaps best illustrated in FIGURE 4. The side panel 19 is next plowed down into the vertical plane and subsequently beneath the side panel 13 so that it overlaps the glue flap 12. At this point, the blank may be referred to as a carton since it now has one longitudinal glued and overlapped seam.

The flat folded carton is next transported through a carton diverter 21 located at the end of the third linear conveyor and operable to move sequential cartons on the third linear conveyor onto a different one of a pair of vertically spaced chain conveyors of a fourth linear conveyor. For purposes of the diagrammatic illustration of FIGURE 2a, diverter movement is indicated by the arrow 22.

It will be noted that the fourth linear conveyor is located in the same general horizontal plane as the third linear conveyor but that it transports the cartons in a direction generally normal or perpendicular to the direction of movement of the cartons on the third linear conveyor. Thus, the carton orientation relative to the direction of movement is changed by 90° as the cartons are transferred between the third and fourth linear conveyors.

The purpose of the diverter and the cooperating vertically spaced chain conveyors 23, 24 is to alleviate the problem of transporting the last carton on the fourth linear conveyor out of an interfering position in front of the following carton on the third linear conveyor before the following carton starts onto the fourth linear conveyor. This problem may be better visualized in terms of actual dimensions. Assume that the cartons are spaced two inches apart on the third linear conveyor and that the flat folded cartons are six inches in width. In such a case and in the absence of the diverter, the fourth linear conveyor would be required to move the carton six inches during the same time interval that the third linear conveyor moved the following carton two inches if interference was to be avoided.

By utilizing the diverter and a pair of vertically spaced conveyors for transporting the cartons out of the corner, the speed at which the fourth linear conveyor must operate may be substantially reduced. This is particularly critical when it is considered that the machine is designed to handle paperboard blanks and cartons which do not have a great deal of inherent rigidity and which are subject to tearing or buckling in the machine.

From the pair of vertically spaced conveyors 23, 24 the cartons are passed between a pair of glue compression or press rolls 25, 26. Since the cartons are staggered on the two chain conveyors 23, 24, there is no problem of interference as the cartons enter between the press rolls 25, 26 from the two chain conveyors.

It will be noted that the longitudinal axis of the compression rolls is located parallel to the glued seam when the cartons pass between the press rolls. Because of this orientation, the press rolls impart an instantaneous pressure to the glued seam of the carton rather than rolling down the full length of the glued seam. Thus there is no tendency for the glue to build up on the rearward side of the nip between the rolls in the carton seam and subsequently be deposited as a drop of glue between two unglued panels of the carton.

From the pressure rolls, the cartons pass onto a shingling conveyor 10. This conveyor is located slightly below the horizontal plane of the nip of the pressure rolls 25, 25 and is operated at a speed which results in each carton on the shingling conveyor partially overlapping the carton immediately in front of it. As a consequence, all of the cartons are overlapped or "shingled" on this conveyor.

While the cartons are transported along the slowly moving shingling conveyor, glued seams are given a change to dry before the cartons are deposited in the open upper end of a gravity feed storage magazine 28. A relatively large bank of several hundred cartons is preferably stored in this magazine 28 from which cartons are directly fed into a conventional carton erecting and filling machine. This latter machine operates to open the carton automatically as it is transported along a linear conveyor system and to fill the carton with an article.

The carton erecting and filling mechanism or machine forms no part of the invention of this application and has only been illustrated diagrammatically in FIGURE 2a in order to better explain the environment of use of the invention of this application. A complete disclosure of one type of carton erecting and filling mechanism which is suitable for use with the machine of this invention may be found in U.S. Patent No. 3,333,514, filed Mar. 3, 1964, and assigned to the assignee of this application.

*Storage magazine and feed mechanism*

Referring now to FIGURES 6–8, the feed magazine 11 is operable to supply cartons on edge up to the carton feeder mechanism 27 (FIGURE 14). To accommodate different sizes and types of cartons blanks in the magazine, it is tiltable about a horizontal axis as well as being vertically adjustable. For this reason, it is supported upon a pair of transverse frame channels 45, 46 which are in turn welded or otherwise secured through and between frame side plates 38, 39. These plates 38, 39 are mounted upon a frame base 37. The downstream channel 46 supports a pair of vertical brackets 47, 48 between which extends a magazine pivot shaft 49. The upstream or rearward one of the transverse channels 45 similarly supports a pair of spaced vertical support brackets 50, 51. Each of these latter brackets 50, 51 has an arcuate slot 52, therein, the radius of which is equal to the distance between the slot and the pivot shaft 49.

A pair of magazine support channels 53, 54 extend rearwardly from and are pivotally attached to the pivot shaft 49 adjacent each of the brackets 47, 48 so as to enable the height of the rear portion of each of the channels 53, 54 to be controlled by a pair of bolts 55. Each of these bolts 55 extends through the arcuate slot 52 of one of the brackets 50, 51 and is threaded into a threaded aperture in one of the channels 53, 54. By loosening the bolts 55 and moving the rear portion of the channels 53, 54 upwardly or downwardly, the channels 53, 54 may be pivoted about the pivot shaft 49 to change their angle of inclination. The channels may then be secured in an adjusted position by the bolts 55.

To enable the magazine to be lifted vertically, a pair of vertical bars 43, 44 are adjustably mounted upon each of the support channels 53, 54. Each of these bars is secured to the channel by a nut and bolt 57, 58 which extends through an aperture of the channel and an aligned vertical slot 59, 60 of the bar. A threaded adjustment nut 62, 63 is secured to each of the bars 43, 44 respectively by a bracket 64, 65.

Extending transversely between the channels 53, 54, adjacent the rearwardmost end of each of the channels is an adjustment shaft 66. This shaft 66 has a handle 67 keyed to one end and accommodates a pair of bevel gears adjacent both ends of the shaft. Each of these bevel gears 68, 69 drives a bevel gear 70, 71 which is keyed to a vertically extending screw 72, 73 respectively. The lower end of each of these screws is supported from a lateral support bar 74, 75 welded or otherwise secured to the channel members 54, 53 respectively. At the upper end, each of the screws 72, 73 extends through one of the threaded nuts 62 so that rotation of the handle 67 results in rotation of the screws and axial movement of the nuts 62.

In order to synchronize movement of the forwardmost vertical bars 43 with movement of the vertical bars 44 upon rotation of the handle 67, a chain and sprocket drive 78 is provided between the adjustment shaft 66 and a forward drive shaft 79 which extends between and is supported by the forward ends of the channels 53, 54. This chain and sprocket drive includes a sprocket 80 nonrotatably keyed to the adjustment shaft 66 and a sprocket 81 keyed to the shaft 79 with an endless chain 82 extending therebetween. A bevel gear 83, 84 is attached to each end of the shaft 79. Each of these bevel gears meshes with a bevel gear 85, 86 of a vertical screw 87, 88, respectively. These screws in turn extend through the nuts 63 so that rotational movement of the handle 67, and thus of the shaft 79 resulting from the drive through the chain and sprocket drive 78, results in rotation of the vertical screws 87, 88 and thus axial movement of the nuts 63 relative to the screws 87, 88. Since the nuts 63 are secured to the vertical bars 44, axial movement of the nuts results in vertical movement of the bars 44.

The blank storage and feed magazine 11 is mounted for vertical movement on top of the vertical bars 43, 44. To this end, longitudinal magazine support base channels 90, 91 are welded or otherwise secured to the tops of each pair of vertical support bars 43, 44. To rigidify these longitudinal supports, transverse channels 93 extend between and are secured to the channels 90, 91. In addition to the channels 90, 91, the vertical bars 44 also support a transverse bar 94 which is secured to the bars 44 by corner brackets 95. This last transverse bar 94 supports a motor 96 as well as a gear reduction unit 97 used to drive a chain conveyor of the storage and feed magazine 11 as is more fully explained hereinafter.

The blank storage section of the magazine 11 is defined by bottom support rails 98, 99 as well as side guide rails 100. The bottom guide rails 98, 99 are supported upon the transverse bars 93 to which they are welded or otherwise rigidly secured. The side guide rails are adjustably secured to the base channels 90, 91 by intermediate vertical channels 101, 102 and 103, the vertical channels 101 and 102 being secured to the top of the base channel 90 and the vertical channel 103 being secured to the base channel 91. Each of the guide rails is in reality a friction rail engageable with the side of the cartons stored in the magazine (see FIGURE 7). One of the guide rails is connected directly to the channel 103 and two other rails are connected to the channels 101, 102 by generally Z-shaped brackets 105.

At the forward end, each of the channels 90, 91 supports a conveyor drive shaft 106 which extends between and is journaled in the channels. Similarly, an idler shaft 107 is rotatably journaled within and extends between the rear portions of the channels 90, 91. Both of these shafts support sprockets 108 of a conventional friction feed, chain type conveyor. As may be seen most clearly in FIGURE 7, the top stretches of the chains 109, 110 support the carton blanks which are stored on edge within the magazine. These stretches are reinforced by and ride within guide rails 111, 112.

The chain conveyors 109, 110 are driven by a chain and sprocket drive 115 from the output shaft of the gear reduction box 97 which is in turn driven by the electric motor 96. This motor operates independently of the main drive to the remainder of the machine and so long as it operates, continues to feed blanks 5 forwardly in the magazine, whether or not blanks are being extracted by the carton feeder mechanism. In the event that the blanks are not fed from the magazine at the rate at which they are being moved forwardly by the chain conveyors 109, 110, the chains slide relative to the blanks.

The feed of blanks from the magazine is controlled by the main drive shaft of the machine such that the feed is always synchronized with the other functions of the machine. Referring particularly to FIGURES 5 and 6, it will be seen that the main drive motor 120 of the machine is operable to drive a gear reduction unit 121 through an arrangement of pulleys and V-belts indicated generally by the numerals 122 and 123. The gear reduction unit has a pair of output shafts 124, 125. The shaft 124 is operable through a pair of bevel gears 126 to drive the main timer shaft 127 of the carton blank feeder mechanism.

Before the feeder mechanism is explained in detail, its operation should first be appreciated. Referring to FIGURES 9–14, it will be seen that in order to extract the forwardmost carton blank from the magazine, a pair of spaced hold down fingers 130, 131 are first moved into engagement with the top edge of the forwardmost carton blank 5 in the magazine 11. While the fingers remain in engagement with this blank, a vacuum cup 132 is moved between the hold down fingers and into engagement with the blank 5. Suction is then applied to the vacuum cup 132 and it is moved forwardly to bow that section of the blank 5 located between the two hold down fingers 130, 131. While the blank is held in this bowed condition, a spade 133 is moved downwardly between the bowed portion of the forwardmost blank and the blank next behind it. This spade then operates to hold the blank in the bowed condition when the vacuum is subsequently released and the vacuum cup 132 and hold down fingers 130, 131 are moved in a forward direction away from and out of contact with the now bowed and separated forwardmost carton blank in the magazine. Thereafter, segment wheels 137, 138 located immediately adjacent the hold down fingers (see FIGURES 9 and 13) enter behind the now separated forwardmost blank and force it downwardly toward a feed roll 140. Thereafter, other segment wheels 141, 142 spaced further outwardly or transversely away from the spade 133 engage the partially separated forwardmost blank and continue to move its top edge downwardly toward the feed roll 140. Subsequently, still other segment wheels spaced even further outwardly or transversely from the spade 133 engage the carton and progressively force the upper transverse edge of the carton down into engagement with the feed roll 140. In other words, the timing of the segment wheels is such that they sequentially engage the forwardmost cartons in the magazine, the sequence of engagement being from the spade 133 transversely outwardly so that the segment wheel which is spaced furthest from the spade 133 or the hold down fingers 131, 132 is the last to engage the blank. Thereafter, circular rubber-coated sections 139 of the segment wheels cooperate with the feed roll 140 (see FIGURE 14) to feed the blank forwardly into a second pair of feed rolls 143, 144. This latter pair of feed rolls then feeds the cartons into the first linear belt conveyor.

Referring to FIGURES 7 and 8, it will be seen that the timer shaft 127 of the feeder mechanism 27 is operable to drive a main shaft 150 of the feeder mechanism through a chain and sprocket drive designated generally by the numeral 151. Simultaneously, the timer shaft 127 imparts oscillatory motion to a suction cup control shaft 152 through an eccentric pin 153 attached to a sprocket 154 of the chain and sprocket drive 151. This pin is connected by a crank arm 155 to a crank 156 which is keyed to the shaft 152. Therefore, rotation of the timer shaft 127 results in rotation of the main shaft 150 and oscillation of the suction cup control shaft 152.

As may be seen most clearly in FIGURE 7, both the main shaft 150 of the feeder mechanism 27 and the suction cup control shaft 152 extend transversely between the side frame members 38, 39 and are rotatably journaled therein. Referring now to FIGURE 14, it will be seen that the suction cup 132 is mounted upon one end 156 of a generally V-shaped bracket 158 which is keyed to the shaft 152 at its other end. The arm 159 of the bracket 158 which supports the suction cup 132 has a central bore 160 which communicates or connects the interior of the suction cup 132 with a standard nipple or hose fitting 162 mounted upon the bracket 158. This fitting 162 in turn is connected by a hose 163 to a suction control valve system as is more fully explained hereinafter.

Referring now to FIGURES 9 and 14, it will be seen that each of the segment wheels 137, 138, 141 and 142 is keyed to the main shaft 150 so that these segment wheels rotate with the shaft 150. Each segment wheel includes a generally semicircular section 139 from which extends a long nose section 169. As viewed in FIGURE 14, the segment wheel rotates in the counterclockwise direction so that the long nose 169 enters behind the first blank 5 in the magazine and the blank immediately behind it and forces the top of the first blank downwardly against the feed roll 140. Thereafter, a rubber peripheral covering 139 on several of the segment wheels engages and cooperates with the feed roll 140 to feed the blank 5 from the magazine and into the nip of the feed rolls 143, 144.

Referring to FIGURES 9, 10 and 12, it will be seen that the hold down fingers 130, 131 are connected to an oscillatable control shaft 180 by a pair of connector arms 181, 182. These arms 181, 182 are keyed to the control shaft 180 so that upon oscillation of the shaft 180, the lower ends of the fingers 130, 131 are movable between a position in which they engage the upper central portion of the forwardmost carton blank in the magazine and a withdrawn position in which they are out of engagement with the forwardmost blank and above the path of movement of the carton blank as it is conveyed out of the magazine.

Referring still to FIGURES 9 and 10, it will be seen that the shaft 180 extends between and is rotatably journaled within the side frame plates 38, 39. At one end, the shaft 180 has a crank arm 183 keyed thereto and extending generally radially from the shaft 180. A roller 184 is mounted upon the outer end of this crank arm so as to fit within and follow a cam track 185 of a rotary cam 186. This cam 186 is non-rotatably keyed to the main shaft 150 of the feeder mechanism so that rotation of the main shaft 150 results in vertical displacement of the cam follower roller 184. Thus rotation of the main shaft 150 of the feeder mechanism results in rotation of the rotary cam 186 and oscillatory movement of the hold down finger control shaft 180. Oscillation of the shaft 180 in turn imparts an oscillatory movement to the hold down fingers 130, 131.

Referring now to FIGURES 9, 11 and 13, it will be seen that the spade 133 is vertically reciprocable from an upper position (FIGURE 11) in which the spade is out of engagement and above the plane of the top of the blanks to a lower position (FIGURE 13) in which it contacts and holds the bowed forwardmost carton blank away from the blank immediately behind it. The spade 133 is generally wedge-spaced and is secured to a vertically reciprocable control block 190. This block 190 has a pair of vertical apertures through which extend a pair of vertical guide rods 191, 192. These guide rods 191, 192 are in turn fixedly secured to the frame of the machine by a pair of vertical support bars 196, 197. The bars 196, 197 are welded to a transverse overhead bar 198 which extends between and is welded to the top of the side frame plate 38, 39.

Vertical reciprocation of the spade and its attached block is controlled by a link 199 pivotally secured at its lower end to the spade 133 and at its upper end to the outer end of a crank arm 200. This arm is keyed to an oscillatable spade control shaft 201. Oscillation of the shaft 201 is controlled by a crank arm 202 which is keyed to the shaft 201 and has a roller 203 mounted on its outer end. The roller 203 rides within a trackway 204 of a rotatable cam 205 which is mounted upon and keyed to the main control shaft 150. Thus, rotation of the shaft 150 results in rotation of the cam 205 such that the cam follower roller 203 is caused to be vertically displaced within the trackway. Vertical reciprocation of the cam follower 203 results in oscillatory movement of the shaft 201 so that the spade 133 and its connected slide block 190 are caused to reciprocate over the guide rods 191, 192.

Since all of the movements of the component elements of the feeder mechanism are tied to and controlled from the main shaft 150, they may easily be synchronized to effect the sequence of operation heretofore described.

As may be seen in FIGURE 9, the feed roll 140 is mounted upon a transverse shaft 210, one end of which is journaled within a slide block 211 and the opposite end of which extends through a slide block 214 and has a drive gear 213 keyed thereto. Conventional bearing blocks 212 rotatably support the shaft 210 in the slide blocks 211 and 214. Drivingly engaged with the gear 213 is a gear 209 which is keyed to the main control shaft 150 of the feeder mechanism 27.

The slide blocks 211 and 214 are vertically movable so as to enable the shaft 210 and connected feed roll 140 to be lowered in the event that a carton should jam between the segment wheels and the feed roll 140. Both slide blocks 211 and 214 are similarly mounted upon the side frame plates 39 and 38 respectively. Therefore, only slide block 214 will be described in detail herein, although it should be appreciated that an identical assembly supports the opposite end of the shaft 210.

Referring to FIGURES 9, 16 and 17, it will be seen that the slide block 214 is generally rectangular in shape and includes a circular aperture 215 through which the bearing block 212 extends. The vertical sides 216, 217 of the slide block 214 are beveled and mate with beveled sides of slide rails 218, 219 respectively. The rails 218, 219 are bolted to spacer rails 220, 221 respectively, such that each side rail 218, 219 and connected spacer rail 220, 221 cooperates to define a slideway within which the slide block 214 is vertically movable. The spacer rails 220, 221 are bolted to the side plate 38 of the frame by countersunk screws 223.

To facilitate vertical movement of the bearing block 212 relative to the frame side plate 38, the bearing block 212 extends through an oblong aperture 225 in the frame side plate 38. The bearing block 212 is held in the frame by a thrust plate 224 which is in turn held in place by adjustment screws 226 which extend through threaded apertures of a side plate 222.

In order to adjust the clearance between the feed roll 140 and the segment wheels 137, 138, 141, and 142, an eccentric adjustment stop ram 228 is mounted over the slide block 214 in a top rail 227 which extends over the slideways and is bolted to the side frame plate 38. This eccentric cam 228 is mounted within an aperture in the top rail 227 and is secured in an adjusted position by a bolt 230. By rotating the eccentric cam 228, the eccentric portion 229 of the cam may be set so as to serve as a height stop for the slide block 214.

A wear block 207 is secured to the bottom of the slide block 214 and is engageable with a cooperable wear block 231 attached to a horizontal link 232 of a feed roll release-clamp mechanism designated generally by the numeral 233. The link 232 is pivotable at one end about a pivot pin 208 and has its opposite end pivotally connected to a vertically movable link 234. A vertical control shaft 235 is threaded into the top of the vertical link 234 and is secured therein by a lock nut 236.

In order to lower the feed roll 140, the lowermost wear block 231 must be dropped by vertical movement of the control shaft 235. This enables the slide block 214 to drop together with the feed roll bearing block 212. Additionally, the feed roll 140 should be movable vertically whenever more than one carton blank is inadvertently fed over the feed roll. To this end, vertical movement of the control shaft 235 is controlled by a handle 239 and resilient adjustment mechanism indicated generally by the numeral 240. This adjustment mechanism 240 includes a transverse pin 241 which extends through the vertical shaft 235 and cooperates with a cam 243 on the end of the handle 239 to raise and lower the shaft 235. This cam 243 has a pair of flats 244, 245, one of which 244 is located much further from the bottom of a V-shaped recess 242 in the top of the cam 243 than is the other 245. The transverse pin 241 fits within the V-shaped recess 242 of the cam and serves as an axis of rotation about which the cam 243 is rotatable by the handle 239.

Fitted over the control shaft 235 between the bottom of the cam 243 and the top of the transverse frame bar 198 are a pair of flanged sleeves 246 and 247. A compression spring 248 is fitted over the shaft 235 between the flanges of these sleeves 246, 247 so as to bias the sleeves and connected flanges apart. The spring 248 thus forces the flange 249 of sleeve 246 into engagement with the top of the transverse frame bar 198. Similarly, it forces the top of the flange 250 of sleeve 247 into engagement with a flat of cam 243. When one flat 244 of cam 243 is in engagement with the flange 250 of sleeve 247, the shaft 235 and feed roll 140 are in a raised position. To drop the feed roll, the handle 239 may be rotated until the other flat 245 engages the flange 250 of sleeve 247. This results in lowering of the transverse pin 241 and the attached vertical control shaft 235 so as to lower the slide block 214 and thus the feed roll 140. If for any reason, two or more carton blanks should inadvertently be fed simultaneously over the feed roll 140, the spring 248 permits the feed roll to move downwardly and thus avoid damage to the machine.

Vacuum to the suction cup 132 must be synchronized with suction cup movement. For this reason, vacuum is applied to the suction cup 132 through a solenoid operated cut-off valve 260 and a rotary spool distribution or timing valve 261. Referring to FIGURES 9 and 18–21, it will be seen that the cut-off valve 260 is mounted upon a sleeve 263 which is in turn mounted upon and keyed to the oscillatory vacuum cup control shaft 152. A split hub cast iron vacuum control plate 264 is mounted over the sleeve 263 and connected thereto by a lock screw (not shown). A second cooperable vacuum control plate 265 is rotatably mounted over the sleeve 263 between the plate 264 and the side frame plate 38. This latter plate 265 is spring biased into frictional engagement with one side 267 of the first plate 264 by a compression spring 268 so that the two normally oscillate together on the shaft 152.

The spring 268 is fitted over the sleeve 263 and is secured in compression between one side 269 of the plate 265 and a nut 270 threaded over one end 271 of the sleeve 263. Adjustment of the nut controls compression of the spring 268 and thus the force with which the plate 265 is biased into engagement with the plate 264.

Referring now to FIGURE 18, it will be seen that the plate 264 includes an aperture 275 which is movable into alignment with an aperture 276 of the plate 265. When aligned, these apertures 276, 275 cooperate to form a passageway through the vacuum shut-off valve 260.

The limits of oscillatory movement of the plate 265 are controlled by an arcuate slot 277 in the plate 265, through which passes a bolt 278. The bolt 278 is threaded into a vertical plate 279 which is welded or otherwise secured to the frame side plate 38.

A vacuum shut-off control solenoid 280 is bolted to the vertical plate 279. The actuator 281 of this solenoid 280 is operable to control movement of a vacuum shut-off rocker arm 282 which is connected to the actuator 281 by a pair of tension springs 283 (FIGURE 9). One end of each of the springs 283 passes over and is connected to a pin 284 of the actuator while the opposite end of each spring is connected to a pin 285 which extends laterally from the control arm 282. This laterally extending pin 285 passes through a vertical slot 286 in the solenoid actuator 281.

The rocker arm 282 is pivotally mounted at 288 upon a support block 289 which is in turn welded or otherwise secured to the stationary plate 279. A hook 290 on the end of the rocker arm 282 is adapted to be received within a notch 291 in the top of the vacuum control plate 265 upon energization of the solenoid 280. Energization of the solenoid causes the actuator arm 281 of the solenoid to move upwardly so as to pull the springs 283 and thus one end of the rocker arm 282 upwardly. When this occurs, the hook 290 on the other end of the rocker arm is moved downwardly into engagement with the notch 291 of the vacuum control plate 265. So long as the hook remains in engagement with the plate 265, it will be restrained against movement with the plate 264 even though the plate 264 may continue to oscillate with the shaft 152.

Referring to FIGURES 9 and 19–21, it will be seen that the rotary valve 261 is mounted upon and supported from a pair of horizontal frame bars 300, 301 which are in turn bolted or otherwise fixedly secured to the transverse frame bar 198. Support plates 302, 303 depend from each of the longitudinal bars 300, 301 and rotatably support a stub shaft 305 of the rotary distribution valve 261. This shaft is driven in rotation by a chain and sprocket drive 306 from the main control shaft 150 of the feed mechanism. Thus the drive to the distribution valve 261 is synchronized with all of the other movements of the feeder mechanism.

The distribution or timing valve 261 includes a grooved rotary spool 308 keyed to the stub shaft 305 and cooperable with a surrounding port block 309 to supply suction to the vacuum cup 132. The port block 309 has three spaced ports 311, 312, 314 which communicate with a peripheral groove 322 on the block 308. One of these ports 311 exhausts the groove to atmospheric pressure. Another 312 of these ports is connected to the suction cup 132 by a standard hose fitting 313 and the hose 163. The third radial port 314 is connected to the aperture 276 in the cut-off valve plate 265 by a hose 315.

The spool 308 includes an inner sleeve 317 upon which an outer sleeve 316 is adjustably mounted. Adjustment of the outer sleeve 316 relative to the inner sleeve 317 is accomplished by loosening a bolt 319 which extends through an arcuate slot 320 of a radial flange 321 on the inner sleeve 317 and is threaded into a threaded bore of the outer sleeve.

The peripheral groove 322 extends over approximately 120° of the surface of the spool 308. This groove 322 connects the port 312 (and thus the suction cup 132) to the exhaust port 311 during one portion of the rotation of the spool relative to the stationary port block, and also connects the vacuum from the shut-off control valve 260 to the port 312 through the port 314 during another portion of its rotational cycle.

The operation of the vacuum supply system including the shut-off valve 260 and the distribution valve 261 is as follows. When the suction cup 132 engages the first carton blank in the magazine, vacuum is supplied to the vacuum cup 132 from a pump (not shown) through a flexible hose connected to the aperture 275 of the shut-off valve plate 264. So long as the solenoid 280 is deenergized, the plate 265 and the plate 264 oscillate together on shaft 152 with the ports 275 and 276 coaxially aligned. So long as these apertures are aligned, vacuum is supplied from the pump through the cut-off valve 260 and the flexible hose 315 to the port 314 in the port block 309. While the suction cup is engaged with the first blank in the magazine, the peripheral groove 322 of the spool 308 interconnects the port 314 with the port 312. Thus the vacuum source or pump is connected by the shut-off valve 260 and the distribution valve 261 to the suction cup 132.

After the suction cup has pulled the first carton blank in the magazine away from the following blank, and the spade 133 has entered between the now bowed first blank and the following blank, the vacuum is released to the suction cup as a result of the spool 308 rotating into the position illustrated in FIGURE 20 in which the vacuum cups are connected through the port 312 and groove 322 to the exhaust port 311. At this time, the ports 275 and 276 of the cut-off valve 260 remain coaxially aligned so that the vacuum remains connected to the distribution valve port 314 even though the position of the spool 308 precludes that vacuum being applied to the vacuum cup 132.

In the event that it becomes desirable to run the machine without feeding the carton blanks into the machine, the solenoid 280 is energized through a conventional electrical control circuit. This results in the actuator arm 280 of the solenoid being pulled upwardly as viewed in FIGURE 18, causing the control arm 282 to pivot about the pivot 288, and thus moving the hooked end 290 of the arm into engagement with the top arcuate surface of the shut-off valve plate 265. As the notch 291 passes the hooked end 290 of the control arm, the hook drops into the notch and thus stops further oscillatory movement of the control plate 265. The other vacuum control plate 264 remains free and will continue to oscillate with the shaft 152 and slide over the stationary plate 265.

Vacuum will remain applied to the aperture 275 of the cut-off valve plate 264. However, this vacuum passes through the cut-off valve 206 only during that instant when the aperture 275 of the plate 264 is aligned with the aperture 276. The timing of the distribution valve 261 is such that this alignment occurs only when the ports 312 and 314 of the distribution valve 261 are not in communication because of the rotary position of the spool 308. Thus, no vacuum is applied to the suction cups 132 so long as the solenoid 280 remains energized.

When the solenoid 280 is deenergized, the weight of the rocker arm 282 and the actuator arm 281 of the solenoid cause the rocker arm to move in a clockwise direction as viewed in FIGURE 18 about the pivot 288 and thus to disengage the hooked end 290 of the rocker arm from the notch 291 of the control plate 265. At this instant, the two frictionally contacting plates 264 and 265 will start to oscillate together, even though the apertures 275 and 276 of the respective plates may not be aligned. When the plate 265 moves to a position in which the end 274 of the arcuate slot 277 abuts against the screw 278, movement of the plate 265 will be arrested while the plate 264 will continue to move into a position in which the aperture 275 is coaxially aligned with the aperture 276. Thereafter, on the subsequent return stroke and until such time as the solenoid 280 is again energized, the apertures 275, 276 will remain coaxially aligned and thus form a passageway for the vacuum to the distribution valve 261.

Referring now to FIGURES 9 and 14, it will be seen that the feed roll 143 is driven in rotation from the main control shaft 150. To this end, the shaft 150 has a sprocket 330 keyed thereto. This sprocket drives an endless chain 331 which passes over and drives a sprocket 332 on an idler shaft 333. The chain 331 also passes over and drives a sprocket 334 which is keyed to the shaft 335 upon which the roller 143 is mounted. The idler shaft 333 is journaled in the side plate 39 while the shaft 335 extends between and is journaled in the side frame plates 38, 39 of the machine. Rotation of the main shaft 150 thus is operative to drive both the feed roll 140 and the feed roll 143.

As may best be seen in FIGURE 15, a spur gear 337 is non-rotatably keyed to the shaft 335 and mates with a spur gear 338 keyed to the shaft 339 upon which the feed roll 144 is mounted. The shaft 339 is likewise rotatably journaled within and supported from the side frame plates 38 and 39 in a fashion similar to the feed roll shaft 335. Thus, rotation of the lower feed roll 143 results in rotation of the upper feed roll 144 through this geared drive between the two.

*First linear conveyor*

As may be seen most clearly in FIGURES 2, 23 and 47, the first linear conveyor consists of the two lower belts 15, 16 and a second pair of upper belts 400, 401. A blank is sandwiched and securely held between these upper and lower belts as it is conveyed along the first linear conveyor.

The frame which supports the lower pair of belts 15, 16 comprises a plurality of transverse U-shaped channels 403 which extend between and are secured to the side frame plates 38, 39 by end plates 404. These transverse channels support a longitudinal beam 405 which in turn supports a portion of the lower belt conveyors as well as a portion of the following curvilinear belt assembly as is explained more fully hereinafter.

As may be seen in FIGURES 23 and 24, the beam 405 supports a vertical bearing plate 406 within which one end of a drive shaft 407 is journaled. The opposite end of the shaft 407 is journaled in the side frame plate 39. This shaft 407 is drivingly keyed to the front pulleys 408 and 409 over which the lower belts 15, 16 ride and by which these belts are driven.

The upper belts 400, 401 are driven by pulleys 410, 411 respectively. These pulleys are keyed to a shaft 412 which extends between and is journaled within the side frame members 38, 39 as may be seen most clearly in FIGURE 24.

At the rear, each of the lower belts 15, 16 passes over an idler pulley 415, a slack take-up pulley 416, and an idler pulley 417. Both of the idler pulleys 415 are mounted upon an idler shaft 418 which extends between and is journaled within the side plates 38, 39. The idler pulleys 417 are mounted upon an idler shaft 419 which is in turn journaled within a pair of brackets 420 secured to the rearwardmost one of the transverse support channels 403. One of a pair of vertically adjustable slides 422 supports each of the slack take-up pulleys 416 upon a shaft 421. Each of these slides 422 is vertically movable within a dove-tailed groove of a vertical slide track 423. The tracks 423 are secured to transverse frame bars 428. To enable the slides to be moved in the slide tracks 423, a screw 425 extends through a vertical aperture of an extension bracket 424 attached to the lower end of each of the slide tracks 423. The upper ends of each of these screws is secured to one of the slides so that upon adjustment of nuts 426, 427 threaded over the screws on opposite sides of the extension brackets 424, the slides are causes to move vertically within their respective slideway 423.

At the rear end, the upper belts 400, 401 each pass around an idler pulley 430, a slack take-up pulley 431, and an idler pulley 432. The idler pulleys are both journaled upon an idler shaft 433 which extends between and is journaled within the side frame plates 38, 39. Journal blocks 435 secured to a transverse frame beam 436 support stub shafts 434 upon which the idler pulleys 432 are rotatably mounted.

In order to take slack from the upper belts 400, 401, the slack take-up pulleys 431 are each mounted upon a vertically adjustable slide 438. These slides 438 are adjustable within trackways 439 of vertical tracks 440 in the same manner as the slides 422 are adjustable relative to the lower tracks 423.

To reduce catenary in each of the lower belts 15 and 16 and to maintain the upper stretch of these belts in a horizontal plane, each belt is supported on its lower side and runs over a series of rollers 445. As may best be seen in FIGURE 47, the rollers 445 are all rotatably supported upon a longitudinal support bar 446 which extends beneath each of the belts 15 and 16. These bars 446 are in turn welded or otherwise secured to the top of a pair of generally T-shaped frame braces 447 and 448 which are bolted to the longitudinal beam 405 of the machine frame.

In a similar manner, the upper belts 400, 401 are also backed by rollers 450 which are rotatably supported upon longitudinal bars 451. These rollers 450 function to force the upper belts 400, 401 down into engagement with a carton blank supported upon the lower belts 15 and 16. The bars 451 are mounted for vertical movement relative to the frame of the machine and are spring biased downwardly. For this reason, vertical guide rods 452 extend upwardly from each of the longitudinal bars 451 through vertical apertures in the webs 453 of a pair of longitudinal channels 454. Each of the longitudinal channels 454 is bolted to and suspended from three brackets 470 which are in turn bolted to a longitudinal overhead frame beam 471. This beam 471 is suspended between and secured to the transverse frame channels 472 and 436.

Downward bias of the longitudinal bars 451 is provided by compression springs 455 mounted between the bars and the bottom of the flanges 453. To limit vertical displacement of the bar 451 and adjust the clearance between the upper and lower belts, nuts 456 are threaded onto the upper ends of the guide rods 452.

As may be seen most clearly in FIGURE 23, the upper roller support bars 451 are not as long as the lower support bars 446 and terminate rearwardly of the lower bars 446. In order to provide a backing for the forwardmost portion of the upper belts 400, 401, the forwardmost ones of the upper rollers are supported from longitudinally adjustable roller support brackets 462. These rollers are mounted for vertical movement upon a pair of longitudinally extending bars 461 which are supported from a horizontal flange of the L-shaped channel brackets 462. Guide rods 463 of the bars 461 extend upwardly through apertures in the horizontal flanges of the channels 462 and are vertically slidable therein so as to accommodate vertical movement of the bars 461 and thus of the rollers relative to the channels. A spring 464 over each of the guide rods between the bottom of the channels 462 and the top of the bars 461 forces the bars downwardly toward the belts 400, 401. Adjustment nuts 460 threaded onto the upper end of each guide rod 463 limit vertical displacement of the bars 461 and permit adjustment of the clearance between the forward end of the upper and lower belts. Longitudinal movement of the channel brackets 462 relative to the longitudinal channels 454 is accomplished by means of headed screws 466 which extend through a longitudinal slot 467 of the channel 454 and are threaded into threaded apertures of the brackets 462. By loosening the nuts 466, the brackets 462 may be moved longitudinally relative to the channel 454 so as to adjust the longitudinal point at which the upper belts 400 and 401 diverge away from the lower belts 15, 16 and release the cartons for movement into the following curvilinear belt conveyor 17.

The forwardmost pulleys 408-412 over which the lower belts 15, 16 and upper belts 400, 401 ride, are driven in rotation from the main drive shaft of the machine. As may be seen most clearly in FIGURES 5 and 6, the output or main drive shaft 125 of gear reducer 121 is operable to drive the input shaft of a gear box 475. One of the output shafts 476 of this gear box 476 drives a belt conveyor drive shaft 477 through a chain and sprocket drive indicated generally by the numeral 478. This belt conveyor drive shaft 477 is operable to drive a chain 479 (FIGURE 23) which in turn drives a sprocket 480 nonrotatably keyed to the shaft 407 and a sprocket 481 keyed to the shaft 412. The chain 479 also passes over an idler sprocket 482. Thus, the drive from the chain and sprocket 478 is operable to drive the drive shafts 407 and 412 of the belt conveyors 15, 16, 400, 401.

Referring to FIGURE 3, it will be seen that a conventional plow 490 located in the path of the carton blank 5 as it moves along the first linear conveyor is operable to plow the glue flap 12 downwardly into a vertical plane about a fold line 491. Subsequently, the glue flap 12 returns back into the horizontal plane after the blank passes the plow as a result of the inherent resiliency of the blank. The glue flap is thus "prebroken" about the fold line 491 so as to enable the folded and glued carton to subsequently be articulated and opened about this fold line with a minimum of resistance to opening.

Mounted on the opposite side of the conveyor from the plow 490 is another plow 494 operable to fold the side panel 13 downwardly along score line 14 into the vertical plane as the blank is conveyed past the plow. This panel 13 remains in the vertical plane until after the carton blank passes the second curvilinear conveyor as is explained more fully hereinafter.

*Second curvilinear conveyor*

The curvilinear conveyor 17 which transports the carton blanks through a 90° turn while maintaining the alignment of the blank on the conveyor is illustrated in FIGURES 26–29. This conveyor is essentially a circular cross section endless belt conveyor which is cooperable with a series of rollers 501 to pinch the carton blank between the belt 500 and the rollers 501 and convey it through a turn or curvilinear path defined by the path of movement of the belt.

All of the curvilinear belt support pulleys as well as the belt guide rollers, except for the forwardmost pulley 502, are mounted between and supported from the side frame elements 38, 39. This pulley and guide roller network includes an upper set of guide rollers 505 which are rotatable about horizontal axes, a set of curve defining guide rollers 506 which are rotatable about vertical axes, as well as the lower guide rollers 501 which are rotatable about horizontal axes. All of these sets of rollers support the curvilinear section of the belt 500 between the forward drive pulley 502 and a rear idler pulley 507. Both of the pulleys 502 and 507 are rotatable about a horizontal axis. Additionally, as may be seen most clearly in FIGURE 27, the upper stretch 503 of the belt 500 is movable over a pair of pulleys 508 and 509 which are rotatable about vertical axes.

As may be seen most clearly in FIGURE 27, the rear idler pulley 507 is rotatably supported upon the belt conveyor drive shaft 412. The rear vertical pulley 509 is rotatably supported upon a stub shaft 512 which is in turn mounted within a pillow block 513 attached to the transverse frame channel 472. A stub shaft 511 which is rotatably supported within a pillow block 514 bolted to the side plate 38 of the machine frame supports the horizontal pulley 508. Driving the curvilinear belt 500 is the main drive pulley 502 which is keyed to a drive shaft 515. This shaft extends between and is journaled within the side frame plates 516 and 517 of the third linear conveyor system.

Referring now to FIGURES 26, 27, it will be seen that the lower set of belt support rollers 501 are supported upon a lower table 520. The front of this table is attached to the frame of the machine by a transverse support beam 521 bolted to the side frame plates 38, 39. At the rear, the table is supported by a corner bracket 522 which is bolted to the longitudinal beam 405.

As may be seen most clearly in FIGURES 28 and 29, each of the lower set of rollers 501 is resiliently mounted for vertical movement and is spring biased upwardly into engagement with the curvilinear belt 500. The resilient mounting of each roller 501 consists of a slide block 525 having vertical grooves 526, 527 cut in its lateral edges. These grooves accommodate vertical legs 528 of a generally U-shaped vertical plate 524 which has a horizontal leg 529 bolted to the table 520. Thus each of the slide blocks 25 is free to move vertically relative to the fixed support brackets 524. One roller 501 is rotatably supported upon each of the support blocks 525 by a bolt 530 which extends through each block and roller and upon the end of which is secured a washer 531 and nut 532.

In order to bias each of the sliding blocks 525 and thus the attached rollers 501 upwardly into engagement with the belt 500, each block 525 has a horizontal leg 533 which extends beneath the roller 501. A spring 534 is fitted within a recess in the table 520 beneath each of the legs 533 so as to force the leg 533 and thus the connected block and roller upwardly.

Both the upper set of guide rollers 505 and the curve defining set of guide rollers 506 are carried by and supported upon an upper support table 540. This table is attached at its front end to the side frame plate 38 by a corner bracket 541. At its rear, the table 540 is supported by a corner bracket 542, the lower horizontal leg of which is bolted to the table and the vertical leg 543 of which is bolted to the transverse frame channel 472 (see FIGURE 22).

As may be seen most clearly in FIGURE 28, each of the upper set of rollers 505 is rotatable upon a bolt 546 which is supported from a right angle bracket 547 secured to the upper table 540. The horizontal rollers 506 are rotatably journaled upon a vertically extending bolt 550 which is secured to the table 540 by a nut 551.

As may be seen most clearly in FIGURE 26, a carton blank discharged from between the belts 15, 16 and 400, 401 of the first linear conveyor enters beneath the curvilinear belt 500 and is entrapped between the belt and the upwardly biased lower set of rollers 501. As the belt 500 moves in the forward direction, the entrapped blank is forced to move with the belt 500 around the curvilinear path defined by the guide rollers 506. There is no sliding movement of the belt 500 relative to a carton blank so that the surface of the blank is not scarred or torn as the blank moves through the turn defined by this curvilinear conveyor. This is a decided advantage over conveyors which slide a carton or flat article through a turn or curvilinear path.

Referring now to FIGURES 6, 22 and 25, it will be seen that the drive to the curvilinear conveyor drive shaft 515 is from the main drive shaft 125 of the machine through the gear reduction unit 475 and a chain and sprocket drive 563 to an idler shaft 564. The idler shaft 564 is operable to drive a sprocket 565 which in turn drives an endless chain 566. This chain drives a sprocket 567 keyed to the drive shaft 515 as well as a sprocket 568 keyed to an idler shaft 569 in the drive system to the first drive belt of the third linear conveyor. Additionally, the chain 566 passes over an idler sprocket 570 and an idler sprocket 571. This latter sprocket is journaled upon a stub shaft 572 while the former is supported from a stub shaft 574. Both of these stub shafts 572 and 574 are supported upon the frame side plate 517 of the third linear conveyor system.

*Third linear system*

As the forwardly moving carton passes over the last of the lower set of rollers 501 of the curvilinear conveyor, its vertically extending panel 13 enters between a pair of speed rolls 560, 561 operable to convey the carton blank between the curvilinear conveyor and the following belt conveyors. As may be seen most clearly in FIGURES 3, 32 and 37, these speed rolls continue the forward movement of the carton blank into the upper and lower belt system of the third linear conveyor.

Referring to FIGURES 31, 32 and 37, it will be seen that the speed roll 560 is mounted upon and drivingly keyed to a vertical drive shaft 585. The upper end of this shaft 585 is journaled within a bracket 586 which is secured to the frame side plate 38. At its lower end, the shaft 585 is drivingly connected to the output shaft of a right angle gear box 587. Drive to the gear box is through an input shaft 588 which is drivingly connected to an intermediate shaft 589. The shaft 589 is driven by a chain and sprocket drive 591 from a drive sprocket 594. This sprocket 594 is drivingly keyed to and driven from an intermediate shaft 595 which is in turn driven by a chain and sprocket drive 596 from the pulley drive shaft 515.

In order to provide a backing for the vertical panel 13 of the blank as it is engaged by the speed roll 560, the idler roll 561 is mounted adjacent the speed roll 560. This idler roll 561 is mounted on a vertical idler shaft 603, the lower end of which is journaled within a bracket 604. This bracket is secured to and mounted upon the gear box 587 as may be seen most clearly in FIGURE 32.

As a carton is conveyed through and passes out of the curvilinear conveyor 17, its vertically extending panel 13 enters into the nip defined between the speed roll 560 and the back-up roll 561. These rolls then convey the blank into a network of belts 580, 581, 582, 583 and 584 of the third linear conveyor.

The belts of the third linear conveyor are supported from a stationary frame which includes frame side plates 41, 42, as well as a series of transverse support bars 607 and transverse support channels 608 which extend between the lower portion of the frame side plates 41 and 42. Reinforcement of the upper portion of the frame is provided by a series of transverse frame channels 609.

The third linear conveyor includes two upper endless conveyor belts 583, 584 as well as three lower endless conveyors 580, 581 and 582. During transfer of a carton blank via this belt network, the blank is always entrapped between the upper set of belts 583, 584 and at least one of the lower set 580, 581 and 582.

Referring to FIGURES 33, 37, it will be seen that each of the upper endless belts 583, 584 extends between a forward driving pulley 610 and a rear idler pulley 611. The forward pulleys 610 are mounted upon a drive shaft 612 which extends between and is journaled within the frame side plates 41, 42 while the rear pulleys 611 are mounted upon an idler shaft 613 which also extends between and is journaled within the frame plates 41, 42. Between the pulleys 610 and 611, the upper stretch of each of the upper belts 583, 584 passes over a pair of idler pulleys 615 and 616.

In order to hold the lower stretches of the belts 583 and 584 down in contact with a carton blank while it is supported on the lower belts 580, 581 and 582, back-up rollers 620 engage the top side of the lower stretches of belts 583 and 584. As may be seen most clearly in FIGURES 31, 32 and 37, these rollers 620 are rotatably journaled upon longitudinal hold down bars 622. Each of the hold down bars 622 includes a pair of vertical apertures 623 within which fit guide rods 624. These guide rods 624 in turn depend from a horizontal leg of a pair of longitudinal beams 625. These beams are mounted upon the transverse frame channels 609 in alignment with each of the upper belts 583 and 584. Compression springs 36, 32 fit between the bottom 626 of the beams 625 and the tops of the bars 622 so as to bias the bars and thus the attached rollers 620 downwardly into engagement with the belts 583 and 584.

As may be seen most clearly in FIGURE 31, the rearwardmost pair of roller support bars 622 are mounted for adjustable longitudinal movement relative to the longitudinal beams 625 upon movable brackets 621. The guide rods 624 which support the rearwardmost pair of bars 622 depend from a horizontal flange 627 of the brackets 621. A vertical leg 628 of each of the brackets 621 is bolted to the longitudinal beam 625 by a pair of bolts 629—629 which extends through a longitudinal slot 630 in the beam 625 and an aperture through the vertical leg 628 of the bracket 621. By loosening the bolts 629, the brackets 621 may be adjusted longitudinally relative to the beam 625 so as to adjust the point of convergence of the upper set of belts 583, 584 with the lower set of belts. In this way, the machine may be adjusted to handle various length cartons.

The rearwardmost one 580 of the three lower drive belts is driven from a drive pulley 650 and passes over a forward idler pulley 651, a rear idler pulley 652, and a pair of slack take-up idler pulleys 652, 654. The forward and rear idler pulleys 651, 652 are mounted upon stub shafts 655, 656 which are in turn rotatably mounted within brackets 657, 658 secured to the machine frame. Both of the slack take-up pulleys 653 and 654 are rotatably journaled within an adjustable bracket 660 which is in turn pivotally secured to a vertical frame beam 661 by a pivot shaft 662. Adjustment of the bracket is controlled by a bolt 663 which passes through an arcuate slot 664 of the bracket and is threaded into a threaded aperture of the beam 661. Thus, by rotating the bracket 660 relative to the pivot shaft 662, it is possible to adjust the tension of the conveyor belt 580.

Drive to the belt 580 is imparted through the drive pulley 650 which is drivingly keyed to the intermediate shaft 595. As was explained hereinabove in connection with the drive system to the speed roll 560, this intermediate shaft 595 is driven by the chain and sprocket drive 596 from the drive shaft 515.

In order to provide a support beneath the upper stretch of the belt 580, rollers are rotatably journaled upon a longitudinal support bar 671 which is supported from a pair of tables 672, 673. These tables are welded or otherwise secured to the top of vertical beams 673, 661 respectively, of the machine frame.

Referring now to FIGURES 37, 38, it will be seen that the two lower belt conveyors 581 and 582 are located forwardly of the belt conveyor 580 and generally parallel each other. The belt 581 is driven from a front pulley 678 from which it extends rearwardly over an idler pulley 679, downwardly beneath an idler pulley 680. From the idler pulley 680, the belt 581 extends rearwardly to and beneath an idler pulley 681, upwardly over an idler pulley 682, and then forwardly over an idler pulley 683. From the idler pulley 683 the belt extends downwardly beneath an idler pulley 684, forwardly beneath an idler pulley 685, upwardly over an idler pulley 686, and forwardly to and around the drive pulley 678. The dip or gap 687 in the belt 581 which occurs between the two idler pulleys 683 and 686 is placed therein in order to allow the panel 18 of the carton blank 5 to pass through the gap and be folded beneath the top panel 13 as may best be seen in FIGURE 3.

Referring back to FIGURE 38, it will be seen that the other transport belt 582 is driven from a drive pulley 690 from which it extends rearwardly over an idler pulley 692, downwardly and rearwardly beneath an idler pulley 693. From the idler pulley 693, the belt 582 extends rearwardly beneath an idler pulley 694, upwardly over an idler pulley 695, and forwardly over an idler pulley 696. From this last idler pulley 696, the belt 582 extends downwardly and rearwardly over an idler pulley 697, forwardly beneath an idler pulley 698, upwardly and forwardly over an idler pulley 699, and forwardly over the drive pulley 690. The dip or gap 691 in the belt 582 which occurs between the two idler pulleys 696 and 699 permits the panel 19 of the carton blank 5 to pass through the gap and be brought into contact with the glue flap 12, as may best be seen in FIGURE 3.

Both of the drive pulleys 678 and 690 of the belts 581 and 582, respectively, are mounted upon a drive shaft 700, which extends between and is journaled in the side frame plates 41 and 42. All of the idler pulleys which support both of the belts 581, 582 are rotatably supported upon stub shafts which are journaled within stationary frame plates.

The horizontal stretches of both belts 581 and 582 which are located in the plane of travel of the carton blanks are supported by rollers 701. These rollers are rotatably mounted beneath the belts in the same manner that the rollers 670 are mounted beneath the belt 580.

In order to drive the drive shafts 612 and 700 and thus the drive pulleys 610, 678, 690 of both the upper conveyor belts 583, 584 and the lower belts 581, 582, a drive system is provided to these drive shafts from the main drive shaft 476. This drive system includes a chain and sprocket drive 710 from the drive shaft 476 to the input shaft of a gear box 711. As may be seen in FIGURES 5a, 30 and 40, one output shaft of this gear box is operable through a chain and sprocket drive 713 to drive sprockets 714 and 715 keyed to the drive shafts 612 and 700 respectively.

As a blank is transported through the third linear conveyor, it is securely held between the upper and lower conveyor belts. During the initial portion of this movement while the blank is supported by the lower conveyor 580, its vertical panel 13 is plowed upwardly by a conventional plow 720 (FIGURES 3 and 33). Simultaneously with the raising of the panel 13 into the horizontal plane, another plow 721 (FIGURE 3) is operable to plow or fold the panel 18 downwardly into the vertical plane. Thus, as the carton passes into the belt conveyors 581, 582, the panel 18 is located in the vertical plane and the panel 13 is back up in the horizontal plane. Upon continued forward movement of the blank upon the belt conveyors 581, 582, the blank flap 19 engages a plow 722 which is operable to fold the flap 19 downwardly into the vertical plane. Approximately simultaneously with the folding of the flap 19 into the vertical plane, the vertically extending glue flap 12 passes over the glue roll 20 which applies a strip of glue to the flap. Thereafter, a plow 725 engages and folds the panel 18 and attached glue flap 12 beneath the horizontally located main panel 13 of the blank 5 as may be seen most clearly in FIGURES 3 and 4. As the panel 18 moves from the vertical plane in which glue was applied, into the horizontal plane beneath the horizontal panel 13, it passes through the gap 687 in the belt 581 which occurs beneath the idler pulleys 683 and 686 (see FIGURES 3 and 38). Immediately following the folding of the glue-applied panel 18 from the vertical plane into the horizontal plane, the flap 19 is moved from the vertical plane into the horizontal plane through the gap 691 by the forward end section 723 of the plow 722. This plow 722 is thus operative to move the panel 19 into juxtaposition over the glue flap to form a glued seam on the bottom of the flat folded and glued carton 7.

Referring now to FIGURES 30, 34, 35 and 36, it will be seen that the glue applicator roll 20 is mounted for rotation about a vertical axis. It includes a flat glue applicator surface 730 located in the vertical plane from which the roll tapers toward its upper radial surface 731 and its lower radial surface 732. Thus the wheel defines an upper chamfered surface 733 and a lower chamfered surface 734.

As may be seen most clearly in FIGURE 34, the glue wheel or glue applicator roll 20 is keyed to a vertical drive shaft 735 which is driven from a gear box 736 through an extensible coupling 737. This coupling extends upwardly through a collar 739 of a glue roll support assembly or casting 738 which is bolted onto a vertical adjustment plate 740. The plate 740 is secured to a transverse channel 698 of the frame by bolts which extend through vertical slots in the plate 740. By adjusting the elevation or height of this plate and the attached assembly 738, the height of the glue roll may be altered.

A corner bracket 741 is bolted to the upper edge of the adjustment plate 740 and extends outwardly over the top of the adjustment plate 740 and the top of a stationary abutment 742. An adjustment screw 743 is threaded through a vertical aperture of the bracket 741 and engages the top of the abutment 742 so that upon rotation of the screw 743, the bracket 741 and the attached adjustment plate 740 are moved vertically relative to the frame of the machine. After adjustment of the screw 743 to change the elevation of the plate 740 and the attached glue roll support assembly 738 and glue roll 20, the plate 740 may be secured in an adjusted position by tightening the bolts 729.

A glue collection reservoir or pan 745 is mounted on top of the collar 739 between the collar and the bottom of the glue applicator roll 20. This reservoir pan 745 includes a central boss or hub 746 having a vertical aperture through which the drive shaft 735 of the glue roll 20 extends. A drainage tube 747 connects the interior of the reservoir pan 745 with a glue storage reservoir 749 mounted on the side frame plate 41 of the machine (see FIGURE 1). From this reservoir 749, glue is supplied through a tube to a glue pump 750 which in turn pumps the glue via a conduit 751 upwardly onto the upper chamfered surface 733 of the glue roll. The glue then runs down over the flat vertical glue applicator surface 730 back into the reservoir pan 745. An electric motor 752 is used to drive the pump 750 as may be seen most clearly in FIGURES 5 and 30.

In order to wipe the excess glue from the glue applicator 20 and to insure that an even coating of glue is applied to the glue flap 12 of each blank, a wipe-off blade 760 is mounted between the point of application of glue to the roll 20 and the point at which the roll contacts the glue flap 12 of the blank. As may be seen most clearly in FIGURE 35, the vertical profile of the blade 760 adjacent the glue roll parallels the vertical profile of the wheel 20 except in the area of the vertical glue applicator surface 730. At this point, a recess 761 is cut into the blade 760. The recess 761 is covered by a doctor blade 762 adjustably mounted upon the wipe-off blade 760 for movement toward and away from the roll 20 so as to adjust the clearance between the doctor blade 762 and the glue applicator section 730 of the wheel. By adjusting the clearance between the doctor blade 762 and the vertical surface 730 of the glue applicator roll 20, the amount of glue applied to the glue flap 12 of a carton blank may be adjusted and controlled.

Referring now to FIGURES 35 and 36, it will be seen that the blade 760 is adjustably mounted upon an angularly adjustable vertical plate 763 which extends radially from a sleeve 764. The sleeve 764 is in turn rotatably mounted upon a vertical post 765 which extends upwardly from a horizontal support plate 766. This latter plate 766 extends outwardly from and is a part of the glue roll assembly casting 738. A pin 767 also extends radially from the sleeve 764. This pin 767 cooperates with an adjustable abutment screw 768 to determine the angular position of the sleeve 764 and thus of the attached wiper blade 760. The screw 768 extends through a threaded aperture of a vertical extension 769 of the horizontal table 766. Also extending outwardly from the table 766 is an L-shaped pin 770, the upper end of which supports one end of a tension spring 771 and the opposite end of which is secured to the outer end of the pin 767. Thus the spring 771 biases the pin 767 rearwardly against the end of the abutment screw 768. By adjusting the screw 768 relative to the vertical extension 769 of the table 766, the angular position of the pin 767 relative to the post 765 may be adjusted so as to change the angular position of the wipe-off blade 760. It will be noted that this arrangement of the glue wheel permits the wipe-off blade to be moved in a clockwise direction about the post 765 as viewed in FIGURE 36. This is a safety feature to prevent damage to the machine in the event that glue should build up and dry upon the roller 20 so that it could not pass beneath the wipe-off blade 760.

To guide the vertical panel 18 of the blank and the attached glue flap 12 past the glue roll 20, a pair of spaced vertical guide plates 775 and 776 are mounted adjacent the glue applicator roll 20 in the path of movement of the vertically extending flap. That plate 775 which is closest to the glue roll 20, is provided with a large slot 779 through which the peripheral portion 730 of the glue wheel 20 extends.

As may be seen most clearly in FIGURES 34 and 36, both of the guide plates 775 and 776 are supported upon a table 780 which is a part of the glue roll assembly casting. This table in turn supports a slidable plate 782 which is movable within guideways defined by spacer blocks 783 and overlapping rails 784 (FIGURE 35). Both the rails 784 and the spacer blocks 783 are secured to the lateral edges of the table 780 so as to define a horizontal trackway 785 within which the table 782 is slidable. To secure the front guide plates 775 to the slidable table 782, the horizontal legs 790 of L-shaped brackets 791 are secured to the top of the table and the plate 775 is in turn secured to the vertical leg 792 of each of these brackets 791. The rear plate 776 is secured to the table by means of guide rods 795 which extend horizontally from the guide plate 776 through horizontal apertures of guide blocks 796 mounted on top of the table 792. Compression springs 797 are fitted over each of the guide rods between the guide blocks 796 and the guide plate 776 so as to bias the guide plate 776 toward the glue roll 20. Nuts 798 threaded onto the ends of the guide rods 795 adjustably determine the spacing or clearance between the guide plates 775 and 776. Lock nuts may also be secured on the guide rod to lock the nuts 798 in an adjusted position.

Movement of the slide 782 relative to the table 780 is effected by means of a solenoid 800 which is secured to a vertical flange 803 of the glue assembly casting 738 by a generally Z-shaped bracket 801. The actuator 804 of this solenoid 800 is connected to the slide 782 by means of a pair of brackets 805 secured to the slide and a pivot pin 806 which extends through the brackets 805 and the solenoid actuator 804. As a result of this connection, energization of the solenoid 800 results in the slide 782 being pulled away from the glue roll.

If for any reason, a carton should become jammed between the guide rails 775 and 776, actuation of the solenoid 800 enables the jammed carton to be pulled away from the glue roll and extracted from the machine. Thereafter, when the solenoid is deenergized, a spring (not shown) of the solenoid returns the table to its normal position in which the peripheral glue applicator surface 730 of the glue roll extends through the vertical slot 779 into the gap between the guide rails 775, 776.

Referring now to FIGURES 5, 30 and 34, it will be seen that the glue wheel roll 20 may be driven from either of two alternate drive sources depending upon whether or not the complete machine is operating. If the machine is operating, the drive is from the main drive shaft 476 through a chain and sprocket drive 810 to an intermediate shaft 811 and from the intermediate shaft 811 through another chain and sprocket drive 812 to the gear box 736. As mentioned earlier, the gear box output shaft is operative to drive the glue roll 20 through the coupling 737. Additionally, an auxiliary drive motor 813 may be used to drive the glue roll 20 via a chain and sprocket drive 814 to the shaft 811. The shaft 811 is connected to both of the sprockets of the chain and sprocket drives 812 and 814 by means of conventional combination overrunning clutch and sprockets. In the normal course of events, when the machine is being driven by the main drive shaft 476, the auxiliary drive motor 813 drives the chain and sprocket drive 814 but this has no effect upon the glue roll because the motor 813 drives the shaft 811 at a slower speed than the chain and sprocket drive 810 off of the main shaft 476. However, when the machine stops, the combination overruning clutches and sprockets of the drives 812 and 814 take over and continue to drive the glue roll 20 from the motor 813. This auxiliary drive system is provided as a safety feature to preclude the buildup of glue on the glue roll in the event that the glue pump motor 752 continues to operate after the main drive motor 120 is turned off to stop the machine.

*Corner diverter*

When the cartons reach the downstream end of the third linear conveyor and are ready for transfer onto the fourth linear conveyor, the cartons are in the shape of a flat sleeve which has its longitudinal axis parallel to the direction of movement of the carton on the conveyor. It is now preferable to reorient the cartons on the conveyor so that the cartons travel with their longitudinal axis transverse to the direction of movement. This is done in order to realign the cartons relative to their direction of movement before they enter the compression rolls as is explained more fully hereinafter. Therefore, the cartons are conveyed into the next turn with their longitudinal axis oriented parallel to the direction of movement and are conveyed out of the turn with their longitudinal axis transverse to the direction of movement.

Referring to FIGURE 3a, it will be seen that some provision must be made for extracting the corner carton 7a from an interfering position in front of the following carton 7b before the following carton 7b may be conveyed into the corner. For this reason, a diverter, indicated generally by the numeral 21, is operable to place sequential cartons from the third linear conveyor in alternate vertical planes on the fourth linear conveyor. These alternate vertical planes are defined between three spaced horizontal tables or platforms 821, 822 and 823. Thus, one carton is inserted into the gap between the lowermost table 821 and the intermediate table 822. The following carton is then diverted into the gap between the intermediate table 822 and the uppermost table 823. Subsequently, the following carton is placed in the first gap between the tables 821 and 822, etc. These alternate levels thus provide a much longer time interval during which each carton may be conveyed out of the corner before the next carton may follow it into the corner.

Diversion of sequential cartons into the different vertical planes defined between the tables 821, 822 and the tables 822, 823 is provided by a pair of movably mounted drive rolls 825, 826. As may be seen most clearly in FIGURES 39, 40 and 41, these drive rolls are drivingly keyed to drive shaft 827 and 828 respectively. One end of each of these shafts extends through a rocker arm 830 and has a drive gear 831 and 832 keyed to the outer end thereof. The opposite ends of each of the drive rolls 826, 827 are mounted within another rocker arm 834. Both rocker arms 830, 834 are rotatably journaled upon stub shafts 835, 845 respectively, which extend through recesses 836 of the frame side plates 42, 41 and are journaled within horizontally adjustable slide blocks 837 and 846 respectively. As may be seen most clearly in FIGURE 39, each of the slide blocks 837, 846 has a pair of spaced horizontal slots 838 and 839 through which a pair of bolts 840, 841 extend. Both of these bolts 840, 841 are threaded into a threaded aperture (not shown) of the side frame plates 41, 42 so as to secure the slide blocks in an adjusted position.

As cartons pass between the rollers 825, 826, no pressure is applied to the glued seam which passes between a smaller diameter section 829 of the rollers. It has been found advantageous to avoid applying pressure to the seam at this point in the travel of the carton through the machine because of the tendency for glue to be squeezed from the seam and deposited as a drop at the end of the seam as is explained more fully hereinafter.

Referring to FIGURE 40, it will be seen that drive to the diverter rolls 825, 826 is imparted through a spur gear 850 which is drivingly keyed to the stub shaft 835. This gear 850 drives an intermediate gear 851 which in turn drives the spur gear 832 keyed to one end of the roller support shaft 827. The gear 832 in turn meshes with and drives the gear 831 which is drivingly keyed to the end of the roller shaft 828.

Rotational drive to the rolls 825, 826 is derived from the drive shaft 700 which drives the belt conveyors 581 and 582. This shaft 700 is operable to drive one sprocket 861 of a double sprocket 862 through the chain 860 and drive sprocket 859. The other sprocket 863 of the double sprocket 862 drives the shaft 835 through a chain and sprocket drive 864. To support the double sprocket 862 for rotational movement, it is rotatably journaled upon a shaft 865 which extends between and is journaled within the side frame members 41, 42. The shaft 865 is driven independently of this double sprocket 862 from an output shaft 866 of the gear box 711 by means of a conventional chain and sprocket drive 867.

In order to oscillate the rocker arm 830 from a position in which it diverts one carton into the upper plane to a position in which it diverts the following carton into a lower plane, the rocker arm 830 is pivotally secured at one end to a pivot shaft 870. This shaft is in turn connected through a crank arm 871 to a cam system which is operable to oscillate the arm 871. The cam system is connected to a bifurcated plate 872 on the lower end of the crank arm. This plate fits over a small diameter section 873 of the shaft 865 and has a laterally extending cam follower 874 extending into an eccentric trackway 875 of a rotary cam 876. The cam is mounted upon and keyed to the drive shaft 865 so that the cam follower 874 and thus the attached crank arm 871 are reciprocated upon rotation of the rotary cam 876. This reciprocation results in an oscillatory movement of the rocker arms 830 and 834 and drive rolls 825, 826. The timing of this oscillatory movement of the drive rolls is synchronized with the carton blank feeder mechanism so that the rollers are caused to move from one position to the other just as one carton clears the rollers and the next following carton enters between them.

*Fourth linear conveyor system*

The fourth linear conveyor system including the conveyors 23, 24 is operable to transfer cartons out of the corner between the plates 821, 822, 823, through the pair of cooperating press rolls 25, 26, and onto a shingling conveyor 10. This conveyor system is supported upon a frame which includes a horizontal table 880, a pair of side frame plates 883, 884 and a rear frame plate 885. The horizontal table is supported from a vertical plate 881 which is welded to the side frame plates 41, 42. Reinforcement of the table 880 is provided by a gusset plate 882 which extends between the table 880 and the vertical support plate 881 as may be seen most clearly in FIGURE 44. The side frame plates 883 and 884 as well as the rear support plate 885 (see FIGURE 30) extend vertically from the table 880 and support a pair of transverse frame plates 878 and 879 which extend therebetween. A frame corner plate 887 is also attached to the rear support plate 885.

Referring now to FIGURES 43 and 44, it will be seen that each of the two lower platforms or tables 821, 822, comprises three coplanar sections 821a, 821b, 821c and 822a, 822b, 822c between which longitudinal grooves or slots extend for the passage of lugs on the chain conveyors 23 and 24. The upper table has only two coplanar sections 823a and 823b.

As may be seen most clearly in FIGURES 42 and 43, all three sections of the lower platform 821 are fixedly supported from the rear frame plate 885 by a corner bracket 895 which is in turn welded to the rear plate 885. Two of the sections 821a and 821b are reinforced by braces 896, 898 and 899 which are mounted upon the transverse frame plate 879 while the third section 821c is reinforced by a corner bracket 897. Two of the braces 898, 899 which support the middle section 821b of the lower platform 821 are generally C-shaped in cross section so as to provide a trackway for a chain of the lower drive chain conveyor 24 which transports cartons from between the lower and middle platforms.

The intermediate platform 822 is supported solely from the rear frame plate 885 by a pivotally mounted bracket 902. This bracket 902 has a pair of spacer plates 903, 904 secured to its bottom surface. All three sections 822a, 822b, 822c of the intermediate platform or plate 822 are secured to the outer end of the lowermost one 903 of these plates.

One section 823a of the upper platform 823 is connected to the bottom of a bracket 909 which depends from and is attached to a pivotally mounted table 878. Similarly, the middle section 823b of this upper platform 823 is connected to the movable table 878 by depending C-shaped brackets 910, 911 which also serve as trackways for the chains 912 and 913 of the upper chain conveyor 23.

Pivotally supporting the table 878 and thus the depending upper platform 823 is a transverse shaft 915 from which the table 878 is suspended by table hubs 916 and 917. The shaft 915 extends between and is journaled within the side plates 883 and 884.

If a carton should become jammed between the upper platform 823 and the intermediate platform 822, it is accessible for clearing by pivoting the upper chain conveyor and connected transverse platform 878 about the shaft 915. With the table 878 and the upper chain conveyor raised, the intermediate platform 822 is accessible and may be lifted about the pivot of bracket 902 so as to clear a jam between the intermediate platform 822 and the lowermost platform 821.

The transverse shaft 915 supports the rear drive sprockets 825 and 926 of the upper chain conveyor 23. Similarly, another transverse shaft 927 supports the front sprockets 928 of the upper chain conveyor 22. This latter shaft 927 extends between and is rotatably journaled within the side frame plates 886, 883. The chains 912 and 913 of the upper conveyor 23 are endless chains which extend around these sprockets and are driven from the rear sprockets. Each chain 912 and 913 carries two lugs 930 and 931. The lugs 930, 931 of the individual chains are spaced 180° apart and are mounted parallel to the lugs 930, 931 of the other chain conveyor so that the parallel lugs of the two chain conveyors 912 and 913 simultaneously engage a carton resting upon the intermediate platform 822 to push it from between the intermediate platform 822 and the upper platform 823.

The lower chain conveyor 24 includes the two chains 900, 901 which are driven from rear sprockets 933 and pass over idler sprockets 934. The rear drive sprockets 933 are mounted upon a drive shaft 935 which extends between and is journaled within the side frame plates 883 and 884. Similarly, the front idler sprockets 934 are mounted upon an idler shaft 936 which extends between and is journaled within the side frame plates 883 and 884.

Each chain 900 and 901 of the lower chain conveyor 24 supports two lugs 938 and 939 which are engageable with cartons supported upon the lowermost platform 821 to push the carton forwardly on the platform. The lugs 938, 939 of the individual chains 900, 901 are spaced 180° apart from each other and are mounted parallel to the corresponding lugs on the other chain of conveyor 24. Thus, two lugs on the lower chain conveyors 900, 901 are operable to simultaneously engage a carton and push it off of the lower platform 821.

The lugs 930, 931 of the upper conveyor are 90° out of phase with the lugs 938 and 939 of the lower conveyors so that each carton conveyed by the chains of the upper conveyor is located midway between two cartons conveyed by the lower conveyor, and vice versa. In other words, a carton coming off of the lower platform 821 follows a carton from between the two upper platforms and vice versa.

The upper and lower chain conveyors 23 and 24 are driven from the main drive shaft 476 by a chain and sprocket drive 945 which drives an intermediate shaft 946 as may be seen most clearly in FIGURES 5a and 42. This intermediate shaft 946 is operable to drive another intermediate shaft 947 via a chain and sprocket drive 948. This second intermediate shaft 947 drives the forward sprockets of the lower chain conveyors 24 via a chain and sprocket drive 949 to the drive shaft 936.

The rear sprockets 933 of the lower chain conveyor 24 are drivingly keyed to the shaft 935 so that the drive of the lower chain conveyor 24 is operable to drive a sprocket 953 keyed to the drive shaft 915 of the upper chain conveyor 23 through a chain and sprocket drive 955. The rear sprockets 925, 926 of the upper chain conveyor 23 are keyed to the shaft 915 so that the drive from the lower chain conveyor 24 is imparted to the upper chain conveyor 23 through the chain and sprocket drive 955.

From the platforms 821, 822 and 823, the cartons are conveyed by the chain conveyors 23, 24 into the nip of the press rolls 25 and 26. These press rolls subsequently feed the carton onto the shingling conveyor which is indicated generally by the numeral 10.

As may be seen most clearly in FIGURES 42, 43 and 45, the lower press roll 26 is mounted upon a drive shaft 961 which extends between and is journaled in the side frame plates 883 and 884. The upper press roll is drivingly keyed to a drive shaft 962, the ends of which are journaled within vertically adjustable slide blocks 963 and 964. By adjusting the vertical position of the slide blocks 963 and 964 upon the frame side plates 883 and 884, the clearance between the rolls 25 and 26 may be adjusted. To this end, hanger rods 965 extend upwardly from the slide blocks 963 and 964 through vertical sleeves 956 which are adjustably threaded into vertical bores of brackets 966 and 967. These brackets are fixedly secured to the side plates 883 and 884, respectively. Nuts 957 threaded onto the upper ends of the rods 965 control the elevation of the upper press roll 25 and thus the clearance between the rolls 25, 26. Compression springs 968 are mounted over the hanger rods 965 between the slide blocks 963, 964 and the vertically adjustable sleeves 956 so as to bias the slide blocks downwardly. By adjusting the vertical position of the sleeves 956 within the bores of the brackets 966 and 967, the compression force between the rolls 25, 26 may be controlled.

The drive for the press rolls 25, 26 is derived from the main drive shaft 476 which is operable to drive a double sprocket 970 by means of a chain and sprocket drive 971. The double sprocket 970 is rotatably journaled upon the intermediate shaft 946 and is operable to drive the lower press roll drive shaft 26 through a chain and sprocket drive 972. A spur gear 973 keyed to the shaft 961 in turn drives another spur gear 974 keyed to the shaft 962 so that the two press rolls 25, 26 are both driven from the main drive shaft 476 of the machine.

After the cartons pass through the press rolls 25, 26, they enter between an upper shingling conveyor belt 980 and a lower shingling conveyor belt 981. The lower belt 981 is an endless type conveyor belt which passes over a drive pulley 982, around an idler pulley 983, under a slack take-up pulley 984 and over an idler pulley 985. As may be seen most clearly in FIGURE 46, the drive pulley 982 is drivingly keyed to a drive shaft 986 which extends between and is journaled within the frame said plates 883 and 884. The three idler pulleys 983, 984 and 985 are all rotatably journaled upon idler shafts 987 which are rotatably journaled within extension plates 988 and 999. These extension plates 988, 999 are bolted to the side plates 883 and 884 respectively. To take up slack in the belt 981 the pulley 984 is mounted for vertical movement under the control of adjustable screws 990 which extends through threaded blocks 991 secured to the side frame plates 988 and 999.

The upper belt 980 of the shingling conveyor passes over a drive pulley 995 and three idler pulleys 996, 997 and 998. The drive pulley 995 is mounted upon a drive shaft 994 which extends between and is journaled within the frame side plates 883 and 884 as may be seen most clearly in FIGURE 46. The idler pulleys 996, 997 and 998 are all mounted upon idler shafts 920 which extend between and are journaled within a pair of pivotally mounted side plates 921 and 922. These sides plates 921, 922 are pivotally journaled upon the drive shaft 994 so that they may be raised and lowered to gain access to the area between the two belts. Slack in the upper belt is controlled by means of a pair of adjustment screws 923 which pass through a pair of threaded blocks 924 secured to each of the plates 921 and 922 and abut against the shaft 920 upon which the pulley 998 is mounted.

Drive of the shingling conveyor 10 is provided from the main drive shaft 476. As was mentioned earlier, the drive shaft 476 is operable to drive the intermediate shaft 946 via the chain and sprocket drive 945. This intermediate shaft 946 (FIGURE 42) in turn is operable to drive the drive shaft 986 of the lower shingling conveyor through a chain and sprocket drive 940 and an electric clutch 941 (FIGURE 46). The drive shaft 986 also provides drive to the upper belt conveyor drive shaft 994 via a pair of spur gears 942 and 943.

The electric clutch 941 is inserted into the drive chain as a safety measure to insure that no voids ever occur in the cartons on the shingling conveyor 10. Ordinarily, each carton on the shingling conveyor partially overlaps the carton immediately in front of its as is best shown in FIGURE 2. If a void should ever occur on the shingling conveyor, it is possible that a carton coming out of the press rolls 25, 26 could engage the trailing edge of a carton on the shingling conveyor rather than partially overlapping it. This could result in a jam of cartons between the press rolls 25, 26. Therefore, a carton detection device is located between the press rolls 25, 26 and the shingling conveyor 10 to detect the presence or absence of a carton in this area. This detecting device comprises a microswitch 950 having an actuator control rod 951 which extends vertically into the area between the press rolls and the shingling conveyor. Normally this switch is closed. It is held in the open position by cartons passing out of the press rolls 25, 26. If for any reason, the machine should continue to operate without blanks being fed into the machine, the actuator arm 951 will detect the absence of a carton immediately in front of the shingling conveyor. This will result in the closing of the microswitch 950 and energization of the electric clutch through a conventional control circuit. When the clutch is energized, it disconnects the drive between the chain and sprocket 940 and the drive shaft 986. The clutch remains energized and the shingling conveyor temporarily stopped until another carton is fed through the press rolls into contact with the actuator arm 951 of the microswitch. When this occurs, the switch opens and thereby opens the control circuit to the electric clutch 941.

In order to achieve shingling of the cartons on the shingling conveyor, the shingling conveyor is operated at a slower linear speed than the conveyors which feed or supply cartons to it. Thus, a relatively large bank of cartons may be stored on a relatively short shingling conveyor and held in a compressed condition between the belt conveyors 980 and 981 while the glue of the carton is allowed to dry.

From the shingling conveyor, the cartons are fed into the open top of the gravity feed magazine 28. Simultaneously, cartons are fed from the bottom of this magazine 28 directly into a conventional carton opening and filling machine. Any conventional machine may be used for opening and filling the cartons. One suitable example of such an opening and filling machine is disclosed in U.S. Patent No. 3,333,514, filed Mar. 3, 1964, and assigned to the assignee of this application.

Referring to FIGURE 2, it will be seen that in one preferred embodiment, the carton filling machine is oriented parallel to and as an extension of the fourth linear conveyor of this machine. In another embodiment, we have found that it is preferable to run the carton opening and filling machine directly beneath and parallel to the fourth linear conveyor so as to conserve floor space.

*Machine operation*

Before starting the machine, a stack of carton blanks 9 is placed on edge in the carton feed magazine 11. The conveyors 109, 110 of the magazine 11 move these blanks forwardly into the blank feeder mechanism 27 which is operative to sequentially feed carton blanks into the first linear conveyor.

To feed blanks from the magazine, the hold-down fingers 130, 131 first engage the top edge of the blank. The suction cup 132 is then moved into engagement with the blank between the fingers 130, 131. While the suction cup 132 is engaged with the carton, vacuum is applied to the cup through the rotary distribution valve 261 and the cut-off valve 260. While the vacuum continues to be connected to the cup, the cup is moved forwardly so as to bow that portion of the blank located between the two hold-down fingers 130, 131. While the blank is held in the bowed condition by the suction cup, the vertically movable spade 133 enters between the bowed portion of the first blank and the blank immediately behind it. After the spade has entered between the two cartons, the suction to the vacuum cup 132 is released and the cup is moved forwardly out of the way of the carton blank. Segment wheels 137 and 138 then enter behind the bowed upper portion of the carton blank adjacent the spade 133. These segment wheels force the center portion of the blank downwardly toward the feed roller 140. Subsequently, other segment wheels 141, 142, spaced transversely further from the spade, engage the upper portion of the blank and force it downwardly toward the feed roll 140. When the full width of the blank has been forced downwardly into engagement with the feed roll 140, the carton blank becomes entrapped between the segment wheels and the feed roll and is fed forwardly into another pair of feed rolls 143, 144. These latter feed rolls 143, 144 then convey the blank into the belts of the first linear conveyor. As the blank is moved downstream by the belts, one side panel 13 engages a stationary plow 494 and is forced downwardly while simultaneously the glue flap 12 on the opposite side of the blank is engaged by another plow 490 and forced downwardly into the vertical plane. The glue flap is then allowed to spring back into the horizontal plane while the panel 13 remains in the vertical plane as the blank is conveyed through a right angle turn on the curvilinear conveyor 17.

The curvilinear conveyor entraps the carton blank between the circular cross section belt 500 and a series of spring biased rollers 501. While thus entrapped between the rollers and the belt, the blank moves with the belt through the curvilinear path defined by the belt. During movement of the blank with the belt 500, there is no relative movement between the belt 500 and the blank so that there is no chance of the carton being scarred or torn because of relative sliding between the rollers and the blank or the belt and the blank.

From the second curvilinear conveyor, the blanks are conveyed along the third linear conveyor while entrapped between the lower conveyor belts 580, 581, 582 and a pair of upper conveyor belts 583, 584. While moving forwardly on these conveyors, the side panel 13 is plowed upwardly by a stationary plow 720 while simultaneously another plow 721 is operative to plow the panel 18 downwardly about a fold line 29. With the panel 18 and the attached glue tab 12 extending in the vertical plane, the carton blank passes the glue roll 20 which is operative to apply a thin coating of glue to the vertically extending glue tab.

After application of the glue to the glue tab 12, the panel 18 with the attached glue tab engages a stationary plow 725 which is operable to plow the panel 18 upwardly beneath and into juxtaposition with the top panel 13. Immediately thereafter, the bottom panel 19 overlaps the glue applied flap 12 of the carton. At this point, the blank is a flat, folded and glued carton in the sense that it now has one glued seam.

As the cartons are moved forwardly from between the lower belts 581, 582 and the upper belts 583, 584 of the third linear conveyor, it passes through a diverter 21 operable to place sequential cartons from the third linear conveyor on tables 821, 822 located in different vertical planes. This diverter 21 includes a pair of rotatable feed rolls 826, 827 which are mounted upon rocker arms operable to move the roller into different vertical planes. Movement of the rocker arms is controlled through a cam mechanism in timed synchronization with the feeder mechanism so that the feed rolls move from a lower position to an upper position and vice versa during the interval after the trailing edge of a carton passes between the rollers and before the following carton can progress far enough to result in interference between the carton and the immediate platform 822.

After the cartons are placed upon the platforms 821, 822, their forward movement is arrested and temporarily stopped until the cartons are engaged by either the lugs 930, 931 of the upper chain conveyors 23 or the lugs 938 and 939 of the lower chain conveyor 24. These lugs extend through slots in the platform to engage the trailing edge of the cartons and push the cartons forwardly along the fourth linear conveyor into the nip of the press rolls 25, 26.

As the cartons pass between the press rolls 25, 26, they are oriented with the glued seam parallel to the axis of the press rolls 25, 26 so that these press rolls apply only an instantaneous pressure to the glued seam. This is in contrast to the traditional glued seam press roll orientation in which the seam is oriented transverse to the axis of the press rolls as it passes between them so that the glue is progressively forced rearwardly in the seam with the result that it builds up on the rearward side of the press roll nip and is deposited at the end of the seam. This is, of course, undesirable and results in subsequent erection problems when it is found that two supposedly separable panels of the carton have been inadvertently glued together.

After the press rolls have applied an instantaneous pressure to the glued seams, the carton passes onto the shingling conveyor 10 where it is placed in overlapping relation with the carton which has immediately preceded it. To enable the cartons to be shingled on the shingling conveyor, the rearward end of the lower belt 981 of the shingling conveyor is located below the horizontal plane of the nip of the press rolls 25, 26 from which the cartons are fed onto the shingling conveyor, and the shingling conveyor is operated at a slower linear speed than the other conveyors of the machine.

The shingled cartons are then dropped off of the forward end of the shingling conveyor into the open top of a storage magazine 28 from the bottom of which cartons are simultaneously fed into a carton opening and filling machine. Thus, the shingling conveyor cooperates with the storage magazine to provide a bank of cartons for the carton erection and filling machine. This bank may be used during continued operation of the filling machine even after the folding and gluing machine of this invention has temporarily stopped. Alternatively, the carton gluing and folding machine may continue to operate and feed cartons into the open magazine 28 even though the carton filling machine may undergo a temporary stoppage.

Because the cartons are fed directly from the blank folding and gluing machines into the storage magazine which feeds the carton filling machine, the cartons never undergo a prolonged period of storage in the flat condition. Therefore, the cartons are much easier to open than cartons which have been stored under pressure in a flat condition for a long period of time.

While only a single embodiment of the inventive machine of this application has been disclosed and described herein, those skilled in the art to which this invention pertains will readily appreciate numerous changes and modifications which may be made without departing from the spirit of our invention. Therefore, we do not intend to be limited except by the scope of the appended claims.

Having described our invention, we claim:

1. For use in combination with a machine for erecting and filling flat cartons, a machine for forming flat cartons from cut and scored flat unfolded blanks which have longitudinal fold lines defined therein, said machine comprising:

a magazine for storing a stack of flat blanks, a feeder mechanism for sequentially feeding said blanks from said magazine, a first linear conveyor for transporting said blanks from said magazine along a first linear path while said flat blanks are oriented in a horizontal plane with their longitudinal fold lines located parallel to the direction of movement of said blanks on said first conveyor, means located along said first conveyor for folding at least one flap of each of said blanks, a second curvilinear conveyor for transporting said blanks without blank flexure through approximately a 90° turn while maintaining said blank orientation with respect to the direction of movement of the blank, and while maintaining a major portion of said flat blanks in a horizontal plane throughout said 90° turn, a third linear conveyor for transporting said blanks from said second conveyor along another linear path approximately normal to said first linear path while said blanks remain oriented with their longitudinal fold lines located parallel to the direction of movement of said blanks on said third conveyor, means located along one of said conveyors for applying an adhesive to one flap of said blank and for folding another flap into contact with said adhesive applied flap to form a flat folded carton, a fourth conveyor for transporting said folded cartons out of said machine, the rearwardmost portion of said fourth conveyor being located approximately normal to said third conveyor such that carton orientation relative to the direction of carton movement is changed by approximately 90° as the cartons are transferred between the third and fourth conveyors, said fourth conveyor then being operable to transport said flat cartons with said longitudinal fold lines located normal to the direction of carton movement on said fourth conveyor, and a second magazine at the output end of said fourth conveyor, said second magazine having an open top and being so positioned that flat cartons from said fourth conveyor are fed into the open top of said second magazine while simultaneously flat cartons may be sequentially fed from the bottom of said second magazine into said carton erecting and filling machine, said second magazine thus being operable to store a bank of cartons for said erecting and filling machine so as to enable said erecting and filling machine to be operated independently of said forming machine.

2. The machine of claim 1 in which said second curvilinear conveyor comprises:

a resilient endless belt which extends between and runs over a pair of spaced pulleys, said belt defining a forward run and a return run between said pulleys, said forward run defining a generally curvilinear section located in a first plane, the forwardmost portion of said forward run being located in a plane which is angulated relative to said first plane whereby said belt moves out of said first plane and out of engagement with an article on said conveyor before it passes around said spaced pulleys, a plurality of contact rollers engaging said curvilinear section of said belt at spaced contact points therealong, all of said contact points between said contact rollers and said belt being located in a second common plane which is parallel to said first plane, and means for driving said belt whereby a flat article pinched between said belt and said rollers is transported through said curvilinear path without the occurrence of any relative sliding movement between said belt and said flat article.

3. A machine for forming flat cartons from cut and scored flat blanks which have longitudinal fold lines defined therein, said machine comprising:

a magazine for storing a stack of flat blanks, a feeder mechanism for sequentially feeding said blanks from said magazine, a first linear conveyor for transporting said blanks from said magazine along a first linear path while said blanks are oriented with their longitudinal fold lines located parallel to the direction of movement of said blanks on said first conveyor, means located along said first conveyor for folding at least one flap of each of said blanks, a second curvilinear conveyor for transporting said blanks through approximately a ninety degree turn while maintaining said blank orientation with respect to the direction of movement of the blanks, a third linear conveyor for transporting said blanks from said second conveyor along another linear path approximately normal to said first linear path while said blanks remain oriented with their longitudinal fold lines located parallel to the direction of movement of said blanks on said third conveyor, an adhesive applicator located along one of said conveyors for applying adhesive to one flap of each of said blanks, means located along one of said conveyors for folding another flap over each of said adhesive applied flaps to form flat folded cartons, a fourth conveyor for transporting said folded cartons out of said machine, the rearwardmost portion of said fourth conveyor being located approximately normal to said third conveyor such that carton orientation relative to the direction of carton movement is altered by approximately 90° as the cartons are transferred between the third and fourth conveyors, said fourth conveyor then being operable to transport said flat cartons out of said machine with said longitudinal fold lines located normal to the direction of carton movement on said fourth conveyor.

4. A machine for forming flat cartons from flat cut and scored blanks, said blanks having longitudinal fold lines defined therein, said forming machine comprising:

a magazine for storing a stack of flat blanks, feeder mechanism for sequentially feeding said blanks from said magazine, a first conveyor system for transporting said blanks along a predetermined path while said blanks are oriented with their longitudinal fold lines located parallel to the direction of movement of said blanks on said first conveyor system, a glue applicator for applying glue longitudinally along one side of one flap of each of said blanks, blank folding means located along said predetermined path for folding another flap over said glue applied side of said one flap to form a flat folded carton having at least one longitudinal glued seam, a second conveyor system for transporting said flat folded cartons away from said first conveyor system, the rear portion of said second conveyor system being located approximately normal to the forward end portion of said first conveyor system such that carton orientation relative to the direction of carton movement is altered by approximately 90° as the cartons are transferred between said first and second conveyor systems, said second conveyor system then being operable to transport said cartons out of said machine with said longitudinal fold lines located normal to the direction of carton movement on said second conveyor system, and at least one pair of compression rolls located in the path of movement of said cartons on said second conveyor system, said compression rolls being located transverse to the direction of movement of said cartons on said second conveyor system whereby said compression rolls are operable to apply an instantaneous pressure to said glue applied seam for the full length of said seam, and at least one of said compression rolls being adjustably movable toward and away from the other compression roll to adjust the clearance between said rolls, and adjustable spring means for determining the compressive pressure which said compression rolls apply to said glue seam.

5. The method of forming flat cartons from cut and scored flat blanks which have longitudinal fold lines defined therein, said method comprising:

transporting said blanks serially along a first linear path while said blanks are oriented with their longitudinal fold lines located parallel to the direction of movement, folding at least one flap of each of said blanks as said blanks are transported along said first linear path, transporting said blanks without blank flexure through a curvilinear path having a turn of at least 90° while maintaining said blank orientation with respect to the direction of movement of the blanks and while maintaining the major portion of said flat blanks in a horizontal plane throughout said turn, transporting said blanks from said second curvilinear path along a third path while said blanks remain oriented with their longitudinal fold lines located parallel to the direction of movement of said blanks on said third path, applying adhesive to at least one flap of each of said blanks as the blanks are transported along said paths, and folding another flap over each of said adhesive applied flaps as said blanks are transported along said paths to form said blanks into flat folded cartons having at least one longitudinal adhered seam.

6. The method of claim 5 further comprising the steps of:

transporting said flat folded cartons through a right angle turn, and effecting a reorientation of the cartons relative to the direction of carton movement as the cartons are transported through said right angle turn.

7. The method of claim 6 further comprising the steps of:

transporting said cartons away from said right angle turn while the longitudinal fold lines of said cartons are located normal to the direction of movement of said cartons, and applying a compressive force simultaneously to the full length of each of said longitudinal adhered seams as said cartons are transported with their longitudinal fold lines located normal to the direction of carton movement.

8. A machine for forming flat cartons from flat cut and scored blanks, said blanks having longitudinal fold lines defined therein, said forming machine comprising:

a magazine for storing a stack of flat blanks, feeder mechanism for sequentially feeding said blanks from said magazine, a first generally horizontal conveyor system for transporting said blanks along a predetermined path while said blanks are oriented with their longitudinal fold lines located parallel to the direction of movement of said blanks on said first conveyor system, blank folding means and an adhesive applicator located along said predetermined path for applying adhesive longitudinally along one side of one flap of each of said blanks and for folding another flap into contact with said adhesive applied side of said one flap to form a flat folded carton having at least one longitudinal adhered seam, a second generally horizontal conveyor system for transporting said flat folded cartons away from said first conveyor system, the rear portion of said second conveyor system being located approximately normal to the forward end portion of said first conveyor system such that carton orientation relative to the direction of carton movement is changed by approximately 90° as the cartons are transferred between said first and second conveyor systems, said second conveyor system then being operable to transport said cartons out of said machine with said longitudinal fold lines located normal to the direction of carton movement on said second conveyor system, said rear portion of said second conveyor system comprising a pair of vertically spaced, generally horizontal conveyors, a diverter located at the forward end of said first conveyor system for placing sequential cartons from said first conveyor system on different ones of said pair of vertically spaced conveyors, and said second conveyor system then being operable to integrate cartons from said pair of vertically spaced conveyors onto a single horizontal conveyor.

9. The machine of claim 8 wherein said diverter comprises a pair of rotatable rollers between which the cartons are conveyed as they pass through the diverter, said rollers being vertically movable between two positions and operable in each position to direct a carton into one of said pair of vertically spaced conveyers.

10. The machine of claim 8 further comprising a cam and follower mechanism synchronized with said feeder mechanism and operable to control vertical movement of said diverter between two positions.

11. A machine for forming flat cartons from flat cut and scored blanks, said blanks having longitudinal fold lines defined therein, said forming machine comprising:

a magazine for storing a stack of flat blanks, feeder mechanism for sequentially feeding said blanks from said magazine, a first generally horizontal conveyor system for transporting said blanks along a predetermined path while said blanks are oriented with their longitudinal fold lines located parallel to the direction of movement of said blanks on said first conveyor system, blank folding means and an adhesive applicator located along said predetermined path for applying adhesive longitudinally along one side of one flap of each of said blanks and for folding another flap over said adhesive applied side of said one flap to form a flat folded carton having at least one longitudinal adhered seam, a second generally horizontal conveyor system for transporting said flat folded cartons away from said first conveyor system, the rear portion of said second conveyor system being located approximately normal to the forward end portion of said first conveyor system such that carton orientation relative to the direction of carton movement is changed by approximately 90° as the cartons are transferred between said first and second conveyor systems, said second conveyor system then being operable to transport said cartons out of said machine with said longitudinal fold lines located normal to the direction of carton movement on said second conveyor system, said rear portion of said second conveyor system comprising a pair of vertically spaced, generally horizontal conveyors, and a diverter located at the forward end of said first conveyor system for placing sequential cartons from said first conveyor system on different ones of said pair of vertically spaced conveyors.

12. The machine of claim 11 wherein said diverter is movable between two positions to control placement of said cartons on said pair of vertically spaced conveyors, and further including a cam and cam follower synchronized with said feeder mechanism for controlling movement of said diverter between said two positions.

13. A machine for forming flat cartons from flat cut and scored blanks, said blanks having longitudinal fold lines defined therein, said forming machine comprising:
  a magazine for storing a stack of flat blanks,
  a feeder mechanism for sequentially feeding said blanks from said magazine,
  a first conveyor system for transporting said blanks along a predetermined path while said blanks are oriented with their longitudinal fold lines located parallel to the direction of movement of said blanks on said first conveyor system, blank folding means and an adhesive applicator located along said predetermined path for applying an adhesive longitudinally along one side of one flap of each of said blanks and for folding another flap into contact with said adhesive applied side of said one flap to form a flat folded carton having at least one longitudinal adhered seam,
  a second conveyor system for transporting said flat folded cartons away from said first conveyor system, the rear portion of said second conveyor system being located approximately normal to the forward end portion of said first conveyor system such that carton orientation relative to the direction of carton movement is changed by approximately 90° as the cartons are transfered between said first and second conveyor systems, said second conveyor system then being operable to transport said cartons out of said machine with said longitudinal fold lines located normal to the direction of carton movement on said second conveyor system, said second conveyor system including a shingling conveyor upon which each carton partially overlaps the preceding carton, and
  means for detecting the absence of a carton adjacent the rear end of said shingling conveyor and means for stopping said shingling conveyor while the remainder of said machine continues to operate such that an area void of cartons never occurs on said shingling conveyor even though said first conveyor system may operate without blanks.

14. The machine of claim 13 wherein said detecting means comprises an electric switch and switch actuator, said means for stopping said shingling conveyor including an electric clutch operable in response to actuation of said switch to disconnect the drive to said shingling conveyor.

15. A machine for forming flat cartons from cut and scored flat unfolded blanks which have longitudinal fold lines defined therein, said machine comprising:
  a magazine for storing a stack of flat unfolded blanks,
  a feeder mechanism for sequentially feeding said blanks from said magazine,
  a first linear conveyor for transporting said blanks from said magazine along a first straight linear path while said blanks are oriented with their longitudinal fold lines located parallel to the direction of movement of said blanks on said first conveyor,
  a second curvilinear conveyor for transporting said blanks through a curvilinear path without flexing said blanks while maintaining said blank orientation with respect to the direction of movement of the blanks along said curvilinear path,
  a third linear conveyor for transporting said blanks from said second curvilinear conveyor along another straight linear path while the longitudinal fold lines remain parallel to the direction of movement of said blanks on said third conveyor,
  means located along at least one of said conveyors for folding said blanks about said longitudinal fold lines to form flat cartons from said blanks, said flat cartons having at least one overlapping longitudinal seam, and securing said seam in overlapping relationship.

16. The machine of claim 15 wherein said curvilinear conveyor comprises:
  an endless belt which extends between and runs over a pair of spaced pulleys, said belt defining a forward run and a return run between said pulleys, said forward run defining a generally curvilinear section located in a first plane,
  a first set of contact rollers engaging said curvilinear section of said belt at spaced contact points therealong, all of said contact points between said contact rollers and said belt being located in a second common plane which is parallel to said first plane, and
  said belt being operable to convey a blank pinched between said belt and said set of contact rollers through a curvilinear path without the occurrence of any relative sliding movement between said belt and said blank.

17. The machine of claim 15 which further includes a vacuum control valving system for use in combination with said feeder mechanism operative to sequentially feed blanks from said magazine, said system including a cut off valve comprising:
  an oscillatable vacuum control shaft,
  a vacuum control plate secured to said shaft so as to be movable with said shaft, said vacuum control plate having an aperture therein,
  a follower plate biased into frictional engagement with said vacuum control plate so as to move with said vacuum control plate, said follower plate having an aperture co-axially alignable with said aperture of said control plate,
  one of said apertures being connectable to a source of vacuum and the other aperture being connectable to a suction cup so that when said apertures are aligned, said source may be connected to said cup, and
  a movable locking finger engageable with said follower plate to stop the oscillatory movement of said follower plate with said control plate and thereby disconnect said vacuum from said suction cup.

18. The vacuum control valving system of claim 17 further comprising a timing valve connected between said source and said cup and cooperable with said cut off valve to control connection of said source with said cup, said timing valve having a movable spool and a port block, said port block being operative to connect said suction cup to said vacuum source and to atmospheric pressure during each cycle of the feeder mechanism.

19. The vacuum system of claim 18 wherein said spool is rotatable within said port block.

20. A machine for forming flat glued cartons from cut and scored flat unfolded blanks which have longitudinal fold lines defined therein, said machine comprising:
  a magazine for storing a stack of flat unfolded blanks,
  a feeder mechanism for sequentially feeding said blanks from said magazine,
  a first linear conveyor for transporting said blanks from said magazine along a first straight linear path while said blanks are oriented with their longitudinal fold lines located parallel to the direction of movement of said blanks on said first conveyor,
  a second curvilinear conveyor for transporting said blanks through a curvilinear path without flexing said blanks while maintaining said blank orientation with respect to the direction of movement of the blanks along said curvilinear path,
  a third linear conveyor for transporting said blanks from said second curvilinear conveyor along another straight linear path while the longitudinal fold lines remain parallel to the direction of movement of said blanks on said third conveyor, a glue applicator located along one of said conveyors for applying glue to one flap of each of said blanks, and means located along one of said conveyors for folding another flap over said glue applied flap to form flat folded and glued cartons from said blanks.

21. The machine of claim 20 wherein said second curvilinear conveyor comprises:

a resilient endless belt which extends between and runs over a pair of spaced pulleys, said belt defining a forward run and a return run between said pulleys, said forward run defining a generally curvilinear section located in a first plane, a plurality of contact rollers engaging said curvilinear section of said belt at spaced contact points therealong, all of said contact points between said contact rollers and said belt being located in a second common plane which is parallel to said first plane, and said belt being operable to transport flat blanks pinched between said belt and said contact rollers through a curvilinear path without the occurrence of any relative sliding movement between said belt and said blanks.

References Cited

UNITED STATES PATENTS

| | | | |
|---|---|---|---|
| 2,252,806 | 8/1941 | Heywood | 93—61 |
| 2,411,144 | 11/1946 | Bergstein | 93—49 |
| 2,412,546 | 12/1946 | Waters | 93—49 |
| 2,745,665 | 5/1956 | Labombarde | 271—26 |
| 2,787,363 | 4/1957 | Howdle | 198—33 |
| 2,790,536 | 4/1957 | Reed | 198—35 |
| 2,931,277 | 4/1960 | Labombarde | 93—52 |
| 3,106,877 | 10/1963 | Larson | 93—62 |
| 3,107,984 | 10/1963 | Novick | 93—62 X |
| 3,259,031 | 7/1966 | Paulson | 93—61 |
| 3,332,212 | 7/1967 | Talbot | 93—52 X |
| 2,986,078 | 5/1961 | Hottendorf | 93—36 |
| 3,333,514 | 8/1967 | Jones | 93—36 |

FOREIGN PATENTS 518,264  2/1931  Germany.

WAYNE A. MORSE, JR., *Primary Examiner.*

U.S. Cl. X.R.

93—48, 61